United States Patent
Kazemi et al.

(10) Patent No.: US 6,381,556 B1
(45) Date of Patent: Apr. 30, 2002

(54) DATA ANALYZER SYSTEM AND METHOD FOR MANUFACTURING CONTROL ENVIRONMENT

(75) Inventors: Niakam Kazemi, Columbia; Muhammad Raza, Elkridge; Andrei Csipkes, Savage, all of MD (US)

(73) Assignee: CIENA Corporation, Linthicum, MD (US)

(*) Notice: Subject to any disclaimer, the term of this patent is extended or adjusted under 35 U.S.C. 154(b) by 0 days.

(21) Appl. No.: 09/365,585

(22) Filed: Aug. 2, 1999

(51) Int. Cl.[7] ............................ G06F 11/30; G06F 15/00

(52) U.S. Cl. .......................... 702/182; 700/17; 700/83; 700/110; 700/115; 345/700; 345/639; 345/619; 345/594

(58) Field of Search .............................. 702/182, 183; 700/17, 83, 84, 86, 121, 110, 115; 345/846, 594, 595, 619, 639, 640, 700

(56) References Cited

U.S. PATENT DOCUMENTS

| 5,457,797 A | * | 10/1995 | Butterworth et al. ........ 709/320 |
| 5,812,394 A | * | 9/1998 | Lewis et al. .................... 700/17 |
| 5,889,674 A | * | 3/1999 | Burdick et al. ............... 700/121 |

* cited by examiner

Primary Examiner—Marc S. Hoff
Assistant Examiner—Hien Vo
(74) Attorney, Agent, or Firm—David L. Soltz; Daniel N. Daisak; Michael R. Cammarata

(57) ABSTRACT

A system and method analyze raw data derived from a manufacturing control facility, the manufacturing control facility for manufacturing at least one device by execution of a sequence of assembly operations. A preprocessor is used to receive the raw data from the manufacturing control facility and to configure the raw data into a predetermined database format. The raw data after being configured by the preprocessor is stored into a database. A server transmits queries and results between the database and at least one user terminal. The results transmitted by the server are displayed on at least one graphical user interface at the user terminal, the results being indicative of at least one performance parameter of the assembly operations.

18 Claims, 66 Drawing Sheets

| Serial Number | Module ID | Module Name | Product ID | Product Name |
|---|---|---|---|---|
| */79/ | 14 | AMP 25 | 1 | MULTIWAVE 1600 |
| **M0092001 | 1 | ADM AMP 25 | 1 | MULTIWAVE 1600 |
| *M0093026 | 14 | AMP 25 | 1 | MULTIWAVE 1600 |
| *M0095892 | 14 | AMP 25 | 1 | MULTIWAVE 1600 |
| **M0093827 | 14 | AMP 25 | 1 | MULTIWAVE 1600 |
| .01 | 49 | REMOD | 1 | MULTIWAVE 1600 |
| .M0089717 | 62 | TRANSMITTER R3 | 2 | MULTIWAVE 4000 |
| .M0094337 | 43 | PUMP | 1 | MULTIWAVE 1600 |
| .1gtM0092332 | 61 | TRANSMITTER R2 | 4 | SENTRY |
| \M0093267 | 47 | RECEIVER 2.0 | 4 | SENTRY |
| B1019074 | 48 | RECEIVER 3.0 | 2 | MULTIWAVE 4000 |
| 41 | 41 | POWER SUPPLY R2 | 4 | SENTRY |
| 0 | 14 | AMP 25 | 1 | MULTIWAVE 1600 |
| 0***M0093329 | 43 | PUMP | 1 | MULTIWAVE 1600 |
| 0003M0091996 | 1 | ADM AMP 25 | 1 | MULTIWAVE 1600 |
| 00 | 1 | ADM AMP 25 | 1 | MULTIWAVE 1600 |
| 000 | 66 | AMP 20 | 2 | MULTIWAVE 4000 |
| 0095803 | 47 | RECEIVER 2.0 | 4 | SENTRY |

Number of Rows: 744

Serial Numbers Tracking

Chart | Data | Result Set | ? Parameters

List of Serial Numbers

| Module ID | Module Name | Product ID | Product Name |
|---|---|---|---|
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |
| 48 | RECEIVER 3.0 | 2 | MULTIWAVE 4000 |

List of Serial Numbers

Number of Rows: 744

Preview/Print | Filter | Close

Serial Numbers Tracking

Chart | Data | Result Set | ? Parameters

List of Serial Numbers

| Serial Number | Module ID | Module Name | Product ID | Product Name |
|---|---|---|---|---|
| 00 | | | | |
| C0061909 | 1 | ACM AMP 25 | 1 | MULTIWAVE 1600 |
| M0094366 | 14 | AMP 25 | 1 | MULTIWAVE 1600 |
| M0093839 | 43 | PUMP | 1 | MULTIWAVE 1600 |
| M0094364 | 14 | AMP 25 | 1 | MULTIWAVE 1600 |
| M0094361 | 43 | PUMP | 1 | MULTIWAVE 1600 |
| M0094351 | 43 | PUMP | 1 | MULTIWAVE 1600 |
| M0094351 | 43 | PUMP | 1 | MULTIWAVE 4000 |
| M0094293 | 56 | SPLITTER/COMBINER | 1 | MULTIWAVE 1600 |
| M0094235 | 56 | SPLITTER/COMBINER | 1 | MULTIWAVE 1600 |
| C0061916 | 14 | AMP 25 | 1 | MULTIWAVE 1600 |
| M0094387 | 43 | PUMP | 1 | MULTIWAVE 1600 |
| C0061898 | 14 | AMP 25 | 1 | MULTIWAVE 1600 |
| C0061614 | 14 | AMP 25 | 1 | MULTIWAVE 1600 |
| C0061612 | 14 | AMP 25 | 1 | MULTIWAVE 1600 |
| C0061611 | 14 | AMP 25 | 1 | MULTIWAVE 1600 |
| C0061108 | 14 | AMP 25 | 1 | MULTIWAVE 1600 |
| M0093848 | 14 | AMP 25 | 1 | MULTIWAVE 1600 |

Number of Rows: 287

List of Serial Numbers

Preview/Print | Filter | Close

| Defect ID | Defect Description |
|---|---|
| 10 | MECHANICAL |
| 11 | OPTICAL |
| 12 | SMT |
| 19 | ELECTRONIC |

List of Defects in Level 1

FIG. 33

| Defect ID | Defect Description |
|---|---|
| 407 | 0141-No light continuity |
| 408 | A-01 No Defects |
| 409 | A000-Symptom |
| 410 | A101 non soldered connection |
| 411 | A101-Non Soldered Connection |
| 412 | A102 solder short |
| 413 | A102-Bridging |
| 414 | A103 insufficient solder |
| 415 | A103-Lead Off Pad |
| 416 | A104 excessive solder |
| 417 | A104-Cold Solder Joint |
| 418 | A105 solder peaks, splashes |

List of Defects in Level 3

FIG.35

| Defect ID | Defect Description |
|---|---|
| 15 | |
| 16 | (ADDITIONAL DETAILS)* |
| 17 | (DESCRIPTION)* |
| 18 | (REFERENCE DESIGNATOR)* |
| 19 | Ciena Responsible |
| 20 | Vendor Responsible |

List of Defects in Level 4

FIG. 36

Defects Count Based on Action Information

Defects Counts Based on Action Information for Operation

| Defect | Defect Description | Action ID | Action Description | Action Info | Defects Count | R D |
|---|---|---|---|---|---|---|
| 410 | A101 Non Soldered Connection | 174 | RA152 Removed & Replaced | LA1 LA2.U15.U34. | 3 | 411 |
| 410 | A101 Non Soldered Connection | 168 | RA101 Soldered Connection | U-18 | 1 | 137 |
| 411 | A101 Non Soldered Connection | 168 | RA101 Soldered Connection | R335 | 3 | 411 |
| 411 | A101 Non Soldered Connection | 168 | RA101 Soldered Connection | R74 | 1 | 137 |
| 411 | A101 Non Soldered Connection | 168 | RA101 Soldered Connection | U56 | 1 | 137 |
| 420 | A106 Multicrent Solder | 174 | RA152 Removed & Replaced | D1 | 1 | 137 |
| 425 | A110 Wrong Component | 174 | RA152 Removed & Replaced | R325 | 3 | 411 |
| 425 | A110 Wrong Component | 174 | RA152 Removed & Replaced | U5 U7 U8 | 1 | 137 |
| 425 | A111 Reversed Polarity | 174 | RA152 Removed & Replaced | U24 | 1 | 137 |
| 439 | A111 Reversed Polarity | 174 | RA152 Removed & Replaced | U29 | 2 | 274 |
| 439 | A152 Broken Component | 174 | RA152 Removed & Replaced | U24 | 1 | 137 |
| 439 | A152 Broken Component | 174 | RA152 Removed & Replaced | U8 | 2 | 274 |
| 439 | A152 Broken Component | 174 | RA152 Removed & Replaced | U37 | 1 | 137 |
| 441 | A157 Wrong Orientation of Polarized | 174 | RA152 Removed & Replaced | C144 | 2 | 274 |
| 441 | A157 Wrong Orientation of Polarized | 174 | RA152 Removed & Replaced | U5 U7 U8 | 1 | 137 |
|  |  |  |  | U29 |  |  |
|  |  |  |  | U37 |  |  |

FIG.41

Defects Count Based on Action Information

Defects Counts Based on Action Information

| Defect | Defect Description | Defect | Defect Description | Action ID | Action Description |
|---|---|---|---|---|---|
| 177 | CASSETTE TESTING | 556 | 0144 Incorrect Fiber Routing | 153 | CA000 Other |
| 177 | CASSETTE TESTING | 558 | 0999 Other Optic at Assembly Error | 158 | CA104 Replaced Optical |
| 177 | CASSETTE TESTING | 558 | 0999 Other Optic at Assembly Error | 158 | CA104 Replaced Optical |
| 177 | CASSETTE TESTING | 606 | T807 High Baseline (M30) | 158 | CA104 Replaced Optical |
| 178 | ET2 RECEIVER TEST | 567 | T508 Defective Unit | 181 | RA194 Scraped Board |
| 178 | ET2 RECEIVER TEST | 610 | T999 Other Electronic Test Error | 174 | RA152 Removed & Replace |
| 178 | ET2 RECEIVER TEST | 610 | T999 Other Electronic Test Error | 174 | RA152 Removed & Replace |
| 183 | RF ASSEMBLY | 537 | 0126 Broken Component Lead | 194 | RA152 Removed & Replace |
| 183 | RF ASSEMBLY | 525 | 0111 Fiber to be Spliced Found Back | 174 | RA152 Removed & Replace |
| 183 | RF ASSEMBLY | 514 | I999 other | 194 | RA152 Removed & Replace |
| 183 | RF ASSEMBLY | 452 | A999 Other Electronic Assembly Prof | 151 | RA152 Removed & Replace |
| 183 | RF ASSEMBLY | 558 | 0999 Other Optical Assembly Error | 168 | RA101 Soldered Connection |
| 183 | RF ASSEMBLY | 452 | A999 Other Electronic Assembly Prof | 174 | RA152 Removed & Replace |
| 183 | RF ASSEMBLY | 561 | T205 Port Bad | 174 | RA152 Removed & Replace |
| 183 | RF ASSEMBLY | 452 | A999 Other Electronic Assembly Prof | 174 | RA152 Removed & Replace |
| 183 | RF ASSEMBLY | 558 | 0999 Other Optical Assembly Error | 174 | RA152 Removed & Replace |

Defects Count Based on Action Information

Data | Parameters

Defects Counts Based on Action Information

| Action Info | Defect Count | R. D. Count |
|---|---|---|
| SPLICED A NEW PIG | 1 | 0.88% |
| REPLACED HIGH AP | 1 | 0.88% |
| REPLACED HIGH CIP | 1 | 0.88% |
| RESPLICED | 1 | 0.88% |
| SEE REFERENCE DI | 1 | 0.88% |
| C238 | 1 | 0.88% |
| U-42 | 1 | 0.88% |
| U34 | 2 | 1.77% |
| U-15 | 1 | 0.88% |
| R177, R26 | 2 | 1.77% |
| U-8 | 1 | 0.88% |
| U-37 | 1 | 0.88% |
| RESODERED LA1 LA2 | 1 | 0.88% |
| U24 | 3 | 2.65% |
| U325 | 1 | 0.88% |
| U-34 | 1 | 0.88% |

Defects Count Based on Action Information

Export

Preview/Print

Close

FIG. 48

Defects Log

Defects List

| Serial Number | Part Number | Opened | Closed | Station ID | Shift |
|---|---|---|---|---|---|
| B1010646 | 130-0003-400 | 5/1/98 | | 13STNC1 | 1 |
| B1012184 | 130-0003-400 | 5/1/98 | | 13STNB1 | 1 |
| B1012184 | 130-0003-400 | 5/2/98 | | 13STNB1 | 1 |
| B1012214 | 130-0028-009 | 5/20/98 | | 12STND1 | 1 |
| B1013742 | 130-0003-400 | 5/5/98 | | 13STNB1 | 1 |
| B1013742 | 130-0003-400 | 5/5/98 | | 13STNB1 | 1 |
| B1013876 | 130-0003-400 | 5/19/98 | | 12STNC1 | 1 |

Defects List: 113 Record(s)

Defect
Unique ID: 5202    Defect ID: 392    Operation: 752    HEATER BLOCK ASSEMBLY

Defect
- Level 1: 9 ELECTRONIC
- Level 2: 60 TEST
- Level 3: 566 T507-Part Out of Tolerance
- Level 4: 15
- Info.: U37

Action
- Level 1: 6 ELECTRONIC
- Level 2: 23 ASSEMBLY
- Level 3: 174 RA152-Removed & Replaced Component
- Info.: U37

Personnel Working on This Entry
Detected By: 1352    Inspected By: ____    Reworked By: ____

[Close]

| 2 | MULTIWAVE 4000 | 48 | RECEIVER 3.0 |

FIG.50A

Defects Count

Categories' Defects Count

| Level 1 | Level-1 Defect Description | Level-2 | Level-2 Defect Description | Level-3 | Level-3 Defect Description |
|---|---|---|---|---|---|
| 11 | OPTICAL | 56 | REWORK | 556 | 0144 Incorrect Fiber Routing |
| 9 | ELECTRONIC | 42 | ASSEMBLY | 417 | A104 Cold Solder Joint |
| 12 | SMT | 42 | ASSEMBLY | 434 | A117 Damaged PCB: Track |
| 11 | OPTICAL | 58 | SPLICING TEST | 624 | T805-SLICE LOSS TOO HIGH |
| 11 | OPTICAL | 58 | SPLICING TEST | 609 | T899-Other Splice Test Error |
| 11 | OPTICAL | 56 | SPLICING ASSEMBLY | 528 | 0114 Passive Component |
| 9 | ELECTRONIC | 42 | ASSEMBLY | 442 | A181-Burned, Scorched PWB |
| 11 | OPTICAL | 56 | SPLICING ASSEMBLY | 516 | 0102-Broke Fiber (Too Short |
| 9 | ELECTRONIC | 42 | ASSEMBLY | 445 | A184-Parts Not Mounted Corr |
| 11 | OPTICAL | 56 | REWORK | 607 | T808-No Signal To Detection |
| 12 | SMT | 42 | ASSEMBLY | 428 | A113 Damaged Component |
| 9 | ELECTRONIC | 42 | ASSEMBLY | 446 | A190-Bent Lead |
| 11 | OPTICAL | 45 | CONNECTORIZATION ASSEMBLY | 539 | 0128-Broken Lead |
| 11 | OPTICAL | 56 | REWORK | 453 | C101-Pitted |
| 11 | OPTICAL | 41 | AMPLIFIER V-STACK | 614 | V104-FC/UPC Black Hytrel |
| 11 | OPTICAL | 41 | AMPLIFIER V-STACK | 618 | V108-SC/UPC Red Hytrel |
| 9 | ELECTRONIC | 42 | ASSEMBLY | 610 | T999-Other Electronic Test |

FIG.50B

| Level-3 | Level-3 Defect Description | Level-4 | Level-4 Defect Description | Def |
|---|---|---|---|---|
| 556 | 0144 Incorrect Fiber Routing | 15 | | 1 |
| 417 | A104 Cold Solder Joint | 20 | Vendor Responsible | 1 |
| 434 | A117 Damaged PCB: Track, Pad | 15 | | 1 |
| 624 | T805-SLICE LOSS TOO HIGH (LEAD OF LASER TOO | 15 | | 1 |
| 609 | T899-Other Splice Test Error | 15 | | 1 |
| 528 | 0114 Passive Component Defect | 15 | | 1 |
| 442 | A181-Burned, Scorched PWB or Component | 20 | Vender Responsible | 1 |
| 516 | 0102-Broke Fiber (too Short From Laser) | 15 | | 1 |
| 445 | A184-Parts Not Mounted Correctly | 20 | Vender Responsible | 1 |
| 607 | T808-No Signal To Detection On Channel | 15 | | 1 |
| 428 | A113 Damaged Component | 15 | | 1 |
| 446 | A190-Bent Lead | 20 | Vender Responsible | 1 |
| 539 | 0128-Broken Lead | 15 | | 1 |
| 453 | C101-Pitted | 15 | | 1 |
| 614 | V104-FC/UPC Black Hytrel Damaged | 15 | | 1 |
| 618 | V108-SC/UPC Red Hytrel Damaged | 15 | | 1 |
| 610 | T999-Other Electronic Test Error | 15 | | 1 |

DATA ANALYZER SYSTEM AND METHOD FOR MANUFACTURING CONTROL ENVIRONMENT

BACKGROUND OF THE INVENTION

1. Field of the Invention

The present invention generally relates to a system and method for analyzing data, and more particularly, the present invention relates to a system and method for analyzing data derived from a manufacturing control environment in which large amounts of raw data are generated in the course of controlling a manufacturing facility.

2. Description of the Related Art

FIG. 1 is a perspective view of the basic component parts of the workstation described in co-pending and commonly assigned application Ser. No. 09/006,443 (now U.S. Pat. No. 6,188,402), filed Jan. 13, 1998, the subject matter of which is incorporated herein by reference for all purposes. A workstation 100 generally includes a computer terminal 101 and test equipment 102. The computer 101 has a display 103 for display of a variety of graphical user interfaces (GUI's) of the invention, as well as the usual input devices such as a mouse 104, a keyboard 105 and a bar code reader 106. In addition, cable connectors 107 provide a mechanism for interfacing the computer 101 with the test equipment 102. In addition, the workstation includes an assembly platform 108, which may include automated manufacturing equipment 109 and/or sensors and actuators for the assembly of component parts by the assembler 110. Any automated manufacturing equipment is also under control of the computer 101 via cables 107.

Generally, as shown in FIG. 2, a plurality of workstations 100 will be arranged in multiple rows in a manufacturing facility. In most cases, a device will be assembled in stages starting at the first station 100 of a row. The device is passed down the row from station-to-station at the completion of each assembly stage. Each assembly stage will typically include multiple assembly steps and one or more test measurements. A unique serial number may be fixed to the device or its carrier to trace its progress through the manufacturing cycle.

Each work station is characterized by the inclusion of software for interactively providing work instructions to the user and for integrating the test and measurement functions, thus providing a mechanism for forced reading by the worker and cross-checking of worker steps. The software may be resident at the workstation computer, but is preferably download over an assembly plant network. Networking provides a number of advantages, including global downloading of instructional updates and ease in tracing the progress of individual assemblies.

Assume by way of example that a workstation is configured for the splicing of an optical fiber to an optical amplifier. This process stage might consist of multiple process steps. A graphical user interface of the computer 101 displays each of the steps in sequence as they are completed. Further, in the case where a test and measurement function is called for upon the completion of a step, the computer 101 is programmed to setup the test, perform the test and verify that the testing has indeed been completed and that the test results are within acceptable parameters.

FIG. 3 is a diagram for describing a communications network which may be employed and is described in co-pending and commonly assigned application Ser. No. 09/020,512, filed Feb. 9, 1998 (now U.S. Pat. No. 6,167, 401), the subject matter of which is incorporated herein by reference for all purposes. A local area network (LAN) 302 serves users (i.e. workstations), typically within the confined geographic area of an assembly plant. That is, the LAN 302 is made up of a server 304, the workstations 306, a database server 304, a network operating system 310, and a communications link 312.

The network operation system 310 is the controlling software in the LAN 302, such as the well-known NetWare or UNIX operating systems, and a component part of this software resides in the workstations 306. The operating system 310 allows the application program running in each workstation 306 to read and write data from the server 308 as if it were resident in at the workstation 306. The communications link 312 is implemented by cable, such as fiber, coax or twisted pair, and physically interconnects the server 304 and workstations 306 via network adapters (not shown). It is noted that multiple types of LAN configurations and transport protocols may be used to implement the network and are well known in the networking art.

The database server 304 includes the database management system DBMS 316 and the database 314. The DBMS 314 accepts requests from the application programs (which may be resident at the server 304 or the workstations 306), and instructs the operating system 310 to transfer requested data to and from the application programs. The DBMS 316 also controls at least the organization, storage and retrieval of the data stored in the database 314.

A salient feature of the manufacturing control network resides in the data structure in which the work instructions and related information are stored in the database. In particular, the network is preferably a relational data base driven system providing process flexibility. The data structure allows for the alteration and/or addition of products, serial numbers and process step, as well as the work instructions, test files and automated manufacturing steps associated with each product, serial number and work instruction, without having to rewrite or alter the underlying code of the manufacturing control station. In other words, the operational code functions independently of the content presented to the user in the form of graphical interfaces and applied to the work station, as well as independently of the content of the automated tests and manufacturing functions.

This aspect is explained further with reference to FIG. 4. The upper cube is representative of a three-dimension tracking table of the database. The table is said to have three dimensions in that there are three related pieces of information stored therein in table form. In particular, the tracking table identifies the type of product (e.g., amplifier), the serial number of the product, and the process steps associated with the product. To retrieve a given process step for the workstation, the input selected product and process, as well as the scanned-in serial number, are used to link to the selection of action items contained in an action table of the database. The action table, which also may also be represented as a three-dimensional table, is shown as the bottom cube in FIG. 4 and contains works instructions, graphics, video and other media, test files, and automated manufacturing files. The underlying code of the manufacturing control station of the invention is essentially driven by the data retrieved from the tracking and action tables. Thus, the contents of the tables may be freely updated without reworking the program code itself. For example, graphics may be changed or work instructions updated by changing the table contents, without any additional programming effort.

The manufacturing control system may use time stamped action and tracking tables for use in selectively pulling data for any networked workstation. That is, an additional pointer may be used that is locked to the date for every entry in the tracking and action tables. This allows the most recent data to be extracted in execution of the assembly processes.

The communications system described above allows for any workstation within the manufacturing control system to be configured for the new, reworked or restarted optoelectronic assemblies. Also, the system controls data traffic for the multiple networked workstations so that reconfiguration of any one work station for a modified or new process is feasible from both the workstation or a remote location.

The manufacturing control system described above in connection with FIGS. 1–4 generates an enormous amount of raw data. This raw data includes data describing the pass/fail performance of each board associated with each process and each individual assembler of the plant. While it is possible for individuals to access the raw data for their own purposes, and try to analyze the data, such would be cumbersome in the extreme. That is, in the absent of an analysis tool, there is no practical way of analyzing the raw data.

SUMMARY OF THE INVENTION

It is an object of the present invention to provide a system and method for analyzing data derived from a manufacturing control environment in which large amounts of raw data are generated in the course of controlling a manufacturing facility.

According to one aspect of the invention, a system is provided for analyzing raw data derived from a manufacturing control facility, the manufacturing control facility for manufacturing at least one device by execution of a sequence of operations, the system including at least one user terminal; a preprocessor which receives the raw data from the manufacturing control facility and which configures the raw data into a predetermined database format; a database for storing the raw data after being configured by said preprocessor; a server which transmits queries and results between said database and said at least one user terminal; and at least one graphical user interface at said user terminal which displays the results transmitted by said server, the results indicative of at least one performance parameter of the operations.

According to another aspect of the invention, a method is provided for analyzing raw data derived from a manufacturing control facility, the manufacturing control facility for manufacturing at least one device by execution of a sequence of operations, the method including receiving the raw data from the manufacturing control facility and using a preprocessor to configure the raw data into a predetermined database format; storing the raw data after being configured by said preprocessor into a database; using a server to transmit queries and results between said database and at least one user terminal; and displaying on at least one graphical user interface at said user terminal the results transmitted by said server, the results indicative of at least one performance parameter of the assembly operations.

According to yet another aspect of the invention, the results displayed by said graphical user interface are indicative of an output ratio of each operation, wherein $$Output\ Ratio = \frac{\text{The number of boards manufactured by an operation}}{\text{The number of boards processed by the operation}}$$

According to still another aspect of the invention, the results displayed by said graphical user interface are indicative of at least one of a success ratio and a failure ratio of each operation, wherein $$Success\ Ratio = \frac{\text{Total number of boards processed successfully}}{\text{The number of boards processed}}$$

$$Failure\ Ratio = \frac{\text{Total number of boards processed unsuccessfully}}{\text{The number of boards processed}}$$

According to another aspect of the invention, the results displayed by said graphical user interface are indicative of a first pass yield of each operation, wherein $$First\ Pass\ Yield = \frac{\text{Number of boards that passed an operation on the first pass}}{\text{Total number (distinct) boards that have been processed}}$$

According to yet another aspect of the invention, the results displayed by said graphical user interface are indicative of a weighted average, wherein $$Weighted\ Average = \text{The average number of times that a specific board type has been processed for a specific operation before it passed}$$

According to yet another aspect of the invention, the results displayed by said graphical user interface are indicative of an average cycle time of each of the sequence of operations.

According to yet another aspect of the invention, the graphical user interface is further for displaying a listing and status of all devices processed during a selected time period.

According to yet another aspect of the invention, the graphical user interface comprises a filter icon for generating a list of devices resulting in defined performance criteria of selected ones of said operations.

According to yet another aspect of the invention, the graphical user interface is further for displaying a defects summary of the operations.

According to yet another aspect of the invention, the preprocessor is further for determining a pass/fail performance of each operation based on the raw data, and for storing the thus determined pass/fail performances as entries in the database.

BRIEF DESCRIPTION OF THE DRAWINGS

The above and other aspects and features of the present invention will become apparent from the detailed description that follows, with reference to the accompanying drawings, in which:

FIG. 17 is an example of a window depicting time statistics for a specific operation;

FIG. 27 is an example of a window depicting a table for tracking serial numbers for a selected time period;

FIG. 28 is an example of a window showing a tabulated list of serial numbers for a selected time period;

FIG. 31 is an example of a window depicting a tabulation of module types and serial numbers resulting from a filtering operation;

FIG. 33 is an example of a window depicting a tabulation of level 1 defects;

FIG. 35 is an example of a window depicting a tabulation of defects in level 3;

FIG. 36 is an example of a window depicting a tabulation of defects in level 4;

FIG. 41 is an example of a window depicting a tabulation of defect and action descriptions;

FIGS. 47A–47B are an example of a window showing a tabulation of defect counts based on action information;

FIG. 48 is an example of a window showing a defects log;

FIGS. 50A–50C are an example of a window depicting a tabulation of defect counts based on categories;

DETAILED DESCRIPTION OF THE PREFERRED EMBODIMENTS

The present invention is directed to a data analyzer software system that provides the capability to monitor all aspects of production by personnel on the floor, and by engineers and managers either on the production floor or in their respective offices. In an embodiment of the invention, this tool makes facilitates monitoring of the production activity, including evaluating productivity, conducting a time study, and obtaining production reports/flow.

The software system of an embodiment of the invention collects, classifies and interprets data collected from the production lines, and a graphical user interface of the software system provides a user friendly environment for the user to employ for all production applications. An example of a production environment to which the present invention may be applied was previously described in connection with FIGS. 1–4. The data analyzer may similarly be applied to other manufacturing systems which generate large amounts of raw data.

The data analyzer may include a number of different useful branches or basic applications. By way of example only, the data analyzer may be made up of a production analyzer, an defects analyzer, and an engineering analyzer. The production analyzer provides a number of statistical measures about how the production line is operating. The engineering analyzer allows the user to go into the system and search, not by product type, but instead by fundamental technology. For example, the user may want to look at the statistical insertion loss of a particular type of splice regardless of what the product is. The defects analyzer provides statistical data on a variety of defects encountered during production.

In the description that follow, the system architecture of the data analyzer of one embodiment of the invention is first discussed. Then, a number of exemplary applications are described, together with a number of examples of various graphical user interfaces.

System Architecture

Figure 1:
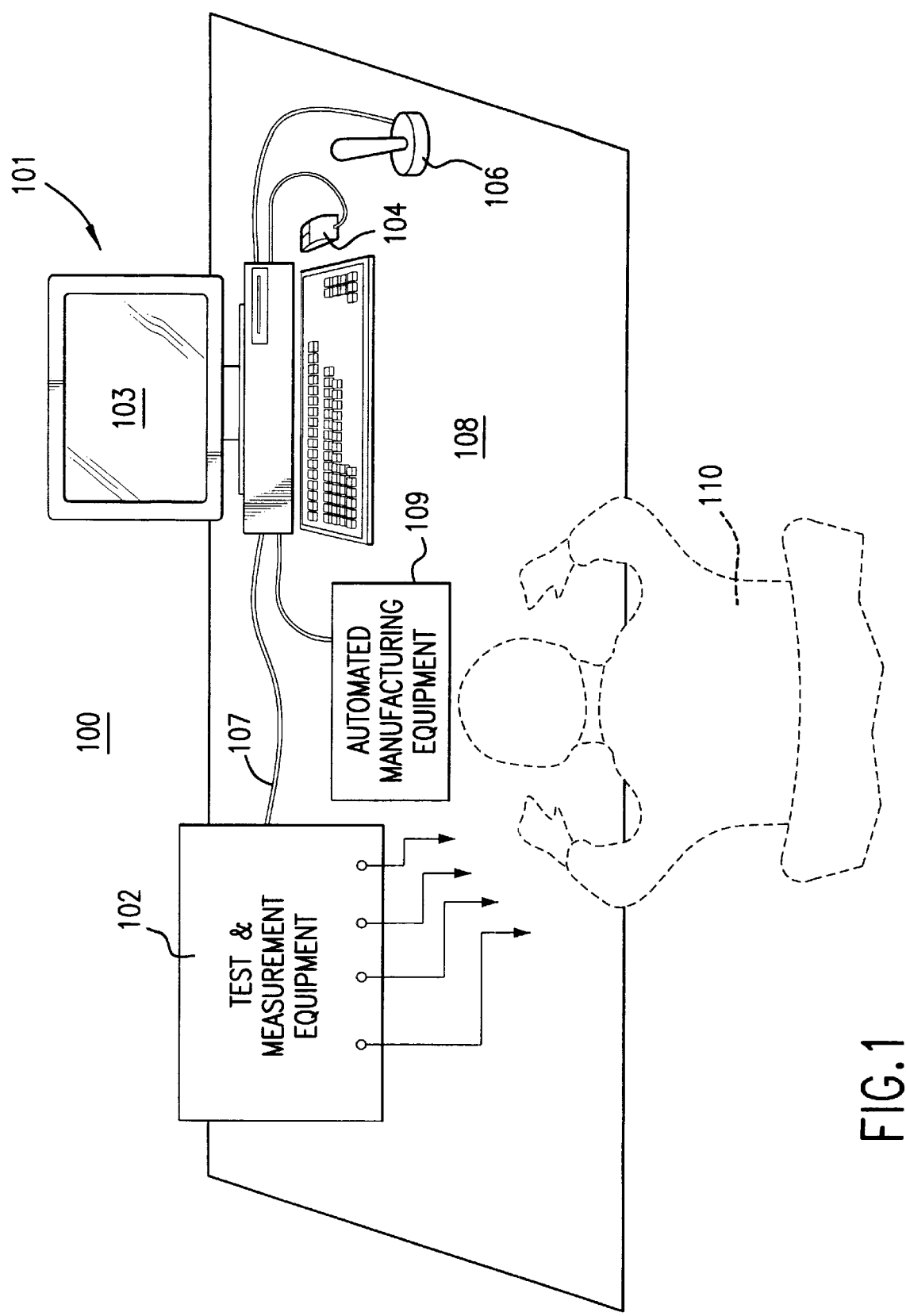
FIG. 1 is a perspective view of a manufacturing work station.
Figure 2:
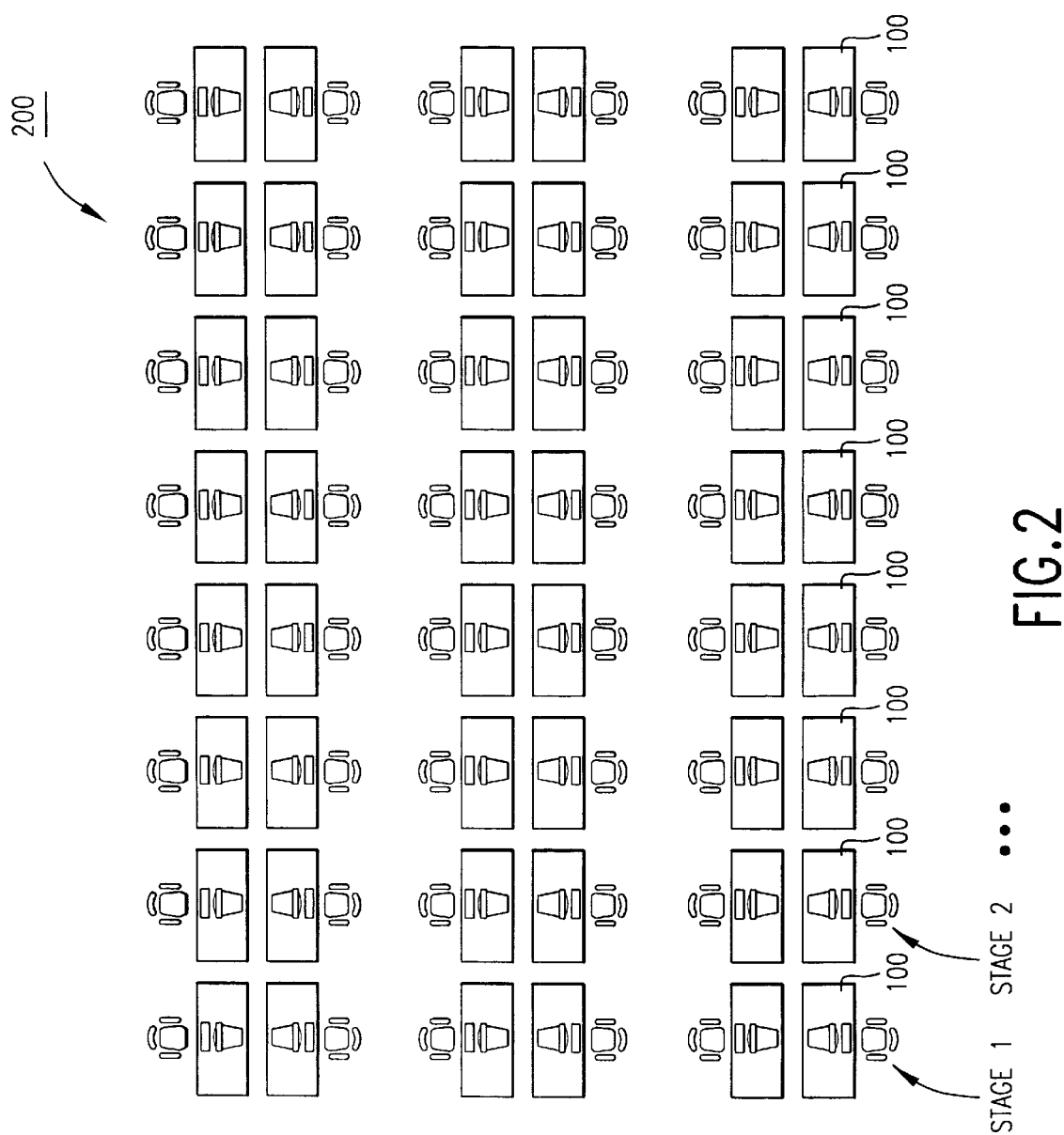
FIG. 2 is a perspective view of a manufacturing floor containing multiple manufacturing pipelines.
Figure 3:
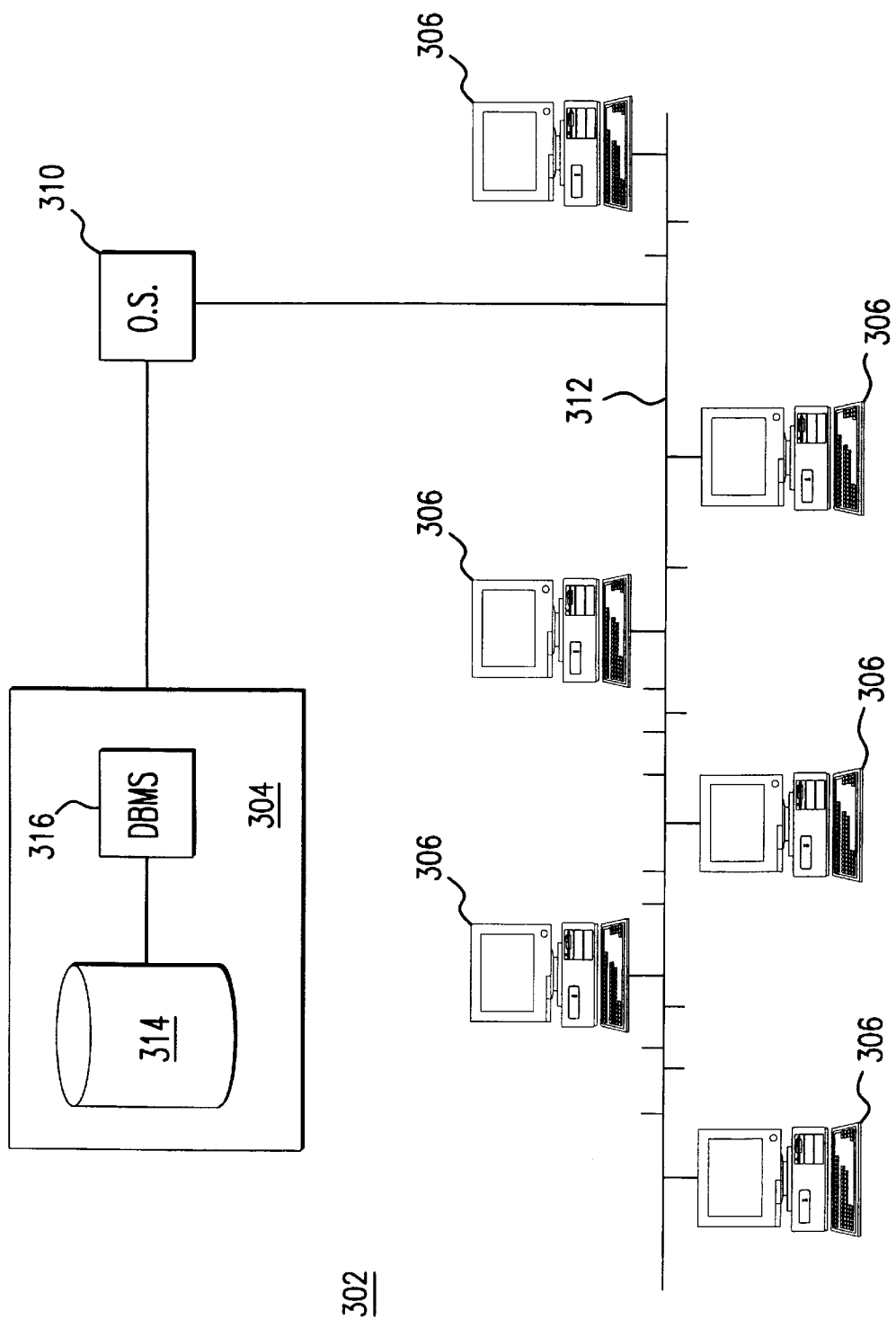
FIG. 3 is a diagram showing a manufacturing control network.
Figure 4:
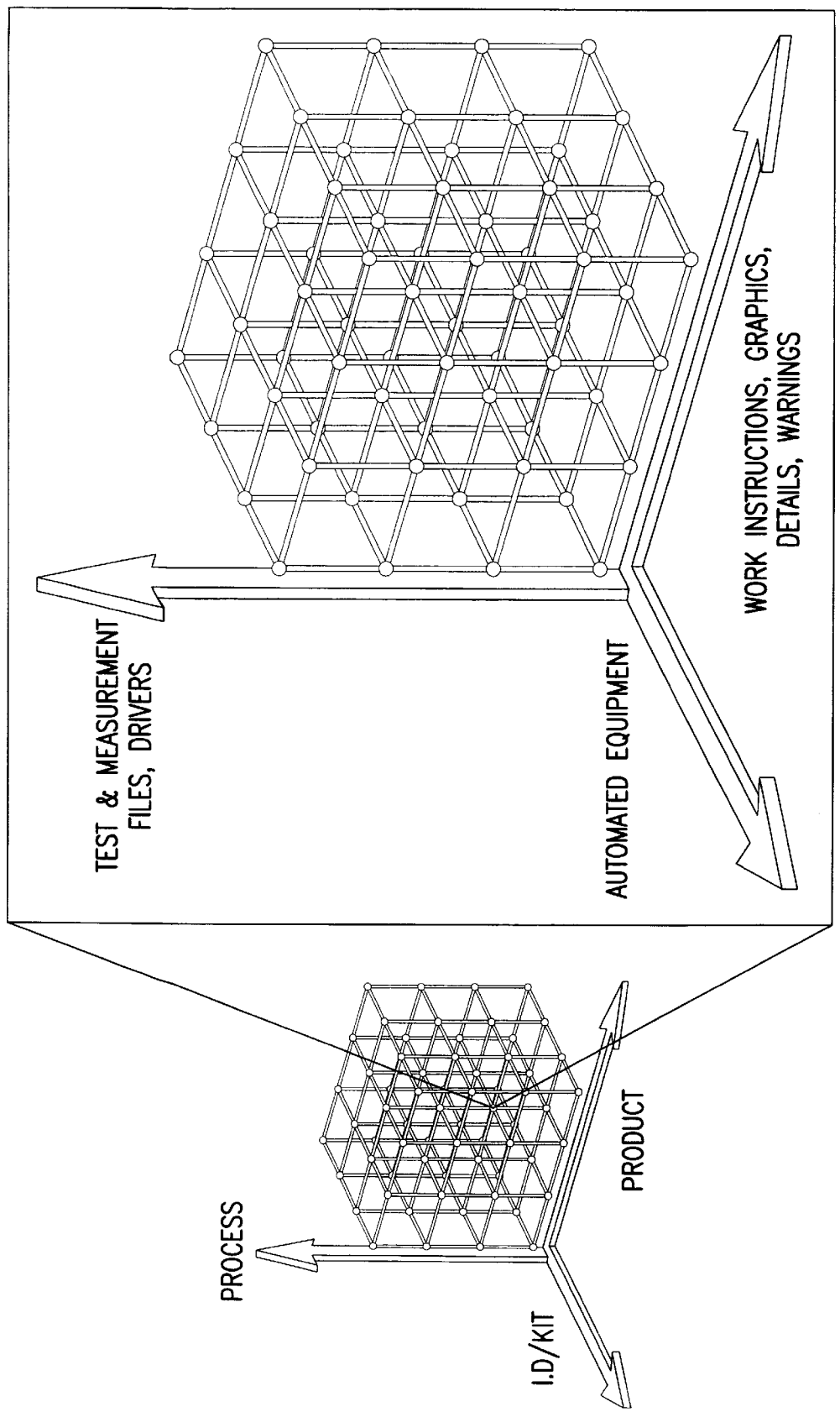
FIG. 4 is a diagram showing the relationship between tracking and action tables for storing data.
Figure 5A:
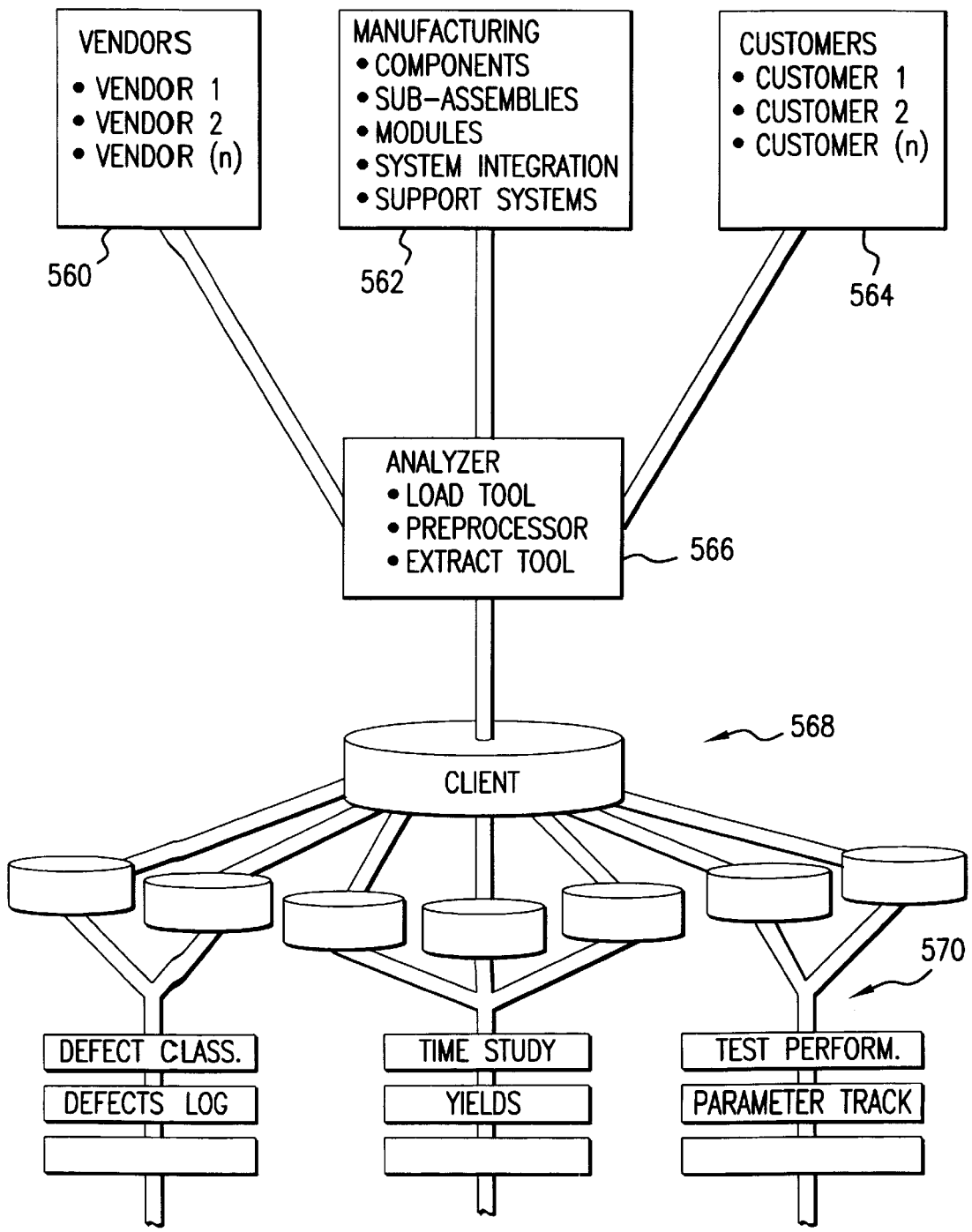
FIGS. 5(a) and 5(b) illustrate an architecture of the data analyzer according to an embodiment of the present invention.
Figure 5B:
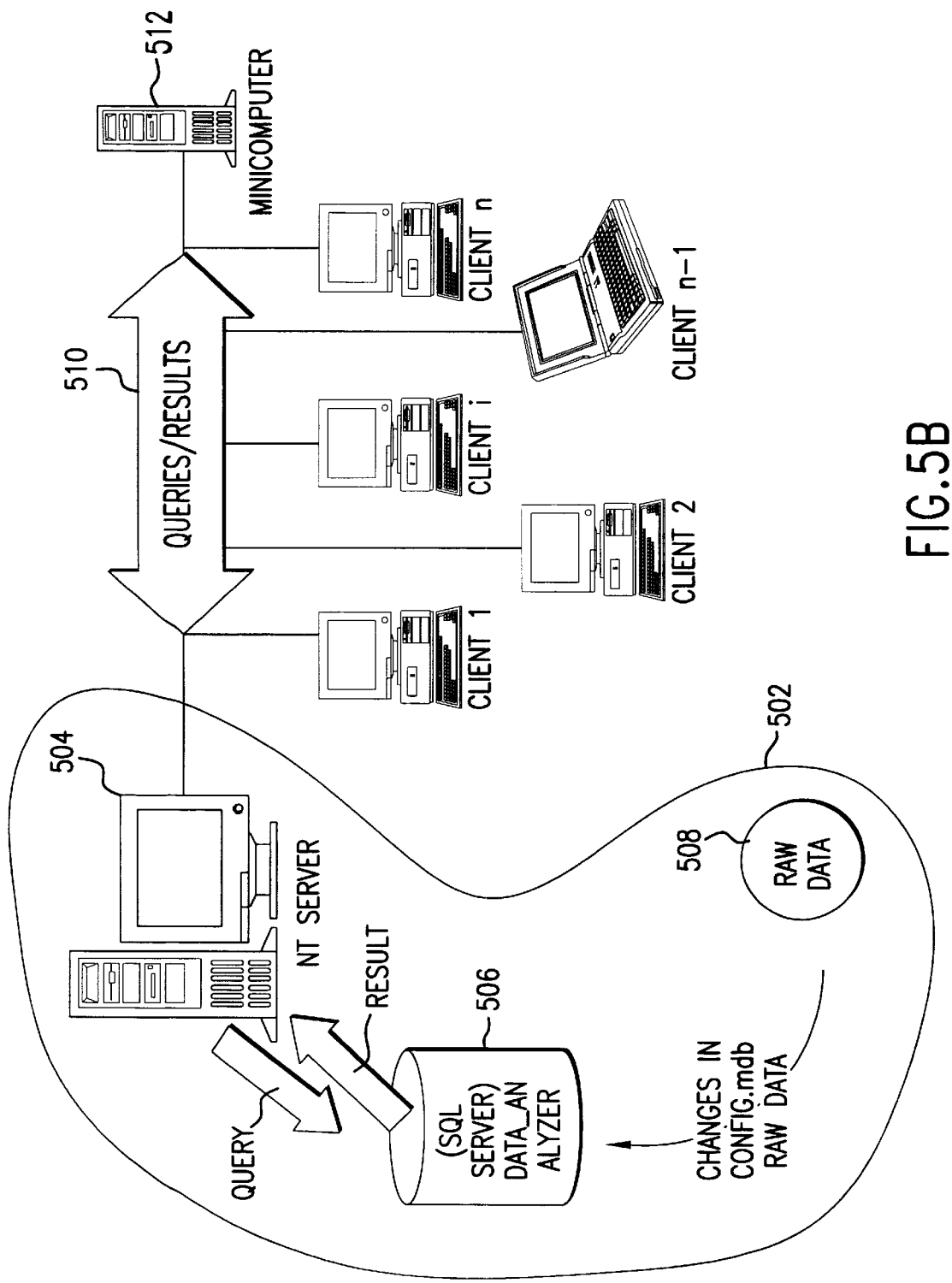

FIGS. 5(a) and 5(b) illustrate the overall software system architecture in an embodiment of the data analyzer of the present invention.

Referring first to conceptual illustration of FIG. 5(a), reference numerals 560, 562 and 564 illustrate an number of external data bases containing raw data. Examples of raw data are provided later in this description. In this embodiment, the external data bases include a vendor data base(s) 560, a manufacturing data base(s) 562, and a customers data base(s) 564.

Reference numeral 566 denotes the data analyzer of the invention. A load tool of the analyzer functions to access the external data bases (e.g., on a dial-up basis), and requests any new raw data which may be resident in the external data bases. The data base management system (DBMS) of each external data base responds to the requests of the load tool and sends the requested data to the analyzer 566.

The analyzer further includes a preprocessor and an extract tool. The processor is described in greater detail later, and function to convert the raw data into a format suitable for analysis and report generation. The extract tool is responsive to requests from a number of clients 568 to send the converted raw data to the clients 568 for analysis and report generation, such as those shown by reference numeral 570.

Turning now to FIG. 5(b), reference number 502 denotes an NT server environment having an NT server 504 which sends queries to and receives results from an SQL server of data analyzer database 506. Raw data 508 (which may be periodically updated) is pre-processed as explained below and stored in the database 506. Queries/results 510 are passed back and forth between the NT server environment 502 and a number of clients 1–n. The clients are the users of the analyzer, including, for example, production managers, engineering personnel, and even individual assemblers on the production floor. Manufacturing on-line users, line leaders, production managers, engineers, operations engineers, quality engineers, etc., are exemplary of clients. Reference number 512 denotes a minicomputer.

Figure 6:
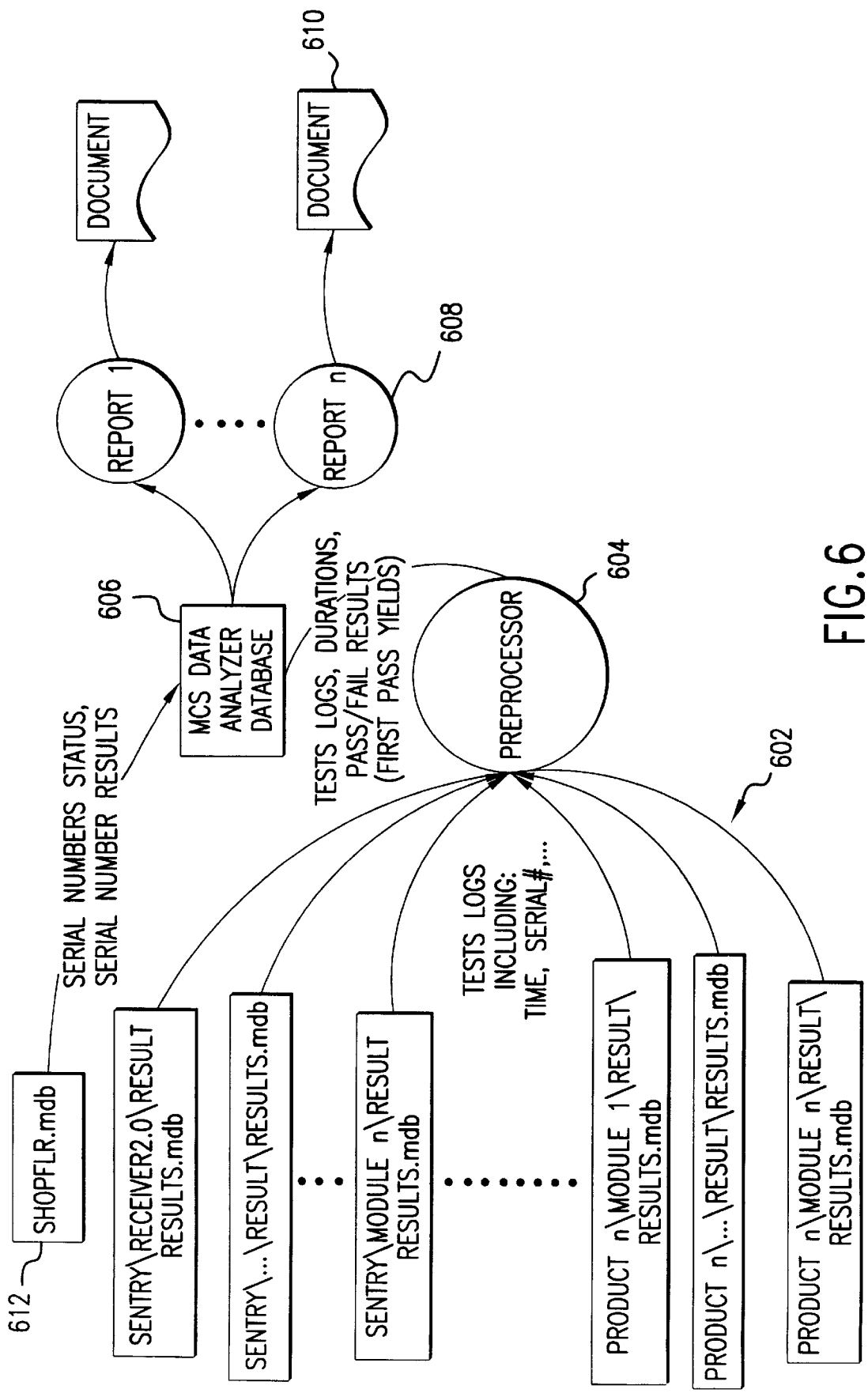
FIG. 6 illustrates the process flow of the data analyzer according to an embodiment of the present invention.

FIG. 6 shows how the data is collected, sent to the preprocessor, and put into the data analyzer database. That is, reference number 602 denotes the raw data derived from the manufacturing control network. Generally, this data is in the form of test logs, including time and date information, serial numbers, products, modules, etc. In the figure, for example, "SENTRY\RECEIVER2.0\RESULT\RESULTS.mdb" is the raw data associated with the receiver 2.0 module of the SENTRY™ optical communications product. Likewise, "product n\module 1\RESULT\RESULTS.mdb is the raw data associated with module 1 of product n. This raw data is applied to a preprocessor 604 which configures the raw data into a format which may be stored in the data analyzer database 606. Serial number status information and serial number results information ("shopflr.mdb") is also transmitted to the preprocessor 604. Then, from the data analyzer database 606, various reports 608 and corresponding documents 610 are generated. Reference numeral 612 represents raw data which already formatted in a manner which is usable by the analyzer 606, i.e., raw data which does not need to be subjected to preprocessing.

From a user perspective, the data analyzer system may easily accessible by selecting "data analyzer" from the "Programs" on a Windows operating environment (for example) to cause a data analyzer main screen (menu) appear on the computer monitor. Optionally, each user may have a unique user name and password. The interface for the system may show a list of all the products ("product lines"), allowing the user to pick any product line for which they would like to conduct a study. In this case, clicking on any product line brings up a screen showing the modules which make up the selected product line. Also, clicking on any of the modules will bring up another screen showing the assembly operations for the module. By selecting a module in this fashion it is possible to examine each pipeline of the production floor, i.e., each pipeline used to manufacture one module.

Figure 7:
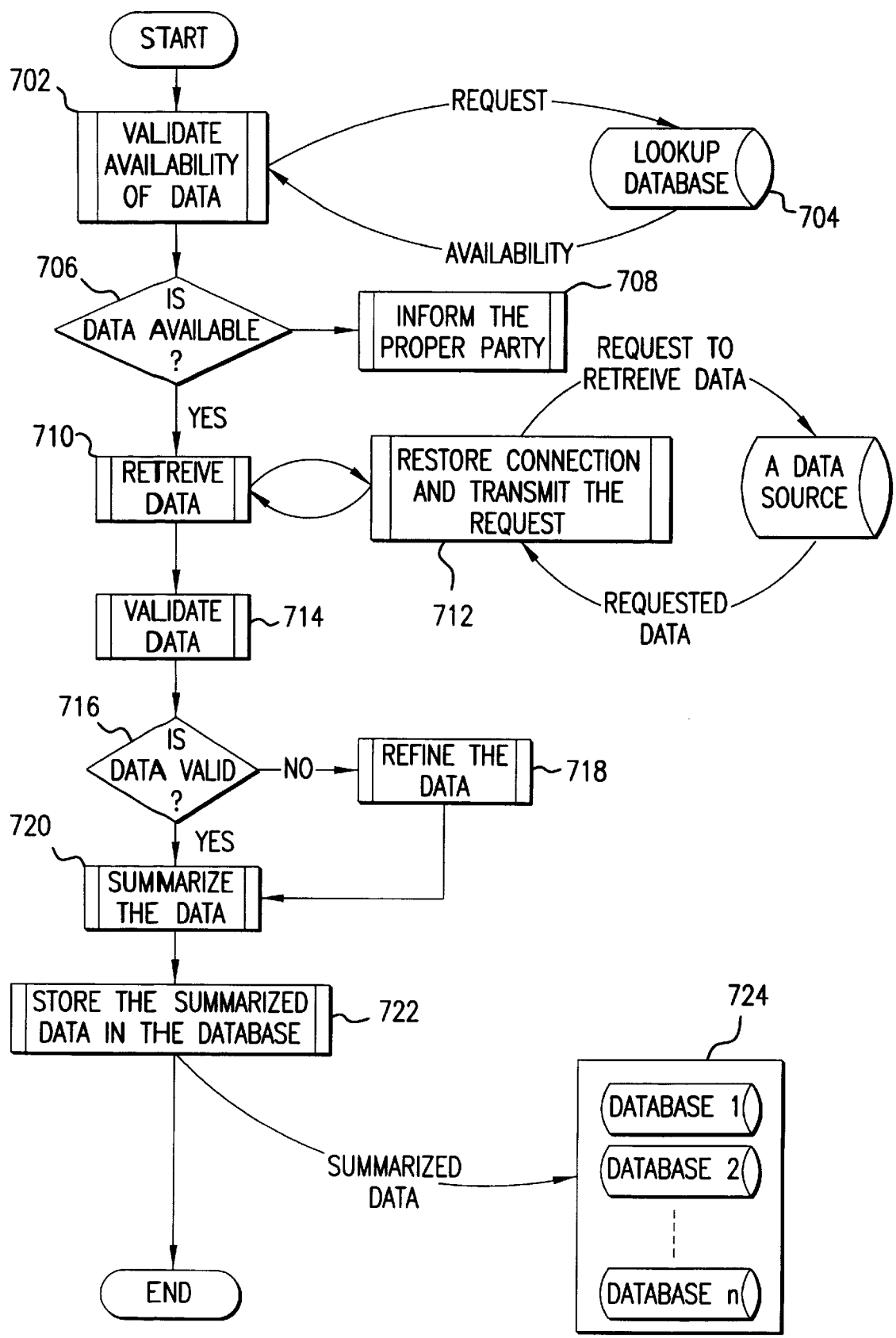
FIG. 7 depicts a logic design of a preprocessor according to an embodiment of the present invention.

FIG. 7 illustrates a functional design flow of an embodiment of the preprocessor of the invention. At 702, the preprocessor validates the availability of data by sending requests (over a proper connection) to a raw data source, such as a lookup data base 704. The lookup database contains information needed to connect to data sources, such as databases that reside at the manufacturing facility and on the customer/vendor sites. If the requested data is not available at 706, the proper party is informed at 708. The proper party could be a customer site, a vendor site, a manufacturing site, or any other appropriate party. If the data is available, the preprocessor proceeds to retrieve the data at 710. This is done by restoring the connection and transmitting a request to retrieve the data at 712. The request is received at a data source 714, which then forwards the data to the preprocessor. The data source is a database in any format such as the formats used in ORACLE™, SQL SERVER™ ACCESS™, DBASE™, etc. database programs.

Next, at 716, the preprocessor accesses rules associated with each operation for data validation. At 718, if the data is not valid, the preprocessor proceeds to 720 to refine the data. Here, different techniques may be used to refine the data. For example, if the duration of an operation is not a valid number (e.g., the duration appears as a negative number), a moving average of historic data can be used instead. If the data is valid, or if the data has been refined, the preprocessor then proceeds to summarize the data at 722. As discussed below with regard to FIG. 8, this process is carried out in several steps, and coverts the data into a format suitable for output to the analyzer databases. Then, at 724, the summarized data is stored in databases 726. As illustrated, many databases may be used to store the data. Further, the physical location of these databases is not limited to any single geographic location.

Figure 8:
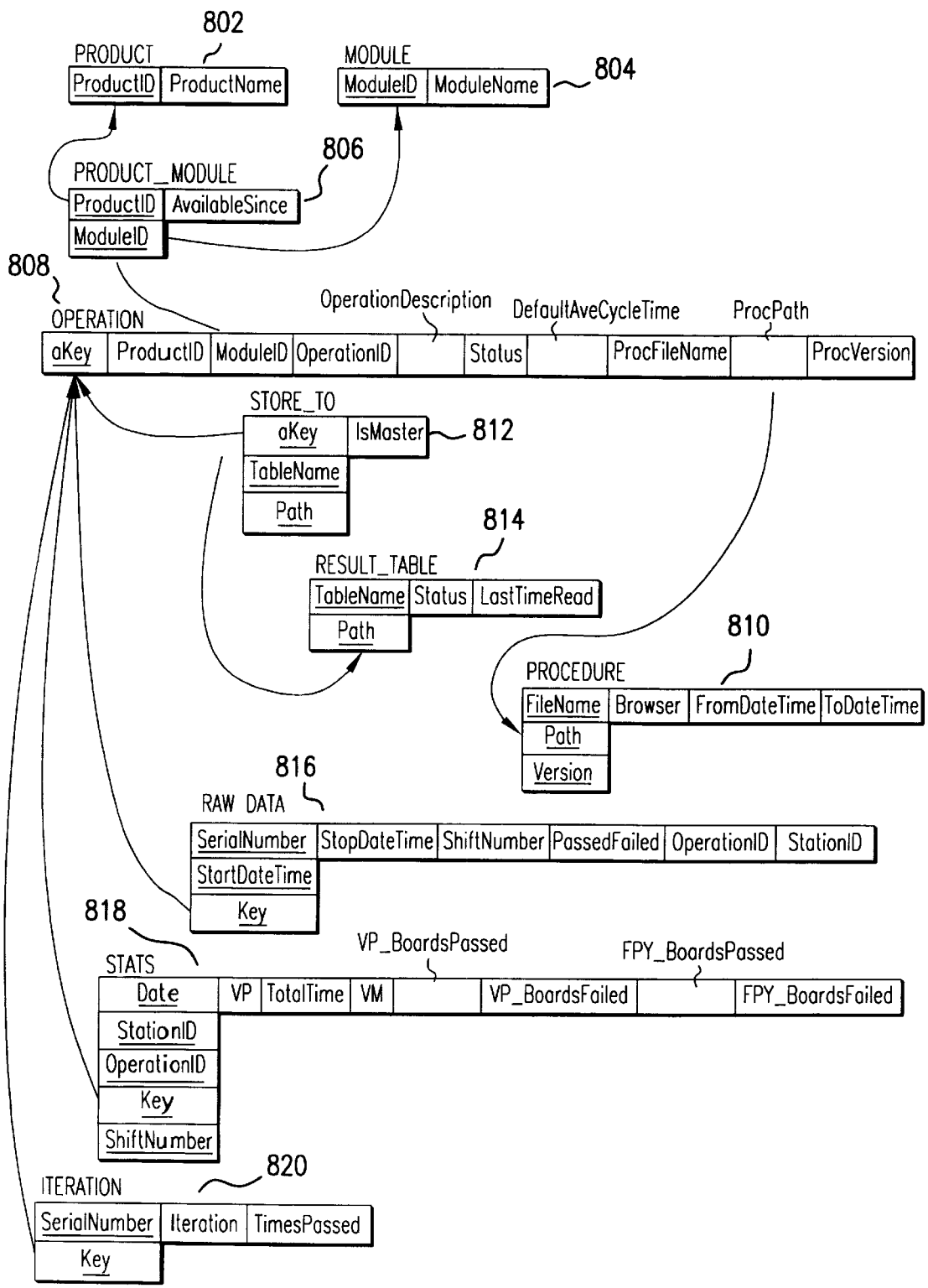
FIG. 8 illustrates the structure of the database of the data analyzer according to an embodiment of the present invention.

FIG. 8 illustrates an example of the relationships between raw data and summarized data according to an embodiment of the present invention. That is, the diagram shows the interrelationships of selected database tables that are generated in the embodiment.

A Product table 802 relates product ID's to product names, whereas a Module table 804 relates module ID's to module names. Typically, a single product is formed of multiple modules, and a Product_Module table 806 shows the module ID's associated with each product ID.

Each module is subjected to multiple operations which are identified as records in an Operations table 808. In the embodiment, the Product ID, the module ID and an Operation ID are together identified by a unique "key". Also, as illustrated, the Operation table 808 may further include fields for an operation description, a status of the operation (active or inactive), default values (such a default average cycle time), a procedure file name, a path to the procedure, and a process version.

Each operation has a procedure associated therewith as defined in a Procedure table 812. This table includes a file name of the procedure, the path to the file, and its version. The table also identifies the browser that is needed, such as an internet browser or a Web browser, as well as starting and ending dates for which the procedure is deemed to be valid.

A Store_to table 812 specifies to which tables and associated paths the data of each unique key is to be stored, as well as specifying which operation is considered a master operation (in the case where multiple operations store their data to the same table, to thereby avoid reading the same table multiple times for multiple operations.)

Results of operations (i.e., the raw data) are stored in multiple Results tables 814. Each of these tables identifies a table name, a path thereof, its status, and the last time it was read. (Examples of these tables are identified by reference number 602 in FIG. 6.)

The Raw_data table 816 contains "summarized" raw data. In this example, this table includes the serial number of the board being processed, a start date, and a key (product ID, module ID, and operation ID). The table 816 may also include a stop date, shift number, pass/fail result, operator ID, and station ID. Although not shown, the raw data also includes all the measurement results of the tests associated with each operation. The types of tests will vary from operation to operation, and accordingly, the contents of the Raw_data tables will vary as well. The preprocessor determines from the test data whether or not a operation has passed, and places the result in the corresponding pass/fail field.

In the embodiment, a Stats table 818 is continuously updated for each key. This table includes a number of fields to be used to generate the various reports described herein. In this example, the table 818 includes the date, the station ID, the operator ID, the shift number, and the associated key. Also included are entries for the volume of boards processed, the total process time, the volume of boards manufactured (passed), the number of operations that resulted in a passed board, the number of operations that resulted in a failed board, the number of boards that passed an operation the first time, and the number of boards that failed an operation the first time. (These fields will be more clearly understood from that the description of the user interfaces that follows herein.)

An example of another table that may be used is an Iterations table 820 that tracks the number of times a board (serial number) is subjected to a particular operation (key), as well as the number of times the board passed the operation.

The software of various aspects of the data analyzer will now be described with respect to functional modules which make up an embodiment of the present invention. As should be appreciated, the modules described below are primarily implemented as self-contained software components interacting within the system as a whole. The modules are programmed as described below to handle specific tasks within the system. Of course, combinations of hardware and software component implementations are possible, as well as combining two or more modules into single but more complex modules.

Figure 9:
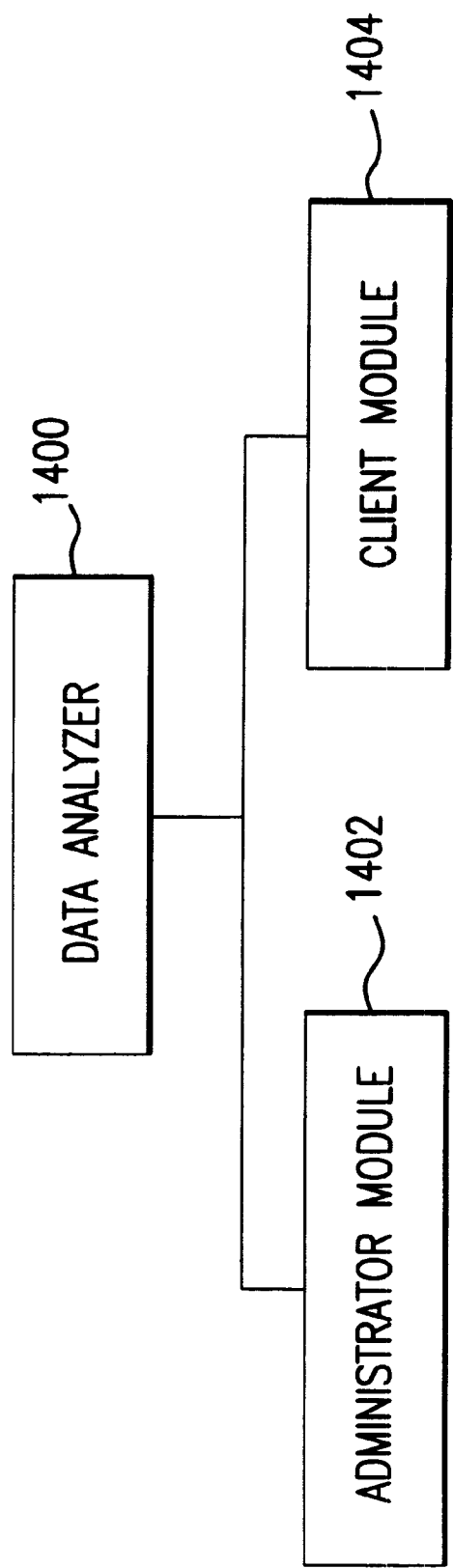
FIG. 9 is a block diagram of the basic functional modules of the data analyzer of an embodiment of the present invention.

As shown in FIG. 9, the data analyzer 1400 is functionally configured by two primary modules, i.e., the administrator module 1402 and the client module 1404. The administrator module 1402 functions to administer the data analyzer system, whereas the client module 1404 provides the data calculations and 285 presentations to the user.

Figure 10:
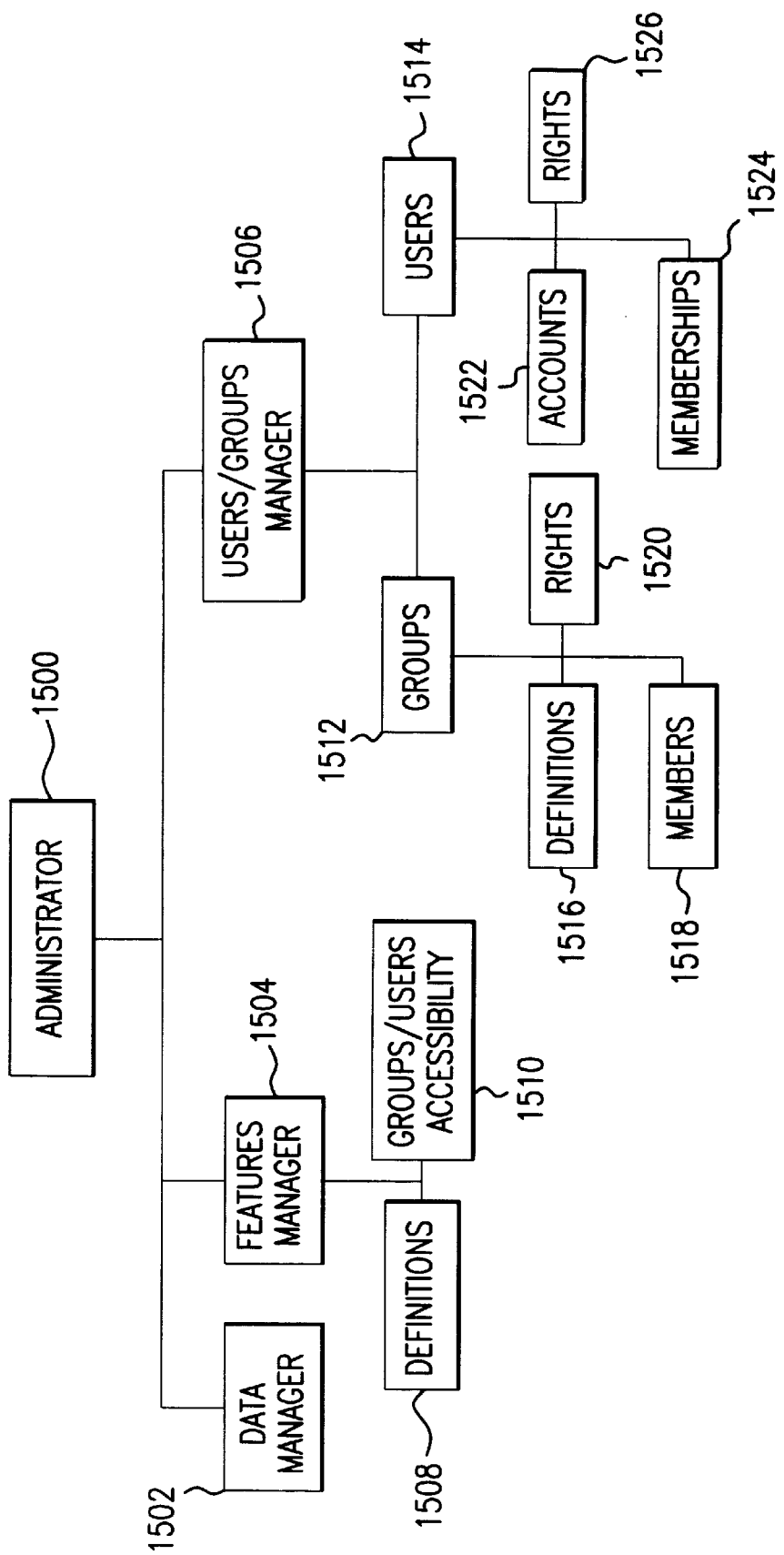
FIG. 10 is a functional block diagram of the administrator module of an embodiment of the present invention.

As shown in FIG. 10, the administrator module 1500 is made up of three main modules, i.e., the data manager module 1502, the features manager module 1504, and the users/groups manager 1506. Each of these modules is discussed in detail below.

The data manager module 1502. This module is described later with reference to FIG. 11.

The features manager module 1504. The administrator module 1500 is configured much like a network operating system, in which many groups are defined in the enterprise, with each group have predefined rights. For example, a particular group may not need to know about average cycle time of operation. Rather, the group may only need to access data concerning serial numbers exhibiting malfunctions. As such, the features manager module includes definitions 1508 of features of the software, as well as defining groups and user accessability 1520 to the features.

The user/groups manager module 1506. Each user can be a member of one or more groups. The user has rights based on the rights of the user's member groups. In this way, the accessibility of the data to the end users is defined. In addition, to add flexibility to the system, each user may have individualized rights assigned, thus applying more features to the specific user. The user/groups manager module 1506 includes data defining groups 1512 and individual users 1514. The groups 1512 data includes definitions 1516 of each group, the members 1518 of each group, and the assigned rights 1520 of each group. The users 1514 data includes account information 1522 of each user, the group memberships 1524 of each user, and any individual rights 1526 assigned to each user.

Figure 11:
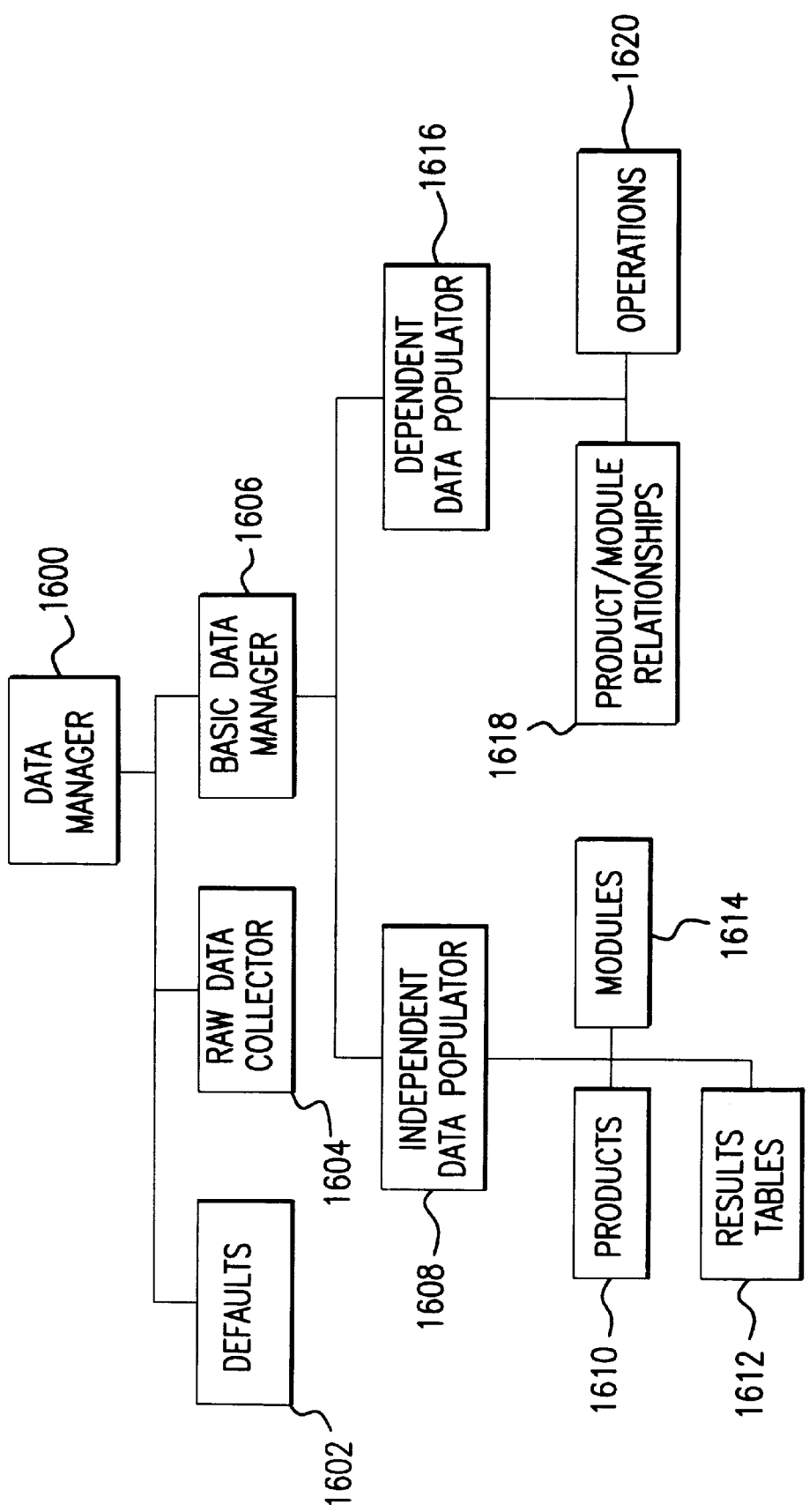
FIG. 11 is a functional block diagram of the data manager module shown in FIG. 15 according to an embodiment of the present invention.

Referring now to FIG. 11, the data manager module 1600 includes a defaults module 1602, a raw data collector module 1604, and a basic data manager module 1606. Each of these modules is discussed in turn below.

The defaults module 1602. Sometimes raw data is collected which cannot be "true". For example, in certain cases a small portion of the data may come in as a negative number which does not make any sense. Rather than discarding the entire set of data, defaults are applied to the nonsensical data. For example, if the cycle time of an operation comes in as a negative number, then a predetermined default of "x" minutes may be used instead. The defaults module 1602 defines defaults to be used in such instances.

The raw data collector module 1604. This module retrieves the raw data from the databases of the manufacturing control network. As previously discussed, the raw data includes all the data collected in the manufacturing lines. This, for example, includes data describing the pass/fail performance of each board associated with each process and each individual assembler of the plant.

The basic data manager module 1606. Basic data includes the basic relationships of the manufacturing process. For example, the analyzer system needs to know what constitutes the various the product lines, the relationships between given operations and given modules (i.e., boards, etc.). The basic data manager 1606 manages these kinds of basic data. In an embodiment of the invention, the basic data manager 1606 is divided into two categories, i.e., an independent data populator 1608 and a dependent data populator 1616. The independent data populator 1608 retrieves the data of the database of the manufacturing control system and processes the data to come up with the products 1610 being manufactured, the modules 1614 being manufactured, and results tables 1612 showing the actual test results of the manufacturing processes. Also, if there is any change in that data, the independent data populator detects the same. The dependent data populator 1616 contains dependent data showing the relationships 1618 between the products and modules, as well as operational relationships 1620 between operations and each module of each product line.

Figure 12:
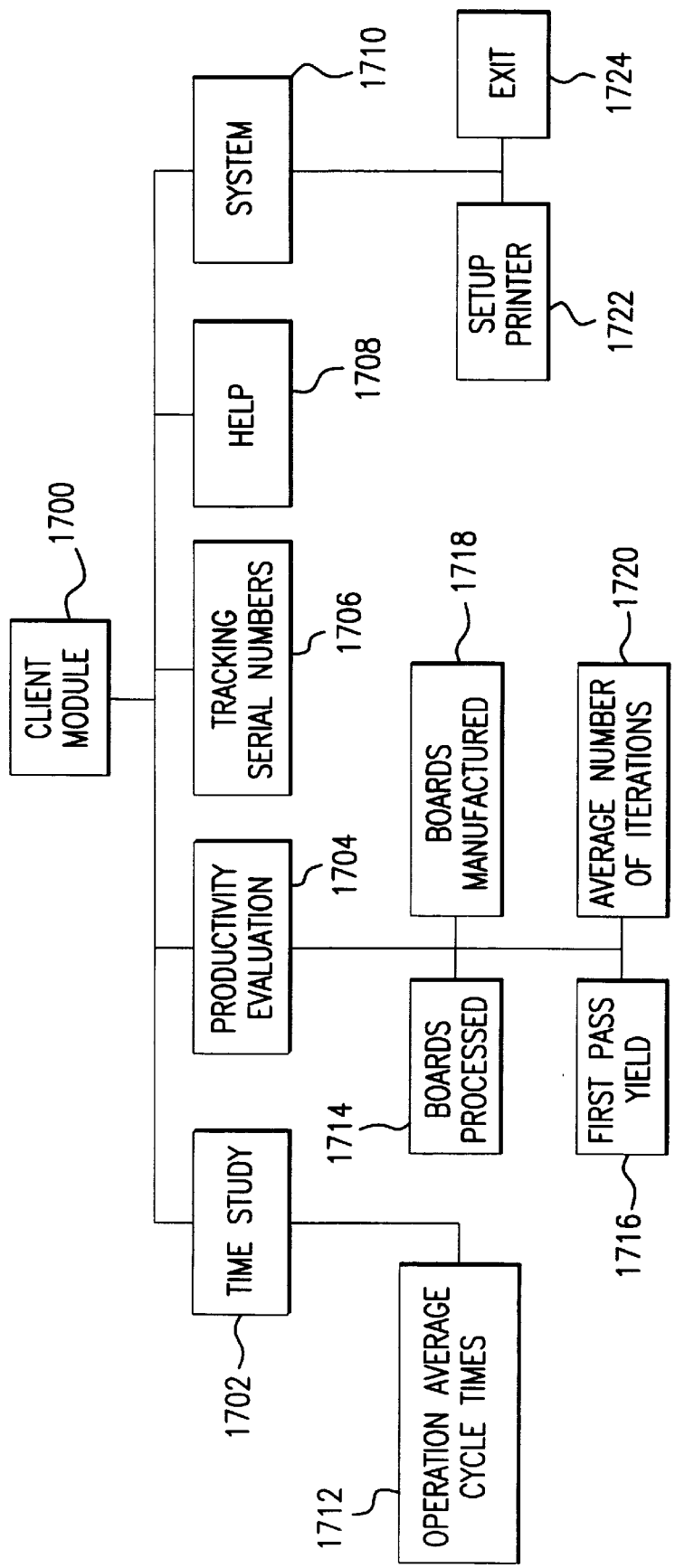
FIG. 12 is a function block diagram of the client module of an embodiment of the present invention.

Turning now to FIG. 12, the client module 1700 in an embodiment of the present invention includes a time study module 1702, a productivity evaluation module 1704, a tracking serial numbers modules 1706, a help module 1708, and a system module 1710. Each of these is discussed in turn below.

The time study module 1702. The time study module calculates and provides the user with average cycle times 1712 of various operations of the manufacturing processes. In time study, the system accepts parameters from the user defining a time period. For example, the user may wish to view data regarding a particular module from May 1 to May 20. Also, the user may wish to segregate the data into production shifts, or lump the data from two or more production shifts. As discussed earlier, this includes distributions of cycle times of each operation.

The productivity evaluation module 1704. This module calculates and presents the user with information as to the boards processed 1714, the first pass yields 1716, the boards manufactured 1718, and the average number of iterations 1720 of each board.

The tracking serial numbers module 1706. This module allows the users to track individual boards through the manufacturing processes. This is accomplished by tracking the serial numbers of each board.

The help module 1708. The help module 1708 provides the user with operation assistance and guidelines in using the data analyzer.

The system module 1710. This module provide system controls to the user, such as printer setup 1722 and exit 1724 functions.

Figure 13:
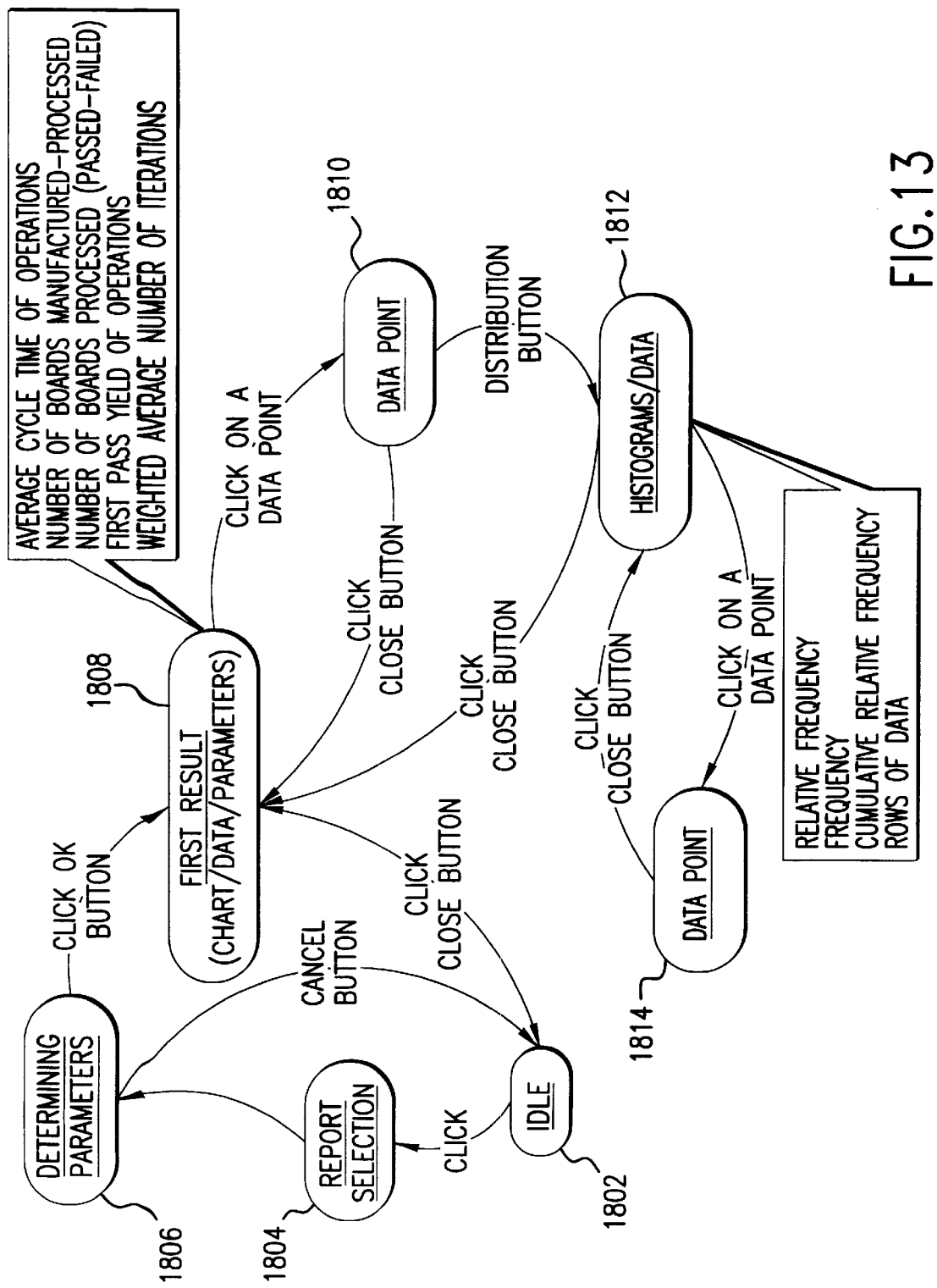
FIG. 13 is a diagram describing user operations according to an embodiment of the present invention.

FIG. 13 is a flow diagram showing typical user inputs in accessing the data of the data analyzer of an embodiment of the present invention. While in an idle state 1802, the user selects 1804 any one of a number of reports. As mentioned previously, these reports may include average cycle times, first-passed yields, etc.. The user is then presented with one or more screens in which various parameters are set 1806. These parameters may include particular dates of interest, and specific operations, modules and products for which information is desired. Once the parameters are determined and set, the first results 1808 are displayed. Again, by way of example, these results may be graphically presented in a chart format, and may include data denoting average cycle time of operations, number of boards manufactured or processed, number of boards passed vs. number of board failed, first pass yield of operations, weighted average number of iterations, etc.. Then, as shown by reference numbers 1810, 1812 and 1814 of FIG. 14, the user can click on data points of the presented information to obtain more detailed information. For example, if the first results is a bar graph showing the weighted average number of iterations of a number of different operations, clicking on any single bar of a particular operation may present the user with a histogram showing the number of iterations (frequency, relative frequency, cumulative relative frequency, etc.) associated with that particular operation.

As suggested above, the data may be illustrated in the form of a chart showing the average cycle time for each individual operation associated with the specified module. To find out details about a particular operation, the user simply clicks on the bar of the selected operation. The resultant screen shows the name of the operation, the number of board that have been processed, the time spent on processing the modules, etc. Processes for the pipeline might include connectorization, slicing, testing, more splicing, more testing. Assuming for example that there are six pipelines all assembling the same module, this level of the software accumulates the data from all the stations.

In many cases the average does not provide useful information, and instead the spread of the data is more significant. As such, a distribution function is provided for each individual operation. By clicking on the distribution function, a screen is presented showing the time distribution of the assembly operation of that particular process. This may be presented as a bar graph of statistical frequencies, for example. Using this information, the user can assess the probability that the operation will be performed within a given time period. Also, worst case scenarios may be examined to address bottlenecks within the pipeline. Again, charts can be presented in any selected form, such as bar graphs, pie charts, etc. Also, a print function allows printing of the charts as well as the data.

Production Analyzer

Production Analyzer Metrics

In the exemplary embodiment, the analyzer tool of the present invention provides the status of production activity in three key production metrics, namely, "operations time study", "productivity", and "tracking".

The operations time study includes, for example, the average cycle time of operations for all the operations associated with a given subject. Generally, subjects are determined by specifying products and the modules associated with the products.

The productivity metric enables users to evaluate productivity of each manufacturing pipeline based on a number of critical production factors. In the present embodiment, these factors include "quantity of boards manufactured", "quantity of boards processed", "first pass yield of operations", and "average number of iterations." Each is described in turn below:

Quantity of Board Manufactured. This report represents the distinct number of boards manufactured (processed successfully) in each process step, the number of boards that have been processed by each process step, and the output ratio (shown below) for each process step for each operation associated with a given subject.

$$OutputRatio = \frac{\text{The number of boards manufactured by an operation}}{\text{The number of boards processed by the operation}}$$

Quantity of Boards Processed. This report describes the number of boards processed successfully, the number of boards processed unsuccessfully, and a comparison between theses two numbers, for each operation associated with a given subject. The comparison may include a success ratio, a failure ratio, or both, as defined below.

$$SuccessRatio = \frac{\text{Total number of boards processed successfully}}{\text{The number of boards processed}}$$

$$FailureRatio = \frac{\text{Total number of boards processed unsuccessfully}}{\text{The number of boards processed}}$$

First Pass Yield of Operations. This report specifies what portion of the boards have passed each operation successfully the first time they were processed by operations associated with a given subject. That is, the first pass yield is as defined below.

$$First\ Pass\ Yield = \frac{\text{Number of boards that passed an operation on the first pass}}{\text{Total number (distinct) boards that have been processed}}$$

Average Number of Iterations. This report describes the average number of times (weighted average) that boards have gone through operations in order to reach their first successful pass, namely, the average number of times that a specific board type has been processed for a specific operation before it passed the specific operation.

$$Weighted\ Average = \text{The average number of times that a specific board type has been processed for a specific operation before it passed}$$

The tracking metric enables users to track individual boards processed in the manufacturing pipelines. In the present embodiment, boards are tracked based on their respective serial numbers.

Production Analyzer Functionality

The production analyzer of the preferred embodiment of the present invention collects, classifies and interprets data collected from the production pipelines and presents the data in graphical or chart form. Described below is an example of a step by step sequence that may be used to obtain reports for the desired production metric of a specified subject (product and module).

Subject Selection

The first step is to identify the subject of study. Subjects of study are determined by first specifying a product, and then by specifying one or more modules which make up the product.

Figure 14:
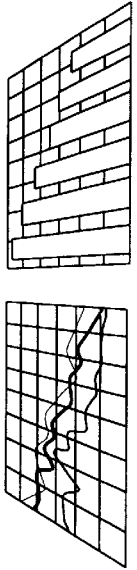
FIG. 14 is an example of a main menu of a production analyzer according an embodiment of the present invention.

FIG. 14 shows an exemplary menu screen of the production analyzer of a preferred embodiment. As illustrated, the menu screen includes a product listing. (All listed products are manufactured by Ciena Corporation, and the product names are trademarks of Ciena Corporation.) For purposes of explanation, the receiver of the MULTIWAVE 4000™ system will be the subject of study in the explanation that follows. This subject is specified by first selecting the "MULTIWAVE 4000" folder in the Product List of the menu screen, and then by selecting the "RECEIVER" among the list of module making up the MULTIWAVE 4000 ™ system.

Metric Selection

As described above, in the exemplary embodiment of the present invention, the production analyzer provides information on three metrics, i.e., time study, productivity, and tracking. As such, the top-most bar of the menu screen of FIG. AA includes three corresponding key metric selection icons. Selection of the "time study" metric and the "tracking" metric is accomplished by clicking on the corresponding icon. Clicking on the "productivity" icon will result in the display of the four icons corresponding to the sub-metrics described above, namely, quantity of board manufactured, quantity of boards processed, first pass yields, and weighted average iterations. Any of these sub-metrics may then be selected by clicking on the corresponding icon.

As also shown in FIG. 14, another series of icons may be displayed on a separate display bar to provide an alternative mechanism for selecting metrics. These icons allow for the quick selection of a particular metric or sub-metric, and/or the display of the product-module tree. In FIG. 14, the illustrated icons include, from the left, time study, quantity of boards manufactured, quantity of boards processed, first pass yields, weighted average iterations, tracking serial numbers, product-module tree, and exit.

Time Study

Figure 15:
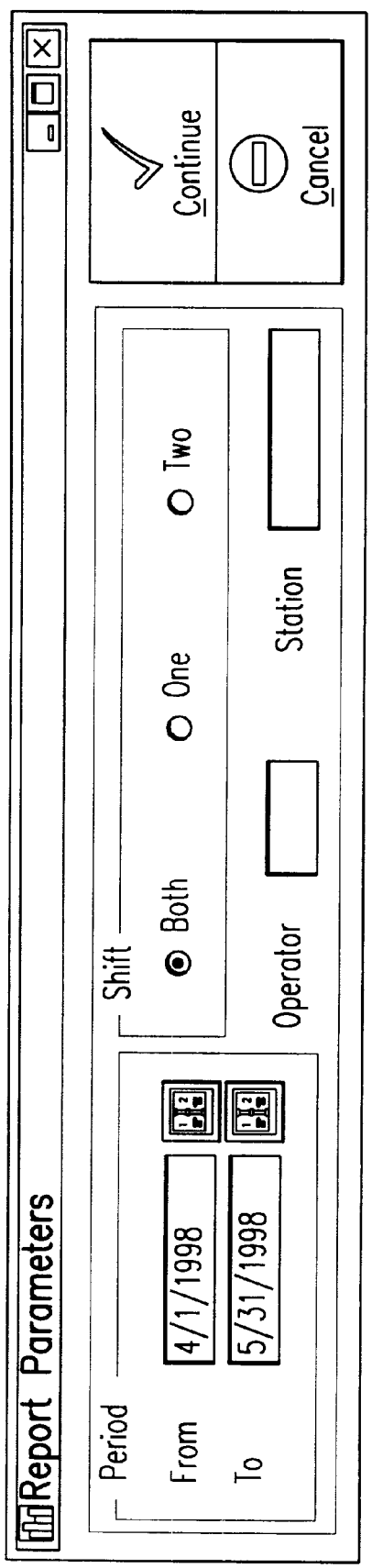
FIG. 15 is an example of a reports parameter window.

An explanation will now be given of the user sequences and GUI's associated with the time study metric. Again, the subject of study is the receiver of the MULTIWAVE 4000™ system. As described above, the time study metric is selected by double-clicking on the one of the time study icons appearing on the menu screen. This results in the display of a "report parameters" window screen, an example of which is shown in FIG. 15. The report parameters allow the user to customize outputs from the production analyzer. For example, in the exemplary embodiment, the report parameters include "time interval", "shifts", "operators", and "workstations", each of which is discussed in turn below.

The time interval is specified by a starting date and an ending date. (Optionally, a default value, such as the present date, can be adopted as the ending date.) In the embodiment of FIG. 15, calender icons are used for convenient entry of dates. In the example that follows, a start date of Apr. 1, 1998 and an end date of May 31, 1998 have been adopted. The user can also specify one or more shifts for which the study is to be conducted. The embodiment of FIG. 15 allows for the selection of shift one, shift two, or both shifts (which the default value being both shifts). In the example that follows, both shifts have been selected. The user can also optionally specify a particular operator and/or a particular workstation by entering an operator's ID and/or a workstation ID in the designated fields of FIG. 15. In the example that follows, both of these fields are left blank, and thus, no particular operator or workstation is specified.

Figure 16:
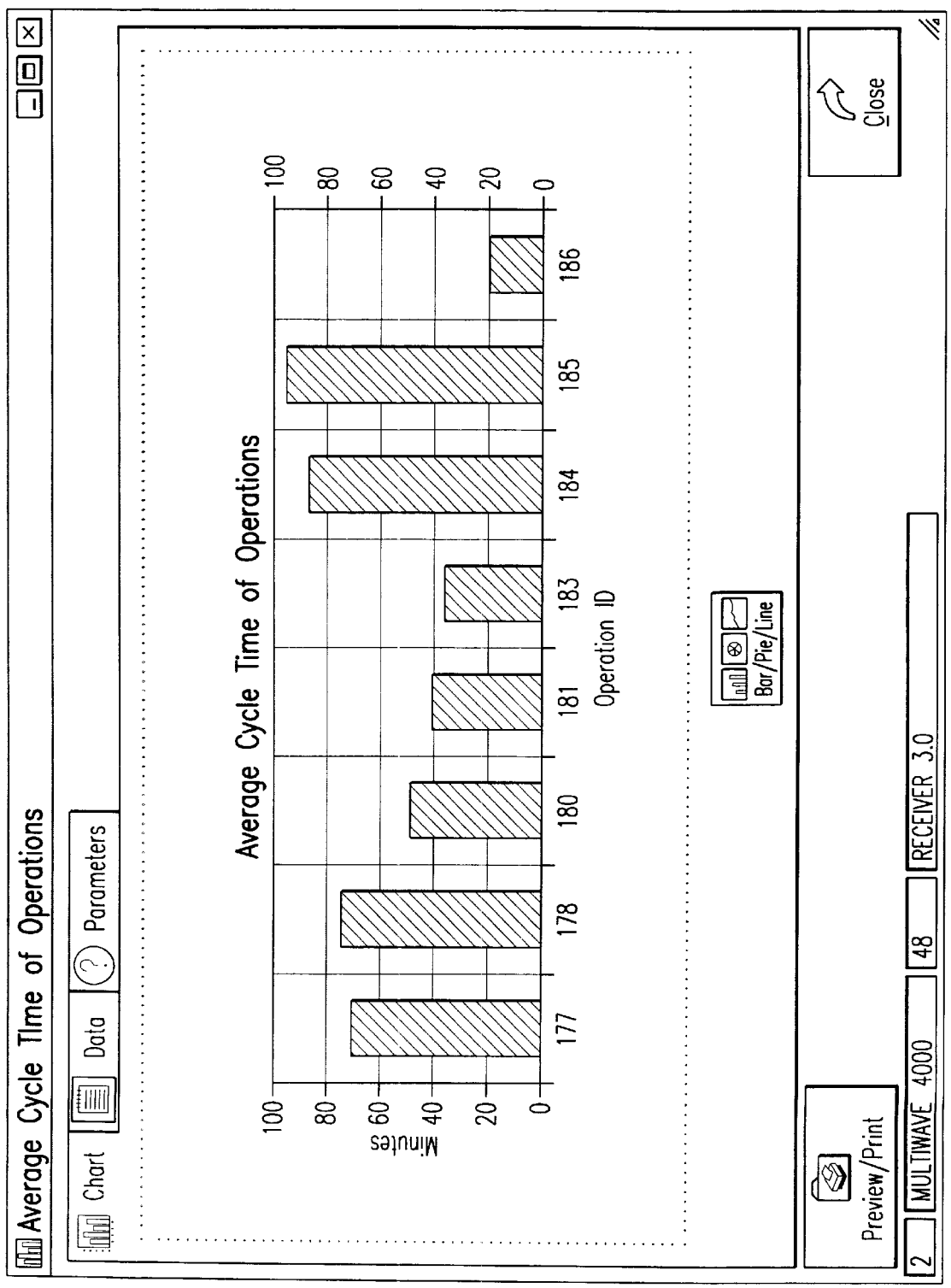
FIG. 16 is an example of a window which graphically depicts average cycle time of operations.

By clicking on the "continue" icon shown in FIG. 15, the user will be presented with a graphical view of a time study analysis shown, by way of example, in FIG. 16. In the figure, the x-axis of the bar graph shows the identification number of each operation employed to manufacture the subject, namely, the receiver of the MULTIWAVE 4000™ system. The y-axis illustrates the minutes required for the operation. In this exemplary embodiment, an additional icon is provided (shown below the operation ID in FIG. 16) for allowing the user to select graphical presentations, such as a pie chart or a line graph.

Time statistics for a particular operation may also be obtained. In the exemplary embodiment, this is done by clicking on a selected one of the operation ID's, or on a corresponding bar, shown in FIG. 16. As a result, the user is presented with a window showing the time statics for the selected operation, such as that for the operation ID number 185 shown in FIG. 17. As illustrated, this window include a description of the operation (e.g., T3 final functional test), the total quantity of boards processed (e.g., 331), the total elapsed processing time (e.g., 31,360.45 minutes), and the average time per processed board (e.g., 94.74 minutes).

Figure 17:
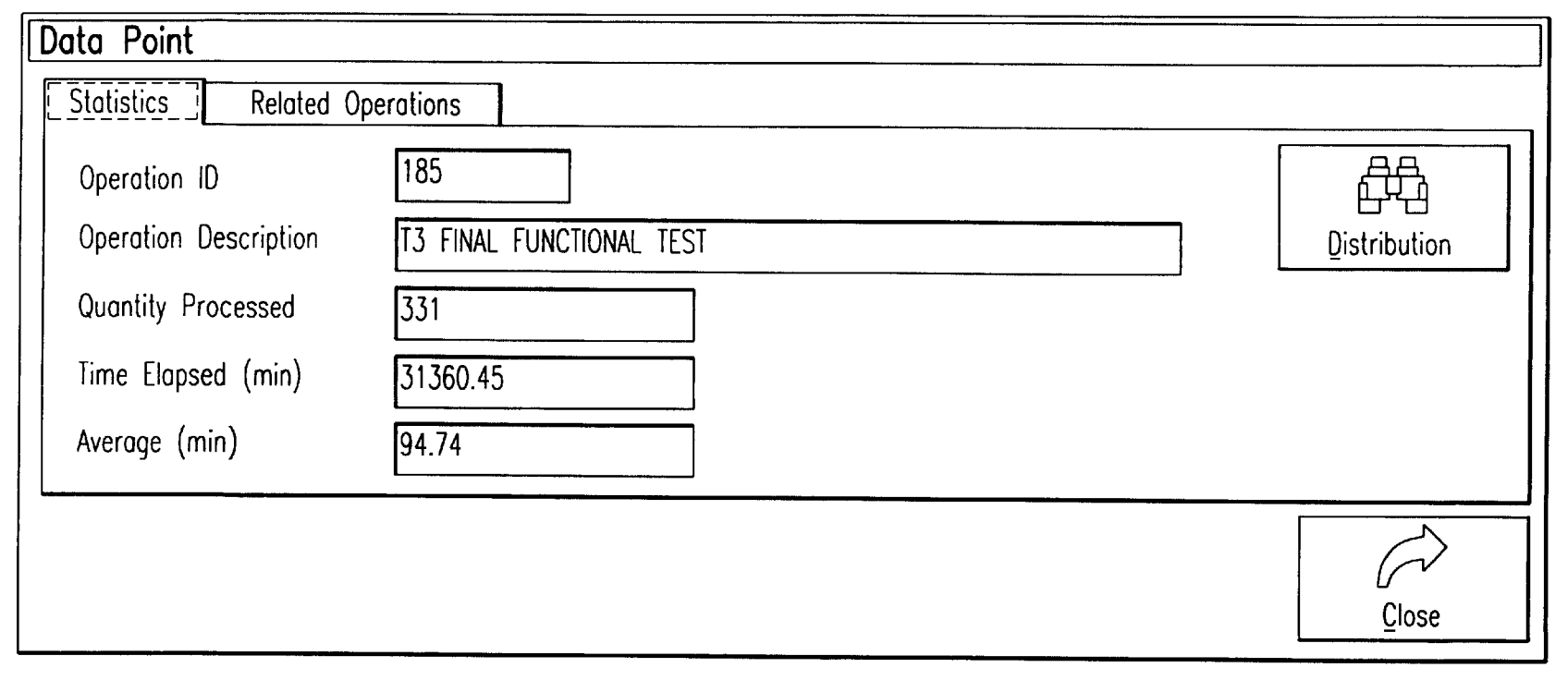

Clicking on the "related operations" icon in the window of FIG. 17 will present the user with a list of similar or identical operations used in the manufacture of other modules of the same or other products.

Returning to FIG. 16, a "data" icon is shown. Clicking on this icon will present the user with a numeric spreadsheet of the data used to generate the bar graph. The spreadsheet would preferably include the same information as that shown in FIG. 17, except for all operations associated with the study.

The "parameters" icon of FIG. 16 allows the user to view the previously set parameters for verification of their values, or for changing the parameter values. The resultant window would be the same as, or similar to, that shown in FIG. 15.

The window of FIG. 16 also includes a "preview/print" icon. In the exemplary embodiment, clicking on this button would allow the user to view and/or print a report containing the graphics of FIG. 16, the corresponding numerical spreadsheet, or a combination of graphics and the numerical spreadsheet.

Productivity—Quantity of Boards Manufactured

An explanation will now be given of the user sequences and GUI's associated with the quantity of boards manufactured metric. Again, in this example, the subject of study is the receiver of the MULTIWAVE 4000™ system. As described above, the quantity of boards manufactured metric is selected by double-clicking on the appropriate icon(s) appearing on the menu screen of FIG. 14. This results in the display of a "report parameters" window screen, an example of which is shown in FIG. 15 and previously described. Again, in the example that follows, a start date of Apr. 1, 1998 and an end date of May 31, 1998 have been adopted, both shifts have been selected, and no particular operator or workstation is specified.

Figure 18:
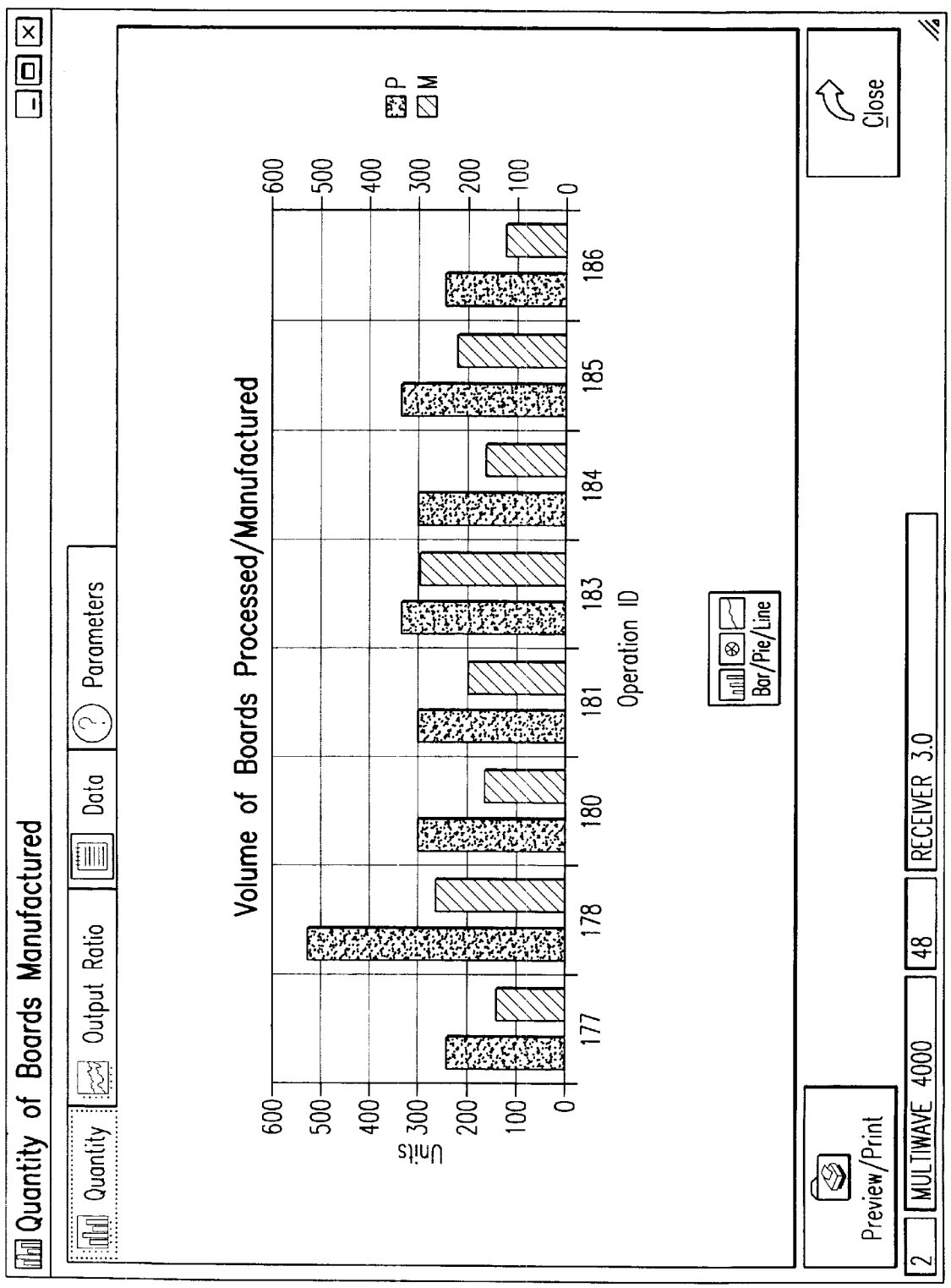
FIG. 18 is an example of a window which graphically depicts the quantity of boards processed and manufactured.

By clicking on the "continue" icon shown in FIG. 15, the user will be presented with a graphical view of a quantity of boards manufactured analysis shown, by way of example, in FIG. 18. In the figure, the x-axis of the bar graph shows the identification number of each operation employed to manufacture the subject, namely, the receiver of the MULTIWAVE 4000™ system. The y-axis illustrates the number of boards processed "P" and the number of boards manufactured "M" for each operation. A board is deemed to have been processed when it has been subjected to an operation (whether successfully or not), and a board is deemed to be manufactured when it has successfully passed an operation. In this exemplary embodiment, an additional icon is provided (shown below the operation ID in FIG. 18) for allowing the user to select graphical presentations, such as a pie chart or a line graph.

Figure 19:
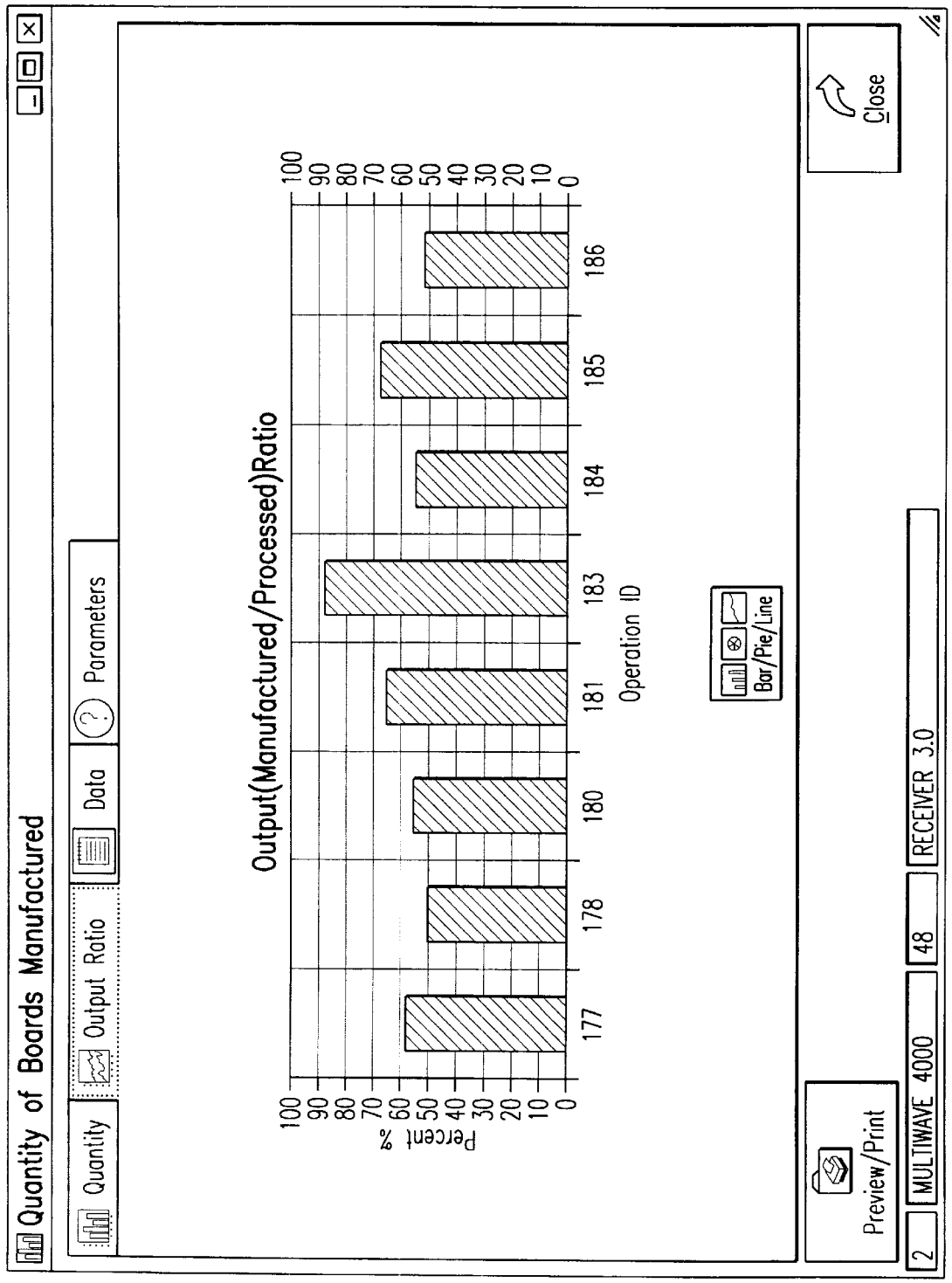
FIG. 19 is an example of a window depicting an output ratio in graphic form.

Clicking on the "output ratio" icon of FIG. 18 will present the user with a graphical representation of the ratios between the number of boards processed and the number of boards manufactured. An example of this is shown in FIG. 19. As shown, the x-axis shows the ID number of each operation used to fabricate the receiver of the MULTIWAVE 4000™ system, and the y-axis shows the output ratio for each operation, namely, the ratio of the quantities shown in FIG. 18 for each operation.

As with the time study (FIG. 17), details of any individual operation can be viewed by clicking on the operation ID, or the corresponding bar(s), of the operation of interest. Likewise, by clicking on the "data" icon of FIG. 18 or 19, the user will be presented with a numeric spreadsheet of the data used to generate the bar graphs of FIGS. 18 and 19. The spreadsheet would preferably include an operation description, quantity of boards processed, quantity of boards manufactured, and output ratio, for each operation.

The "parameters" icon of FIGS. 18 and 19 allows the user to view the previously set parameters for verification of their values, or for changing the parameter values. The resultant window would be the same as, or similar to, that shown in FIG. 15.

The windows of FIGS. 18 and 19 also includes a "preview/print" icon. In the exemplary embodiment, clicking on this button would allow the user to view and/or print a report containing the graphics of FIGS. 18 and/or 19, the corresponding numerical spreadsheet, or a combination of graphics and the numerical spreadsheet.

An explanation will now be given of the user sequences and GUI's associated with the quantity of boards processed metric. As above, in this example, the subject of study is the receiver of the MULTIWAVE 4000™ system. The quantity of boards processed metric is selected by double-clicking on the appropriate icon(s) appearing on the menu screen of FIG. 14. This results in the display of a "report parameters" window screen, an example of which is shown in FIG. 15 and previously described. Again, in the example that follows, a start date of Apr. 1, 1998 and an end date of May 31, 1998 have been adopted, both shifts have been selected, and no particular operator or workstation is specified.

Figure 20:
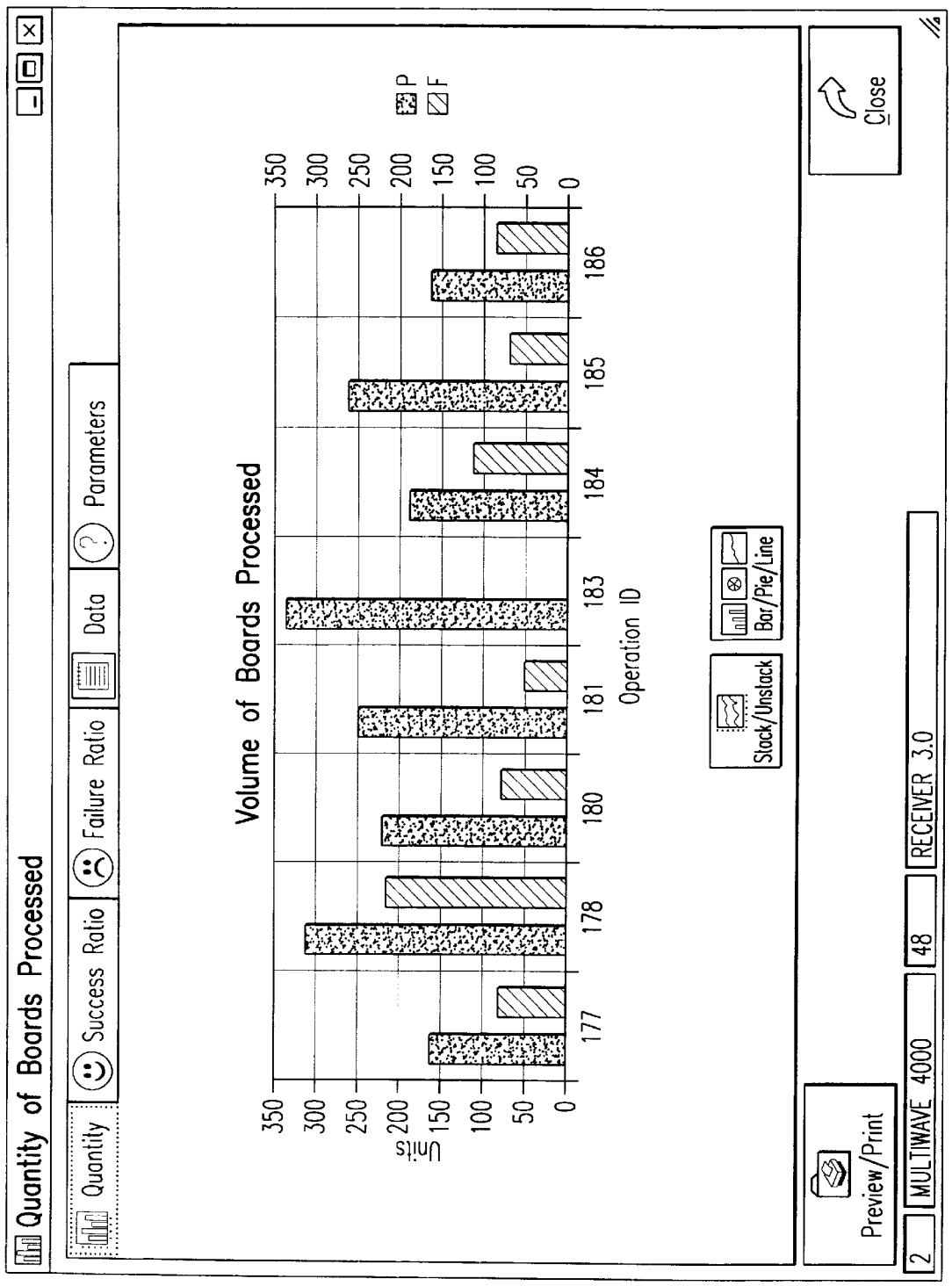
FIG. 20 is an example of a window depicting passed and failed quantities of process boards.

By clicking on the "continue" icon shown in FIG. 15, the user will be presented with a graphical view of a quantity of boards processed analysis shown, by way of example, in FIG. 20. In the figure, the x-axis of the bar graph shows the identification number of each operation employed to manufacture the subject, namely, the receiver of the MULTIWAVE 4000™ system. The y-axis illustrates the number of boards passed "P" and the number of boards failed "F" for each operation. A board is deemed to have passed an operation when it has been successfully subjected to the operation, and a board is deemed to have failed an operation when is has unsuccessfully been subjected to the operation. In this exemplary embodiment, additional icons are provided (shown below the operation ID in FIG. 20) for allowing the user to select alternate graphical presentations, such as a pie chart or a line graph, or for allowing the user to stack the two bars of each operation into a single, multi-colored or multi-shaded bar.

Figure 21:
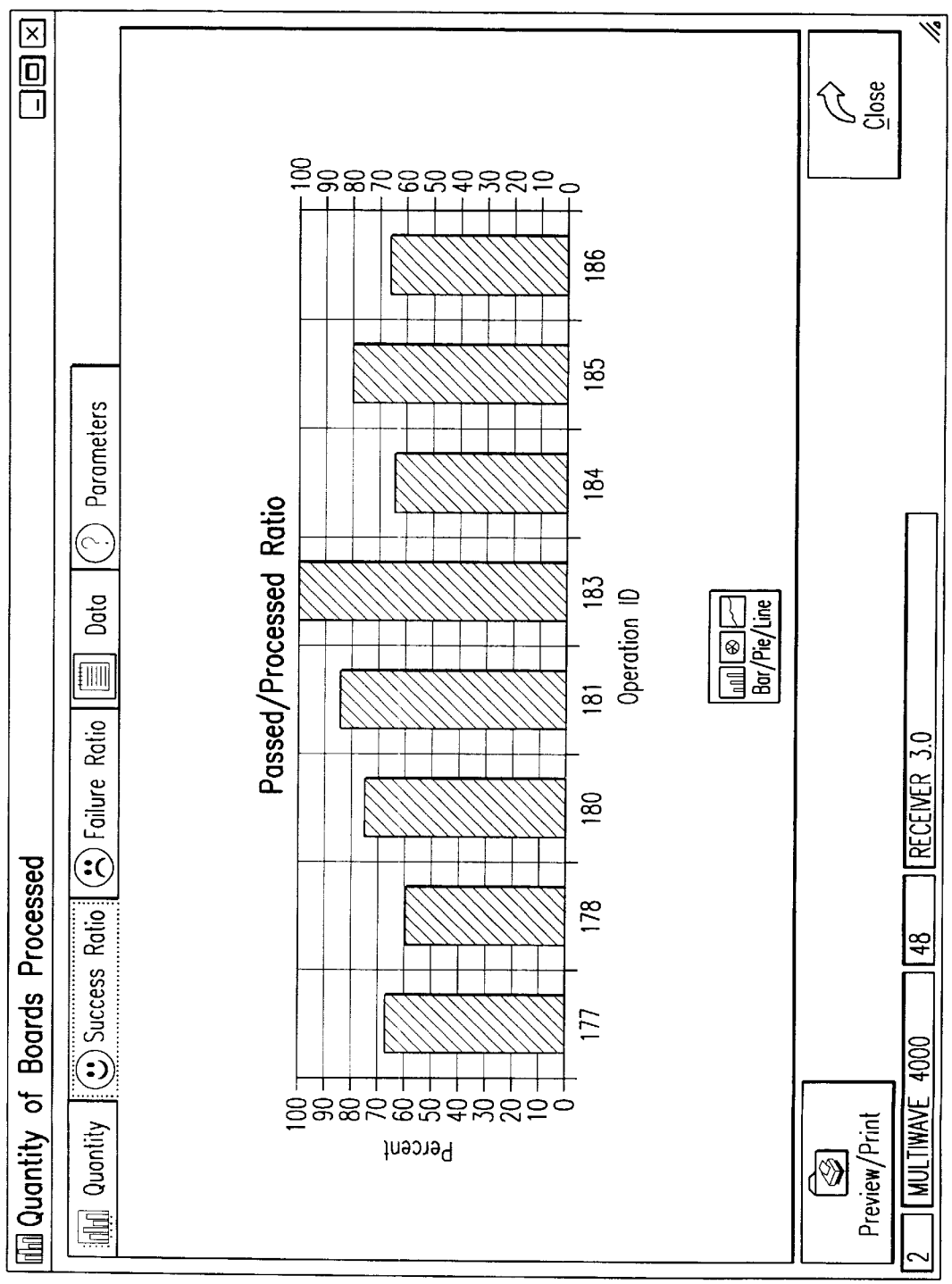
FIG. 21 is an example of a window depicting a success ratio of processed boards.

Clicking on the "success ratio" icon of FIG. 20 will present the user with a graphical representation of the ratios between the number of boards passed and the total number of boards. An example of this is shown in FIG. 21. As shown, the x-axis shows the ID number of each operation used to fabricate the receiver of the MULTIWAVE 4000™ system, and the y-axis shows the success ratio for each operation, namely, the ratio of the number of boards passed shown in FIG. 20 and the total number of boards for each operation.

Figure 22:
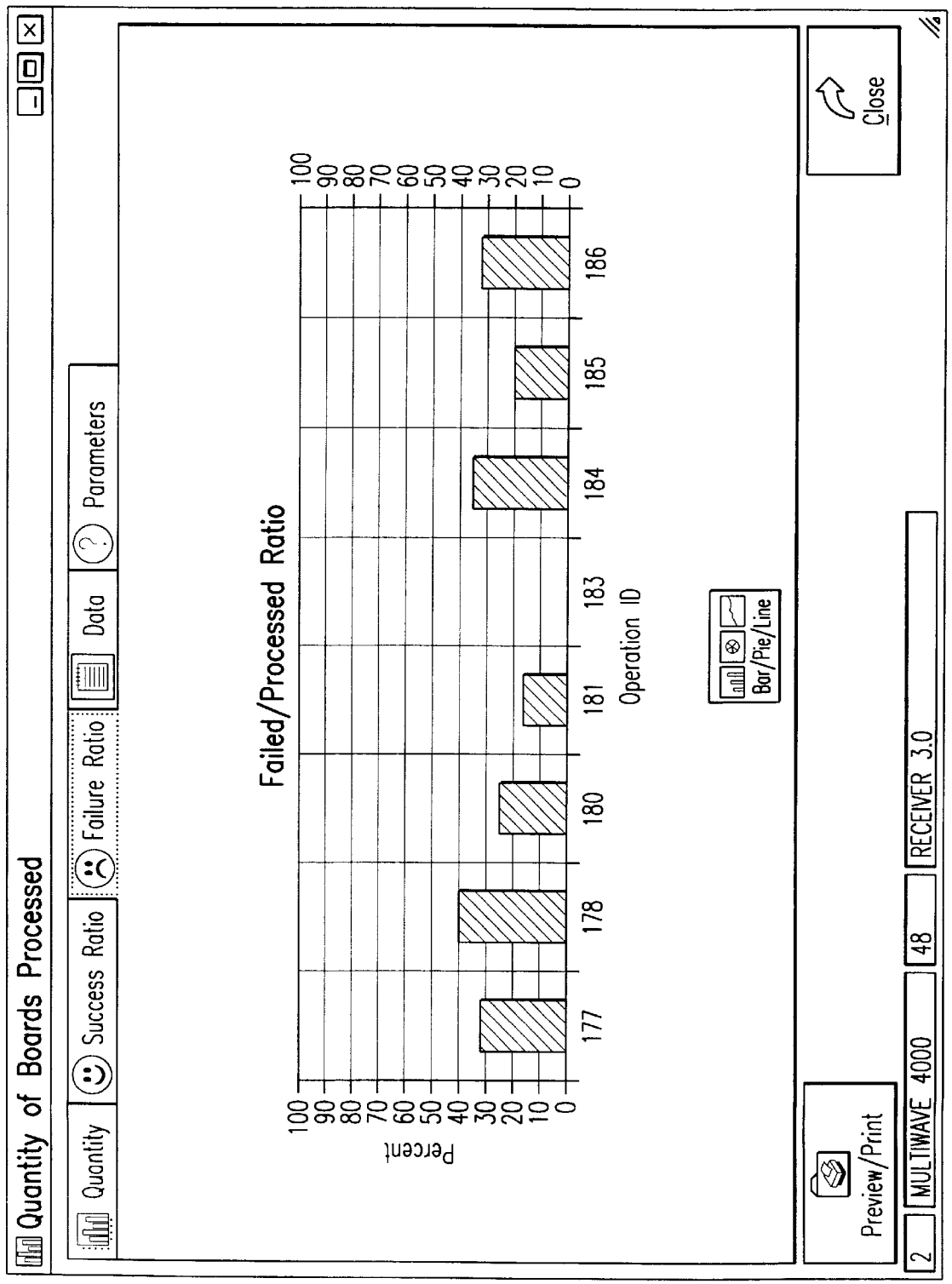
FIG. 22 is an example of a window depicting a failure ratio of processed boards.

On the other hand, by clicking on the "failure ratio" icon of FIG. 20, the user will be presented with a graphical representation of the ratios between the number of boards failed and the total number of boards. An example of this is shown in FIG. 22. As shown, the x-axis shows the ID number of each operation used to fabricate the receiver of the MULTIWAVE 4000™ system, and the y-axis shows the failure ratio for each operation, namely, the ratio of the number of boards failed shown in FIG. 20 and the total number of boards for each operation.

As with the time study (FIG. 17), details of any individual operation can be viewed by clicking on the operation ID, or the corresponding bar(s), of the operation of interest. Likewise, by clicking on the "data" icon of FIG. 20, 21 or 22, the user will be presented with a numeric spreadsheet of the data used to generate the bar graphs of FIGS. 20, 21 and 22. The spreadsheet would preferably include an operation description, quantity of boards passed, quantity of boards failed, percent passed, and percent failed, for each operation.

The "parameters" icon of FIGS. 20, 21 and 22 allows the user to view the previously set parameters for verification of their values, or for changing the parameter values. The resultant window would be the same as, or similar to, that shown in FIG. 15.

Productivity—First Pass Yield

An explanation will now be given of the user sequences and GUI's associated with the first pass yield metric. Once again, in this example, the subject of study is the receiver of the MULTIWAVE 4000™ system. The first pass yield metric is selected by double-clicking on the appropriate icon(s) appearing on the menu screen of FIG. 14. This results in the display of a "report parameters" window screen, an example of which is shown in FIG. 15 and previously described. In the example that follows, a start date of Apr. 1, 1998 and an end date of May 31, 1998 have been adopted, both shifts have been selected, and no particular operator or workstation is specified.

Figure 23:
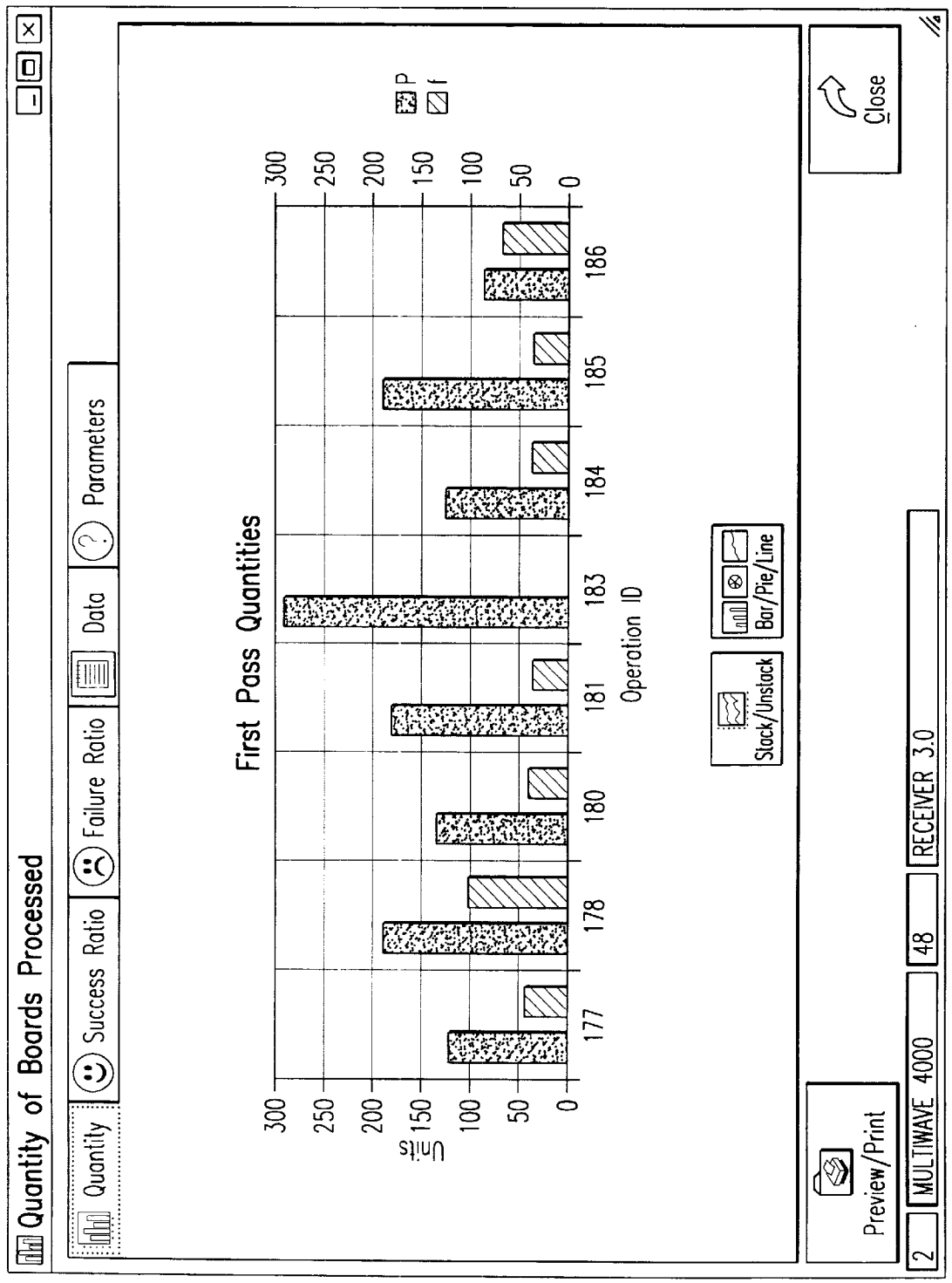
FIG. 23 is an example of a window depicting first pass quantities for specific operations.

By clicking on the "continue" icon shown in FIG. 15, the user will be presented with a graphical view of a first pass yield analysis shown, by way of example, in FIG. 23. In the figure, the x-axis of the bar graph shows the identification number of each operation employed to manufacture the subject, namely, the receiver of the MULTIWAVE 4000™ system. The y-axis illustrates the number of boards passed "P" on the first pass of each operation and the number of boards failed "F" on the first pass of each operation. A board is deemed to have passed an operation when it has been successfully subjected to the operation, and a board is deemed to have failed an operation when is has unsuccessfully been subjected to the operation. In this exemplary embodiment, additional icons are provided (shown below the operation ID in FIG. 23) for allowing the user to select alternate graphical presentations, such as a pie chart or a line graph, or for allowing the user to stack the two bars of each operation into a single, multi-colored or multi-shaded bar.

Figure 24:
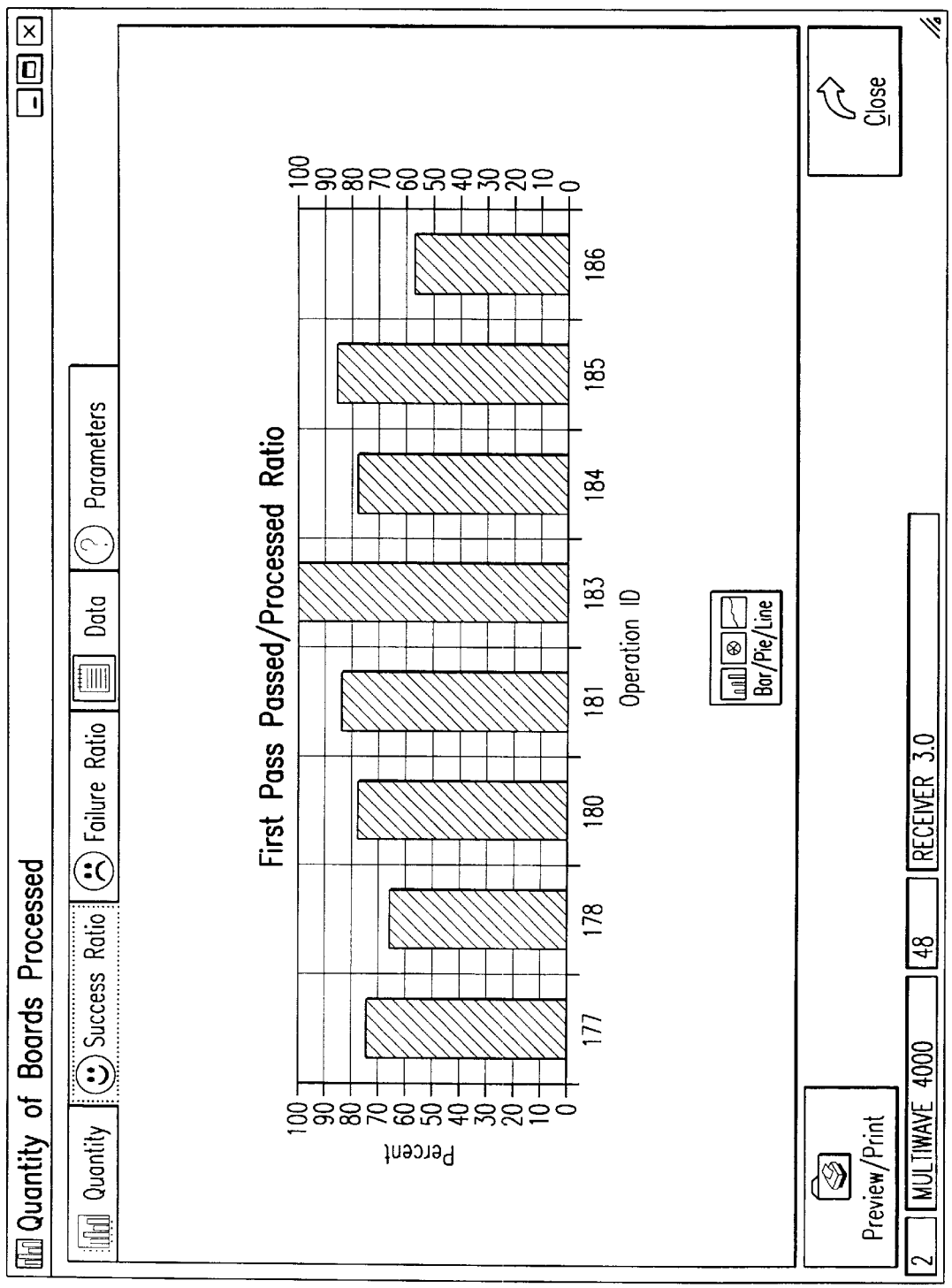
FIG. 24 is an example of a window depicting first pass success ratios for specific operations.

Clicking on the "success ratio" icon of FIG. 23 will present the user with a graphical representation of the ratios between the number of boards passed on the first pass of an operation and the total number of boards. An example of this is shown in FIG. 24. As shown, the x-axis shows the ID number of each operation used to fabricate the receiver of the MULTIWAVE 4000™ system, and the y-axis shows the first pass success ratio for each operation, namely, the ratio of the number of boards passed on the first iteration as shown in FIG. 23 and the total number of boards for each operation.

Figure 25:
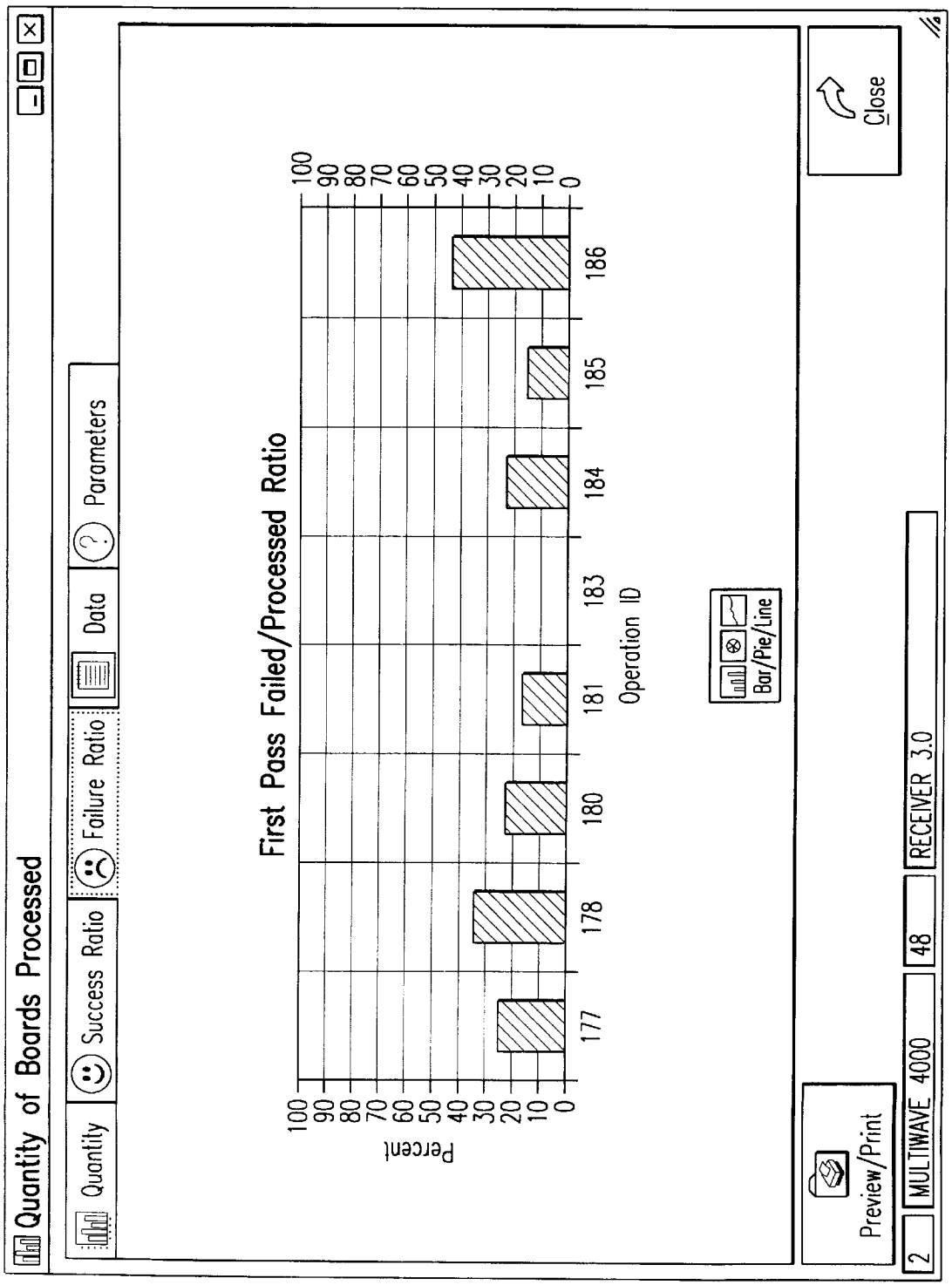
FIG. 25 is an example of a window depicting first pass failure ratios for specific operations.

On the other hand, by clicking on the "failure ratio" icon of FIG. 23, the user will be presented with a graphical representation of the ratios between the number of boards failed on the first pass of each operation and the total number of boards. An example of this is shown in FIG. 25. As shown, the x-axis shows the ID number of each operation used to fabricate the receiver of the MULTIWAVE 4000™ system, and the y-axis shows the first pass failure ratio for each operation, namely, the ratio of the number of boards failed on the first pass of each operation as shown in FIG. 23 and the total number of boards for each operation.

As with the time study (FIG. 17), details of any individual operation can be viewed by clicking on the operation ID, or the corresponding bar(s), of the operation of interest. Likewise, by clicking on the "data" icon of FIG. 23, 24 or 25, the user will be presented with a numeric spreadsheet of the data used to generate the bar graphs of FIG. 23, 24 or 25. The spreadsheet would preferably include an operation description, quantity of boards which passed on the first pass, quantity of boards which failed on the first pass, percent passed, and percent failed, for each operation.

The "parameters" icon of FIG. 23, 24 or 25 allows the user to view the previously set parameters for verification of their values, or for changing the parameter values. The resultant window would be the same as, or similar to, that shown in FIG. 15.

Productivity—Weighted Average

An explanation will now be given of the user sequences and GUI's associated with the weighted average metric. Again, in this example, the subject of study is the receiver of the MULTIWAVE 4000™ system. As described above, the weighted average metric is selected by double-clicking on the appropriate icon(s) appearing on the menu screen of FIG. 14. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

Figure 26:
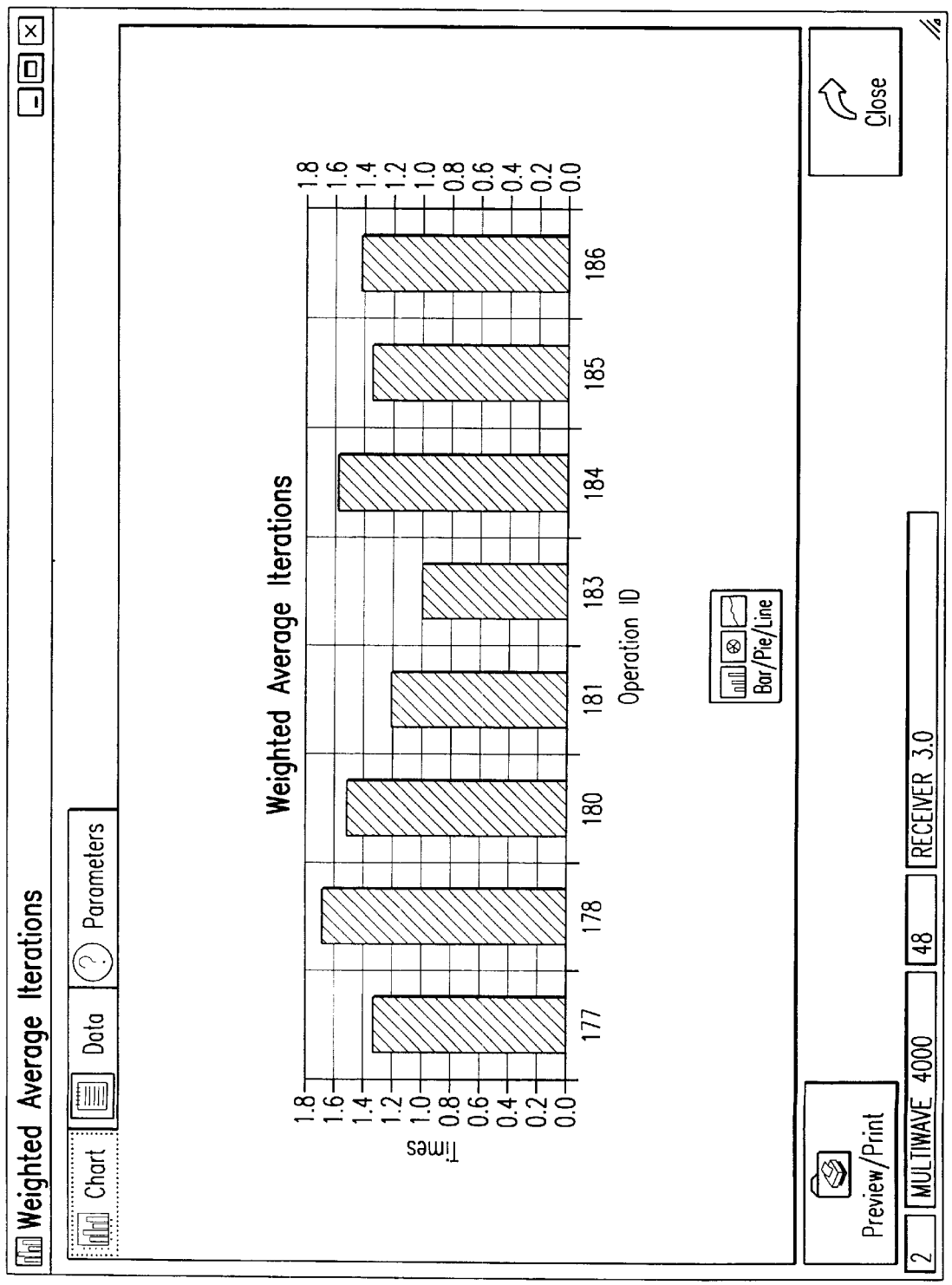
FIG. 26 is an example of a window depicting weighted averages for iterations of specific operations.

By clicking on the "continue" icon shown in FIG. 15, the user will be presented with a graphical view of a weighted average iterations analysis shown, by way of example, in FIG. 26. In the figure, the x-axis of the bar graph shows the identification number of each operation employed to manufacture the subject, namely, the receiver of the MULTIWAVE 4000™ system. The y-axis illustrates an average number of iterations that each board is processed for each operation until is passes the operation. In this exemplary embodiment, an additional icon is provided (shown below the operation ID in FIG. 26) for allowing the user to select graphical presentations, such as a pie chart or a line graph.

As with the time study (FIG. 17), details of any individual operation can be viewed by clicking on the operation ID, or the corresponding bar(s), of the operation of interest. Likewise, by clicking on the "data" icon of FIG. 26, the user will be presented with a numeric spreadsheet of the data used to generate the bar graph of FIGS. 26. The spreadsheet would preferably include an operation description, and the average number of iterations, for each operation.

The "parameters" icon of FIGS. 20, 21 and 22 allows the user to view the previously set parameters for verification of their values, or for changing the parameter values. The resultant window would be the same as, or similar to, that shown in FIG. 15.

The windows of FIG. 26 also includes a "preview/print" icon. In the exemplary embodiment, clicking on this button would allow the user to view and/or print a report containing the graphics of FIG. 26, the corresponding numerical spreadsheet, or a combination of graphics and the numerical spreadsheet.

Tracking

An explanation will now be given of the user sequences and GUI's associated with the tracking metric. As described above, the tracking metric is selected by double-clicking on the appropriate icon(s) appearing on the menu screen of FIG. 14. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

By clicking on the "continue" icon shown in FIG. 15, the user will first be presented with a listing of the serial numbers of all boards processed for all modules during the selected time period. An example of this is the numeric spreadsheet of FIG. 27.

The listing can then be limited to a particular module by clicking on the "module name" icon of the window of FIG. 27. This will present the user with a listing of products and modules for selection. In this example, the receiver of the MULTIWAVE 4000™ system is selected to produce the exemplary display window of FIG. 28. This serial number listing of FIG. 28 is similar to that of FIG. 27, except that all that is illustrated are the boards constituting the receiver of the MULTIWAVE 4000™ system.

Figure 29:
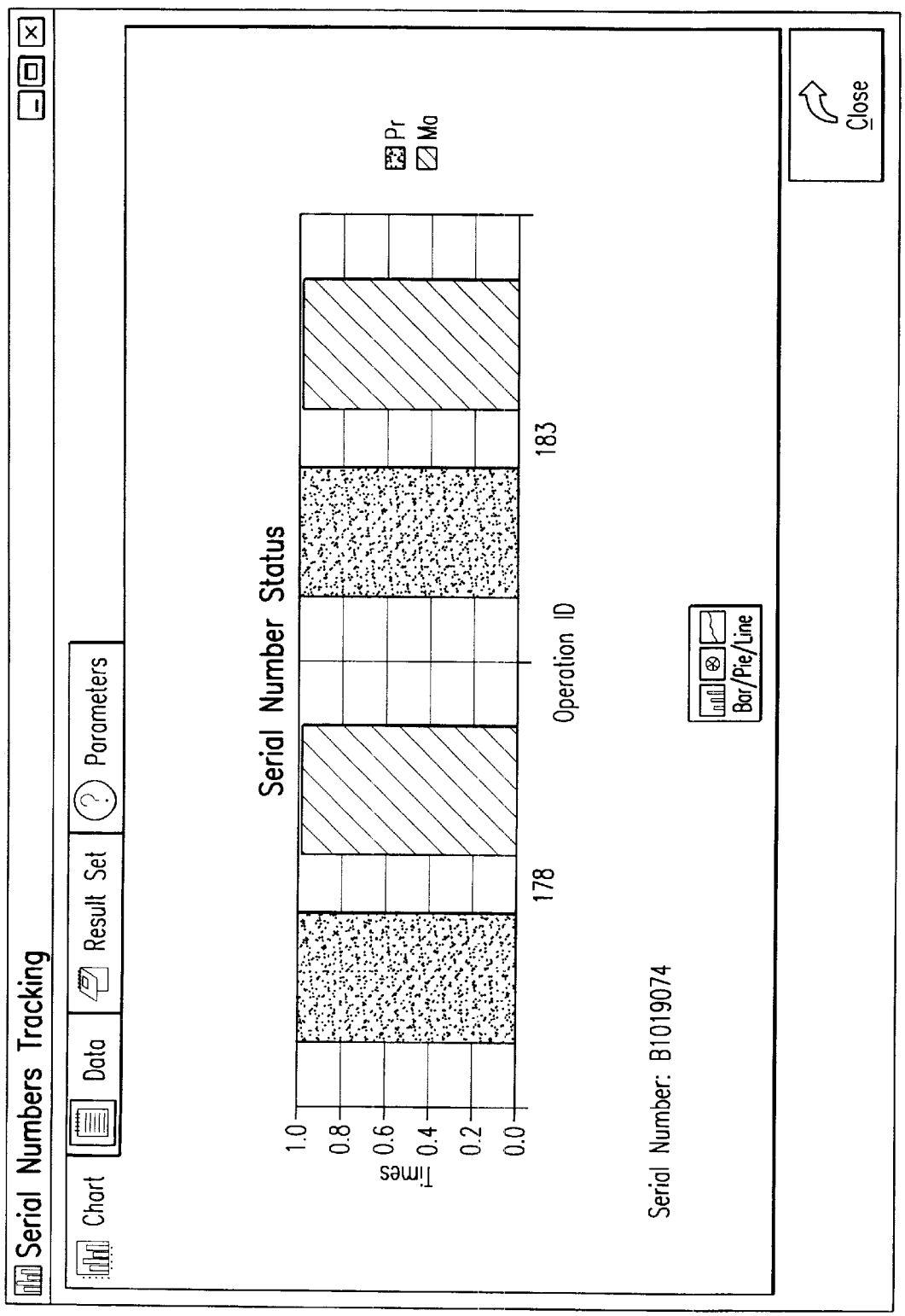
FIG. 29 is an example of a window depicting processed and passed statistics for a specific serial number.

The status of any particular board can also be examined. For example, suppose the board having serial number B1019074 has been selected by double clicking on the highlighted line appearing in FIG. 27. A display screen such as that shown in FIG. 29 is then displayed. In this example, the bar graph illustrates processed "Pr" and passed "Pa" statistics for each operation associated with the subject serial number. Also, preferably clicking on the resulting quantified bar statistics for a specific operation will result in a screen showing numeric data for the selected operation. Further, as with the other metrics, an icon is provided to change the presentation to a pie or line graphical. Still further, according to the exemplary embodiment, a "data" icon is provided to present the user with a numeric display (spreadsheet)of the data shown in the bar graph of FIG. 29.

Figure 30:
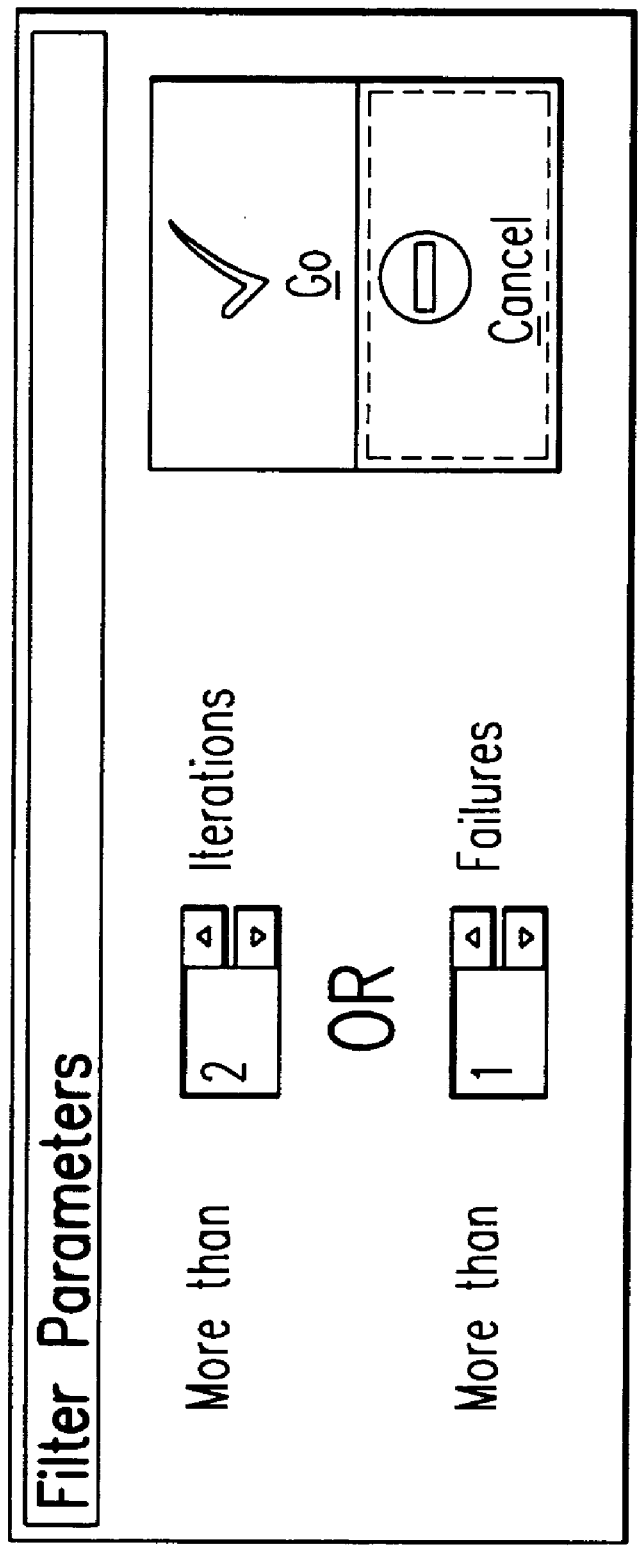
FIG. 30 is an example of a filter parameter window.

According to another aspect of the tracking metric of the exemplary embodiment, a filtering mechanism is provided to assist the user in determining troublesome module types and serial numbers through analysis of the iterations and failures of modules during the manufacturing process. By way of example, this is done by clicking on the "filter icon" shown in screens of FIGS. 27 and 28, which in turn results in the display of a filter parameters window, such as that shown in FIG. 30. Using this window, the user customizes the serial number analysis for iterations (processes) and failures. Suppose, for example, the parameters are set as "more than 2 iterations, and more than 1 failure", as shown in FIG. 30. Clicking on the "go" icon results in the exemplary display of FIG. 31, which lists the modules and serial numbers that meet the selected criteria. Again, double clicking on a selected line for a specific serial number will result a graphical display similar to that of FIG. 29.

The windows of FIG. 27 and 28 also include a "preview/print" icon. In the exemplary embodiment, clicking on this button would allow the user to view and/or print a report containing the data of these figures in numerical spreadsheet format.

Defects Analyzer

Defects Analyzer Metrics

In the exemplary embodiment, the analyzer tool of the present invention provides the status of defects data collected in the manufacturing pipelines. The tool enables detailed reporting on manufacturing activities with specific emphasis on defects analysis.

According to an exemplary embodiment of the invention, the defects analyzer provides defect status in three primary breakdowns, namely, "module", "category", and "defects log", with defects analysis structured to the classes defined in "basic data" (described later).

Basic data. The present embodiment enables the user to obtain a quick fundamental overview of the configuration requirements for the defect analysis system. This includes both defect and corrective action details.

Module. The present embodiment also enables the user to obtain metrics for module defects in a variety of formats.

Category. The present embodiment further enables the user to categorize defects according to a variety of metrics.

Log. The present embodiment still further provides the user with a summary log detailing all defects for the selected subject of study.

Functionality of Defects Analyzer

The defects analyzer of the preferred embodiment of the present invention collects, classifies, analyzes and interprets defects data collected from the production pipelines and presents the data in graphical or chart form. Described below is an example of a step by step sequence that may be used to obtain reports for the desired defects metric of a specified subject (product and module).

Basic Data—Configuration

Figure 32:
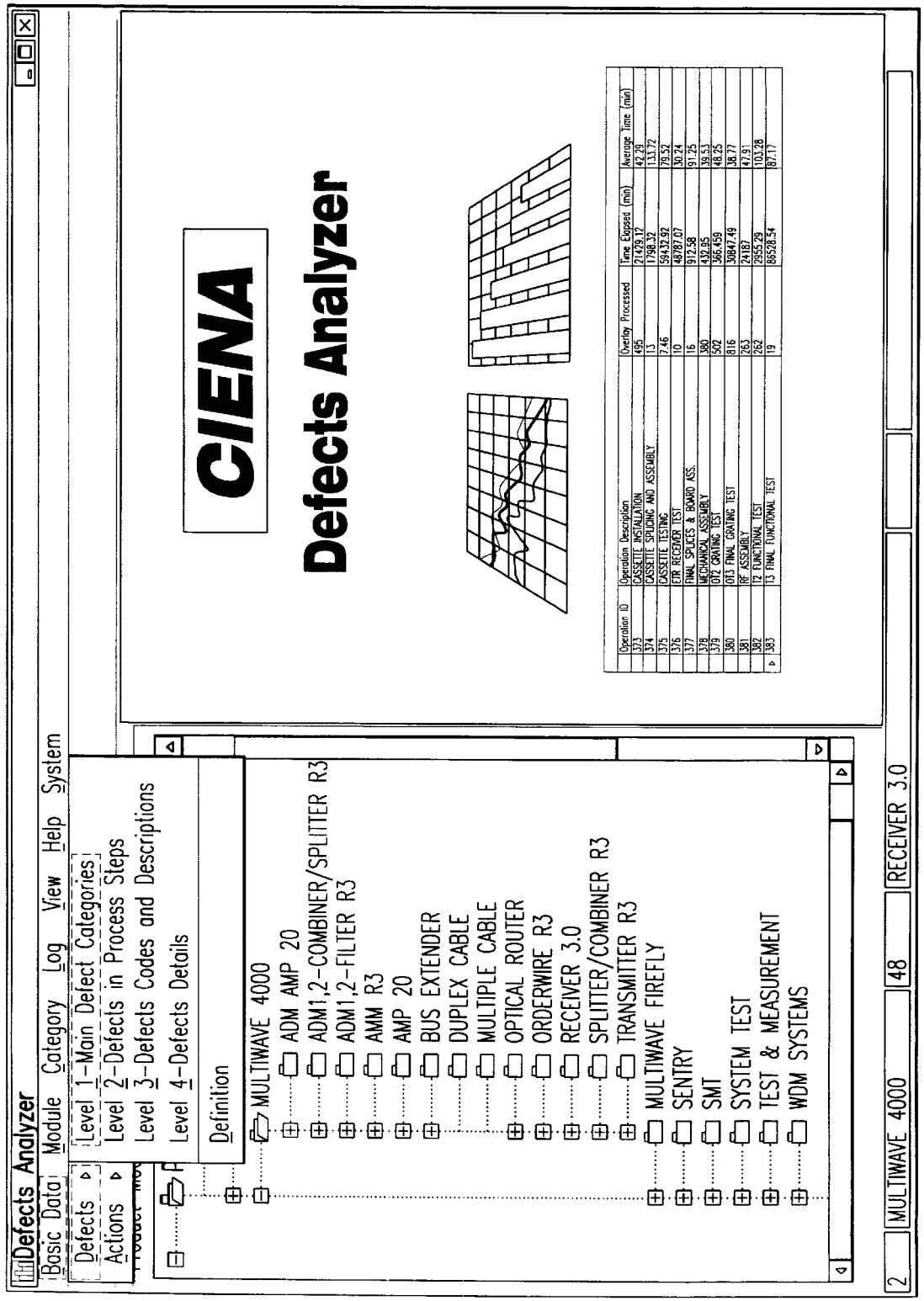
FIG. 32 depicts an example of a basic data defect menu screen.

FIG. 32 illustrates the defects analyzer screen of the present embodiment, in which the "basic defects" icon has been opened to show a number of available defects categories (or levels) of information. In this embodiment, these include "Level 1—Main Defects Categories", "Level 2—Defects in Process Steps", "Level 3—Defects Codes and Descriptions", and "Level 4—Defects Details." In addition, a "Definitions" icon may be presented to the user.

Top level defect classifications are assigned for the Level 1 defects category, and clicking on the Level 1 icon will result a tabulation of the top level defects, and example of which is shown in FIG. 33. As illustrated, the tabulation includes a "defect ID" and a "defect description" for the top level defects, such as mechanical, optical, SMT, and electronic.

Figure 34:
FIG. 34 is an example of a window depicting a tabulation of defects in level 2.

Process level defect classifications are assigned for the Level 2 defects category, and clicking on the Level 2 icon will result in a tabulation of the process level defects, an example of which is shown in FIG. 34. As illustrated, the tabulation includes a "defect ID" and a "defect description" for the process level defects, such as those listed in FIG. 33.

Defects codes and descriptions are assigned for the Level 3 defects category, and clicking on the Level 3 icon will result in a tabulation of the defect codes and descriptions, an example of which is shown in FIG. 35. As illustrated, the tabulation includes a "defect ID" and a "defect description" for a variety of defects, such as those listed in FIG. 35.

Designation of responsibility as either internal or external classifications are assigned for the Level 4 defects category, and clicking on the Level 4 icon will result in a tabulation of the defect details, an example of which is shown in FIG. 36. As illustrated, the tabulation includes a "defect ID" and a "defect description" for different designations of responsibility, such as company responsible or vendor responsible.

The "definitions" icon, previously mentioned, allows the user to easily obtain definitions for all the defects. In a preferred embodiment, the user is presented with a top level defects tree of top level defects folder, whereby clicking on any top level defects folder then presents the user with a number of defects sub-folders.

Module Defects Metrics

Figure 37:
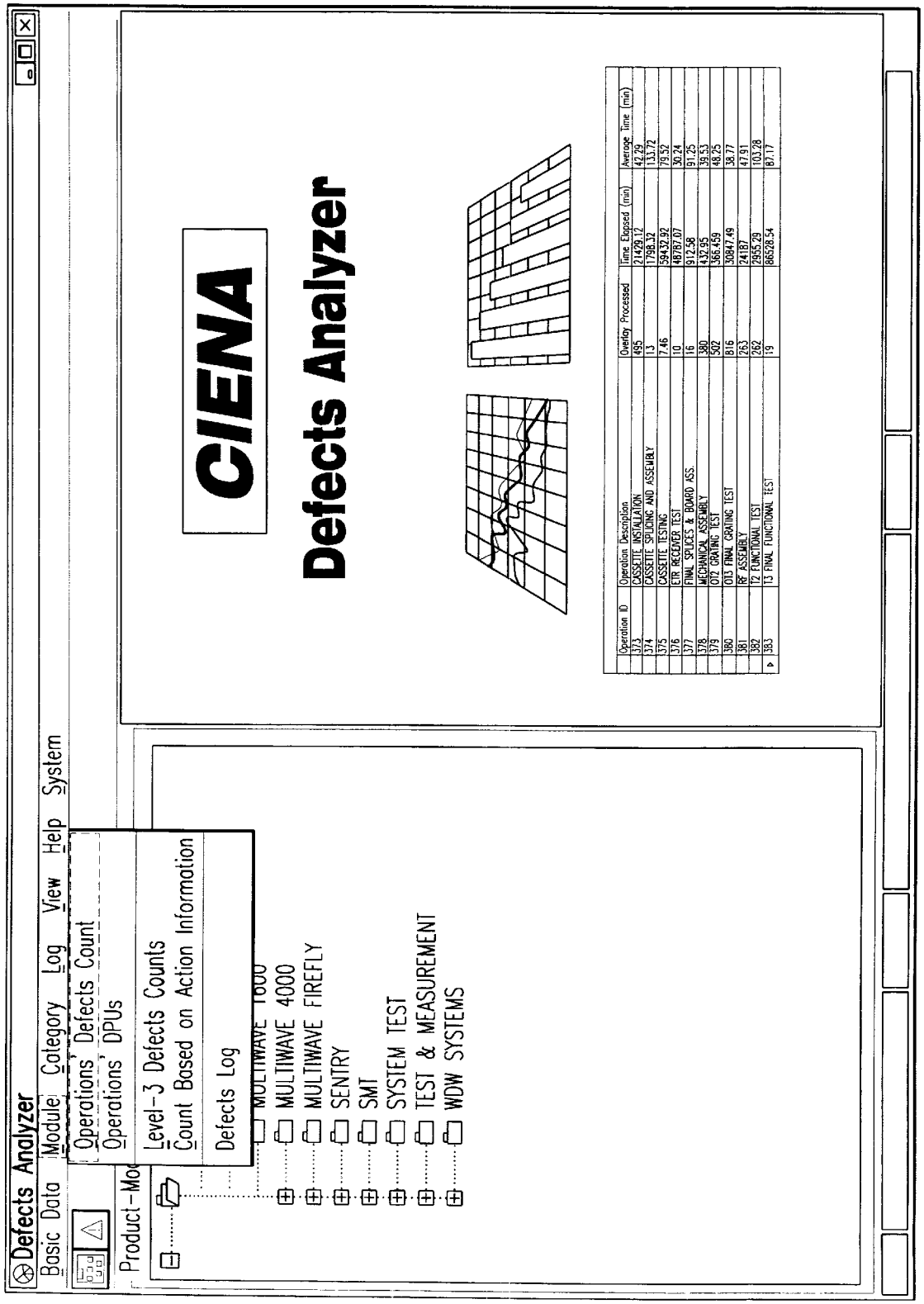
FIG. 37 depicts an example of a module defects classification menu screen.

This aspect of the exemplary embodiment provides the capability for the user to obtain metrics for module defects for any periods of time. FIG. 37 illustrates the defects analyzer screen of the present embodiment, in which the "module" icon has been opened to show a number of available metrics for module defects. In this embodiment, these include "Operations Defects Counts", "Operations' DPUs" (defects per unit), "Level 3 Defects Counts", "Count Based on Action Information", and "Defects Log."

As with the production analyzer, the first step in examining module defects is to identify the subject of study. Subjects of study are determined by first specifying a product, and then by specifying one or more modules which make up the product. This process is similar to that described above for the production analyzer, except that the user is made to work from the main menu screen of the defects analyzer (such as that shown in FIG. 32.) Once again, for purposes of explanation, the receiver of the MULTIWAVE 4000™ system will be the subject of study in the explanation that follows. This subject is specified by first selecting the "MULTIWAVE 4000" folder in the Product List of the menu screen, and then by selecting the "RECEIVER" among the list of module making up the MULTIWAVE 4000™ system.

Module Defects—Operations Defects Count

An explanation will now be given of the user sequences and GUI's associated with the operations defects count. Again, in this example, the subject of study is the receiver of the MULTIWAVE 4000™ system. The operations defects count metric is selected by double-clicking on the appropriate icon(s) appearing on the menu screen of FIG. 37. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

Figure 38:
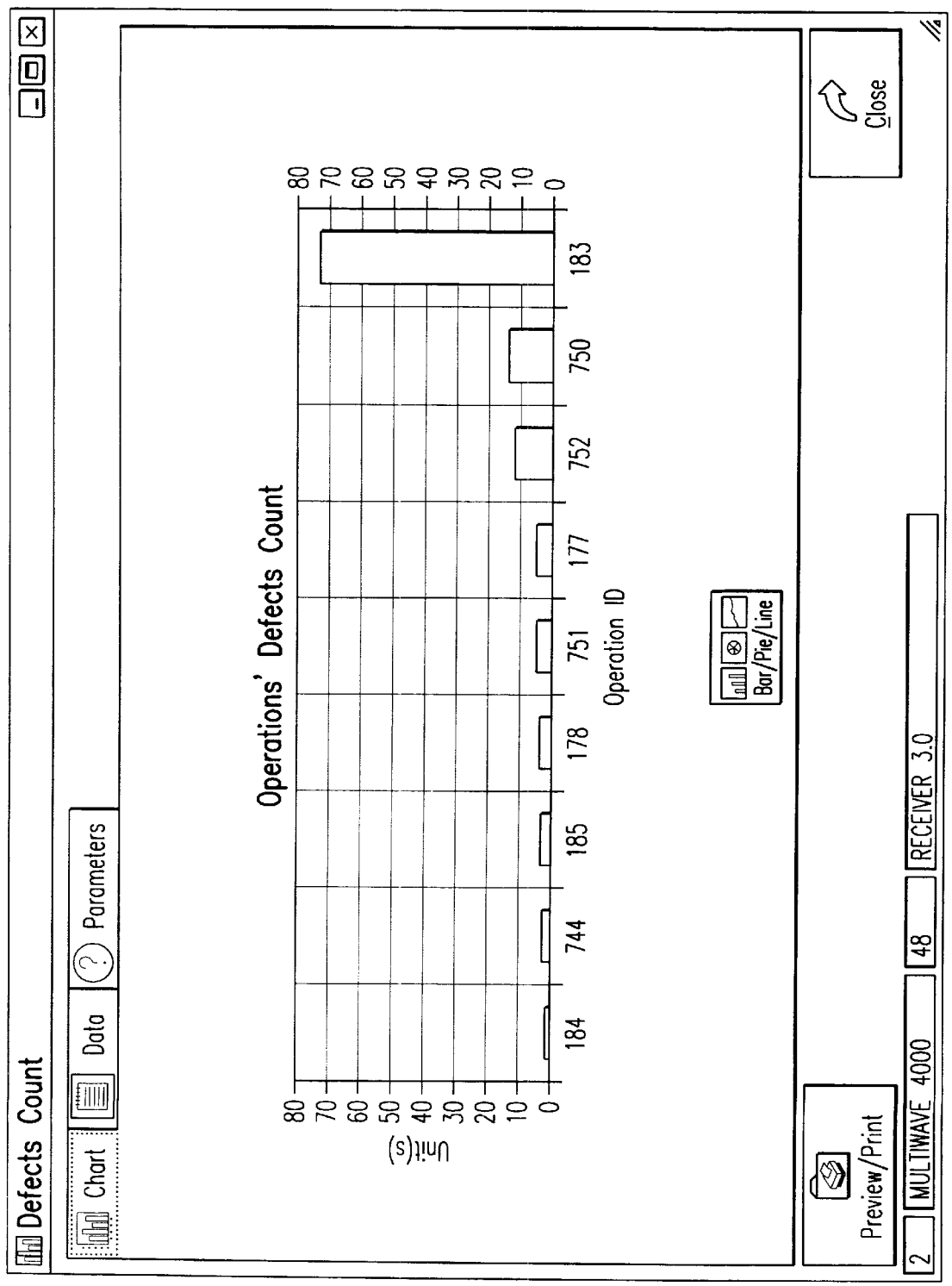
FIG. 38 is an example of a window depicting a defects count for operations of a subject of study.

By clicking on the "continue" icon shown in FIG. 15, the user will be presented with a graphical view of a operations defects count analysis shown, by way of example, in FIG. 38. In the figure, the x-axis of the bar graph shows the identification number of each operation employed to manufacture the subject, namely, the receiver of the MULTI-WAVE 4000™ system. The y-axis illustrates an number (or count) of defects for each operation. In this exemplary embodiment, an additional icon is provided (shown below the operation ID in FIG. 38) for allowing the user to select alternative graphical presentations, such as a pie chart or a line graph.

Details of any individual operation can be viewed by clicking on the operation ID, or the corresponding bar(s), of the operation of interest. A resulting screen is shown by way of example in FIG. 39. Here, the screen the operation ID, an operation description, and a defect count. This window of the exemplary embodiment is further equipped with an "actions" icon and a "distribution" icon.

Figure 39:
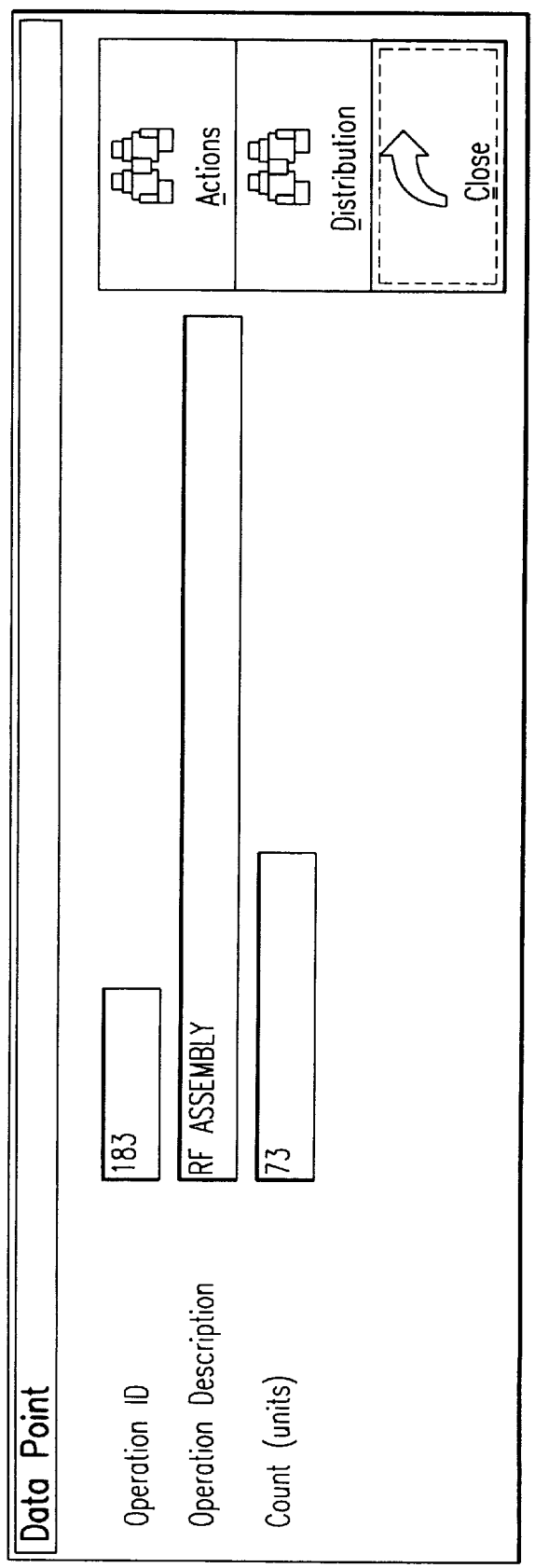
FIG. 39 is an example of a window showing a defect count for a selected operation.
Figure 40:
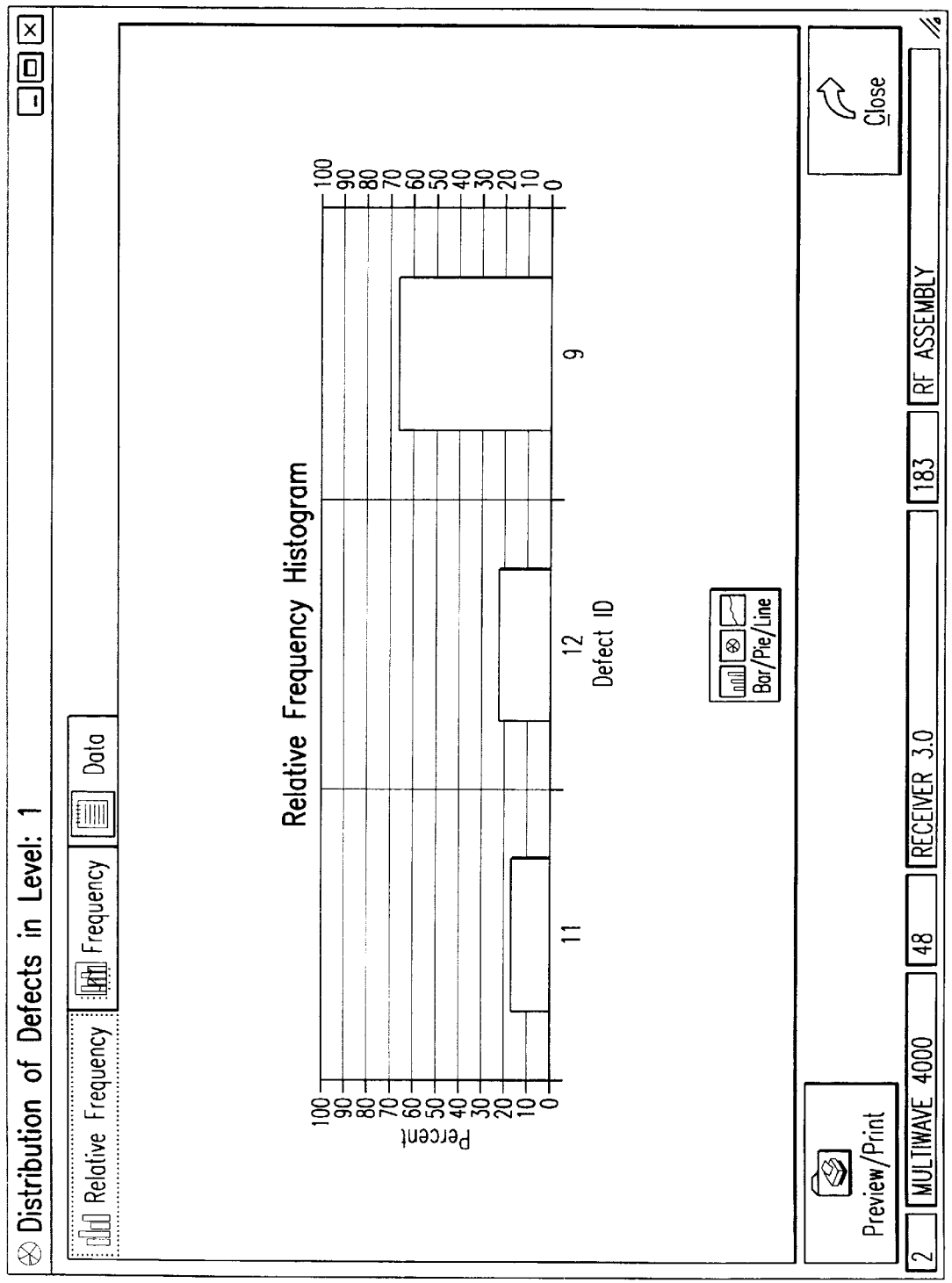
FIG. 40 is an example of a window showing a relative frequency of top level defects for a selected operation.

The distribution icon of FIG. 39 presents the user with a window showing the histogram of the "relative" frequency of the top levels defects for the selected operation of the subject of study. An example of this window is shown in FIG. 40. The x-axis shows the defects ID (9-electronic, 12-SMT, and 11-optical), whereas the y-axis the defect frequency in terms of percentages for the selected operation. By clicking on the "frequency" icon shown in FIG. 40, the user is presented with a bar graph showing a count (as opposed to a percentage) of each top level defect for the selected operation. Likewise, by clicking on the "data" icon shown in FIG. 40, the user is presented with a tabulation of the data illustrated in bar graph form in FIG. 40. Such a tabulation preferably includes the defect ID, a description of the top level defect (optical, SMT, electronic), a defect count, and a relative percentage.

In this exemplary embodiment, an additional icon is provided (shown below the operation ID in FIG. 38) for allowing the user to select alternative graphical presentations, such as a pie chart or a line graph. The window of FIG. 40 also includes a "preview/print" icon. In the exemplary embodiment, clicking on this button would allow the user to view and/or print a report containing the data of these figures in numerical spreadsheet format.

Returning to FIG. 39, clicking on the "actions" icon will present the user with a tabulation of the defects associated with the selected operation, as well as "action information" describing actions taken in response to the defect. An example of this window is shown in FIG. 41. This exemplary table includes, among other things, an action ID, an action description, and action info, for each defect.

Module Defects—Operations DPUs

An explanation will now be given of the user sequences and GUI's associated with the operations DPUs (defects per unit) metric. Again, in this example, the subject of study is the receiver of the MULTIWAVE 4000™ system. The operations DPUs metric is selected by double-clicking on the appropriate icon(s) appearing on the menu screen of FIG. 37. This results in the display of a "report parameters" window screen, an example of which is shown in FIG. 15 and previously described. As above, in the example that follows, a start date of May 1, 1998 and an end date of May 31, 1998 have been adopted, both shifts have been selected, and no particular operator or workstation is specified.

Figure 42:
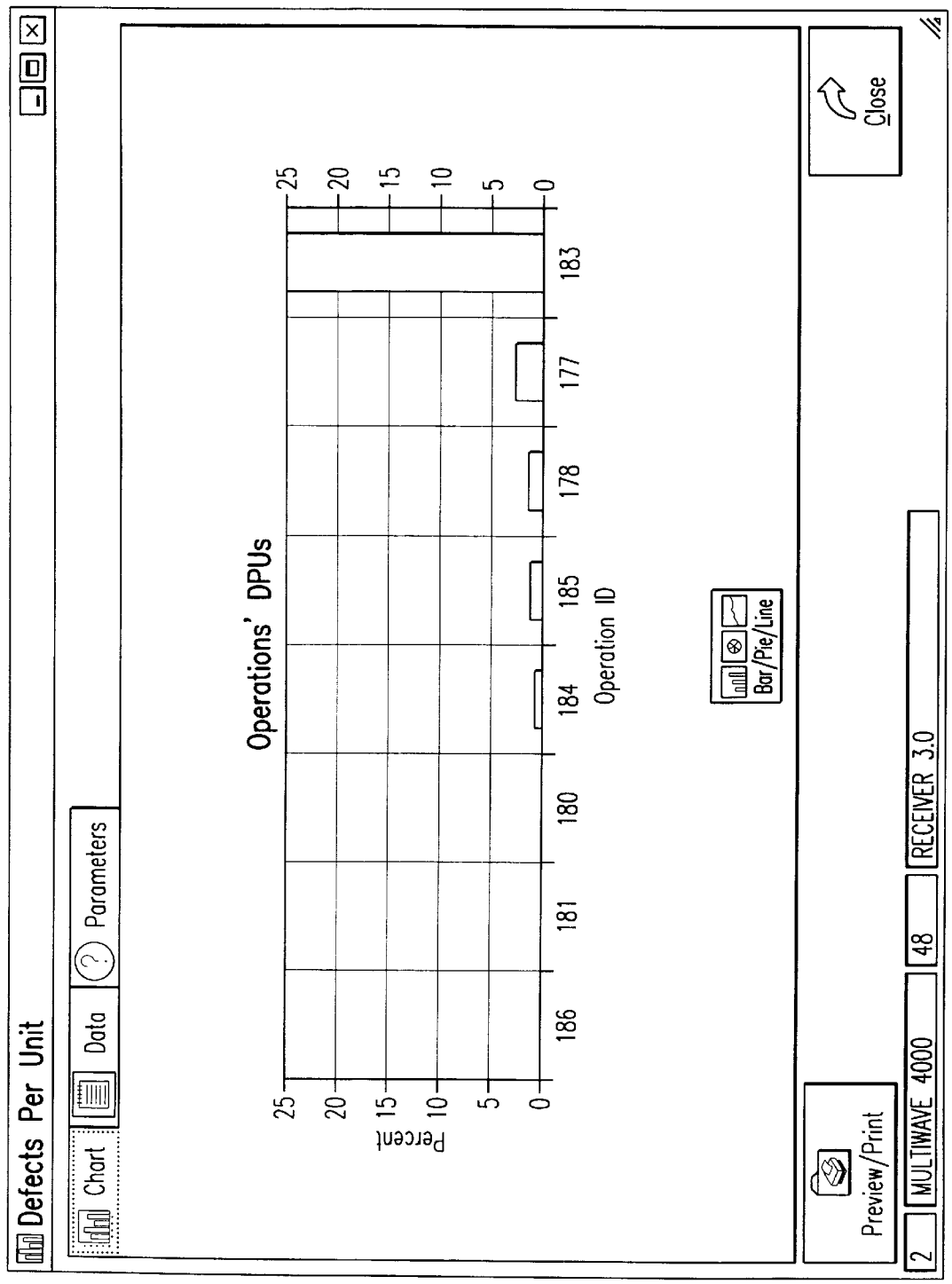
FIG. 42 is an example of a window depicting operation defects per unit for the subject of study.

By clicking on the "continue" icon shown in FIG. 15, the user will be presented with a graphical view of a operations DPUs analysis shown, by way of example, in FIG. 42. In the figure, the x-axis of the bar graph shows the identification number of each operation employed to manufacture the subject, namely, the receiver of the MULTIWAVE 4000™ system. The y-axis illustrates the DPUs in terms of percentages for each operation. That is, the DPU for an operation is the ratio between the number of defects and the quantity processed for the operation. Also, in this exemplary embodiment, an additional icon is provided (shown below the operation ID in FIG. 42) for allowing the user to select alternative graphical presentations, such as a pie chart or a line graph.

Figure 43:
FIG. 43 is an example of a window showing details of the defects per unit for a selected operation.

Details of any individual operation can be viewed by clicking on the operation ID, or the corresponding bar(s), of the operation of interest. A resulting screen is shown by way of example in FIG. 43. Here, the screen displays the operation ID, an operation description, a defects count, a quantity processed, and a DPU (percentage).

By clicking on the "data" icon shown in FIG. 42, the user is presented with a tabulation of the data illustrated in bar graph form in FIG. 41. Such a tabulation preferably includes, for each operation, an operation ID, an operation description, a defects count, a quantity processed, and a DPU (percentage). Likewise, by clicking on the "preview/print" icon, the user is permitted to view and/or print a report containing the data of these figures in numerical spreadsheet format, graphical format, or a combination thereof.

Module Defects—Level 3 Defects Count

An explanation will now be given of the user sequences and GUI's associated with the Level 3 defects count metric. Once again, in this example, the subject of study is the receiver of the MULTIWAVE 4000™ system. The Level 3 defects count metric is selected by double-clicking on the appropriate icon(s) appearing on the menu screen of FIG. 37. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

Figure 44:
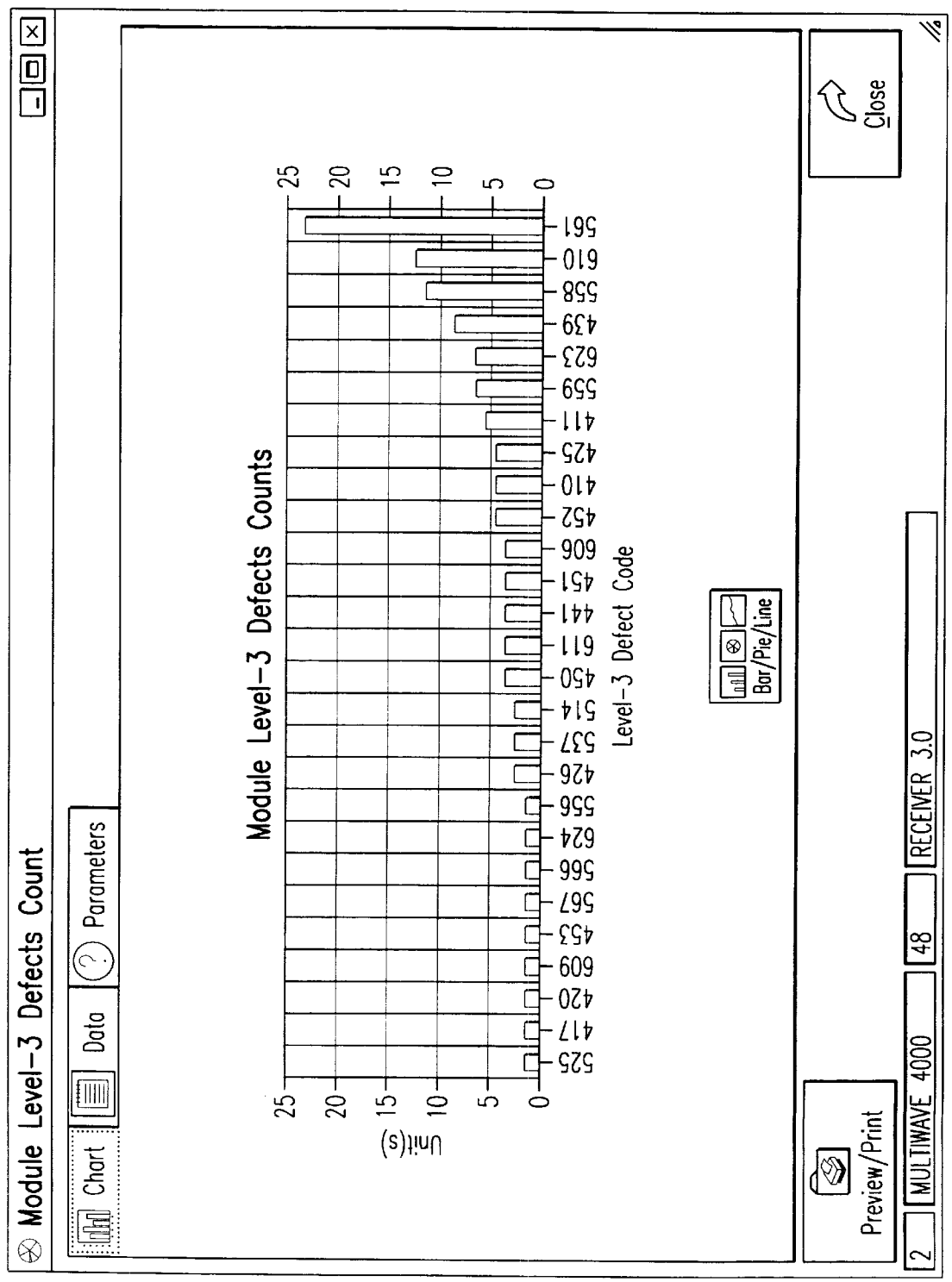
FIG. 44 is an example of a window showing module level 3 defects counts for the subject of study.

By clicking on the "continue" icon shown in FIG. 15, the user will be presented with a graphical view of a Level 3 defects count analysis shown, by way of example, in FIG. 44. In the figure, the x-axis of the bar graph shows the identification number of each Level 3 defect encountered during the manufacture of the subject, namely, the receiver of the MULTIWAVE 4000™ system during the specified time period. The y-axis illustrates the count of each Level 3 defect. This screen also includes a "data" icon which may be used to view the action data in tabular form. Such a table preferably includes the defect ID, a defect description, a defect count, and a relative percentage, for all defects forming the bar graph of FIG. 44. Also, in this exemplary embodiment, an additional icon is provided (shown below the operation ID in FIG. 44) for allowing the user to select alternative graphical presentations, such as a pie chart or a line graph.

Details of any individual Level 3 defect can be viewed by clicking on the defect ID, or the corresponding bar(s), of the defect of interest. A resulting screen is shown by way of example in FIG. 45. Here, the screen displays the defect ID, a defect description, a defect count, and a relative percentage of the defect.

Figure 45:
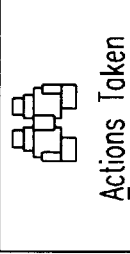
FIG. 45 is an example of a window showing details of a level 3 defect count for a selected defect code.
Figure 46:
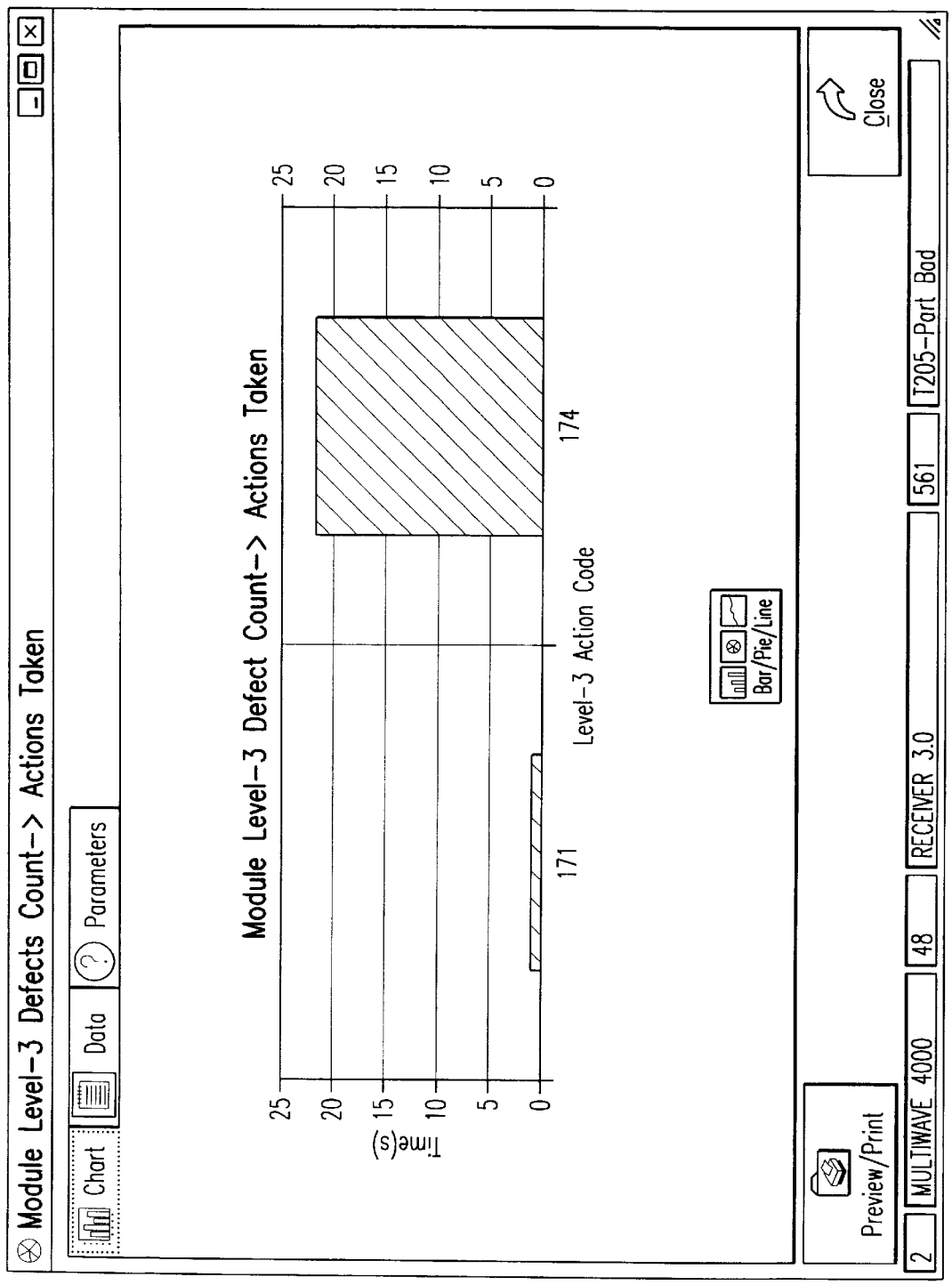
FIG. 46 is an example of a window depicting relative action counts for a selected defect code.

The exemplary screen of FIG. 45 also includes an "action taken" icon. Clicking on this icon will present the user with information regarding the action taken in response to the defect of interest. An example of this is shown in FIG. 46. This screen illustrates in bar graph form the count of each action type associate with the defect. The x-axis shows the identification code of each action, and the y-axis shows the count of each action. This screen also includes a "data" icon which may be used to view the action data in tabular form, as well as an additional icon (shown below the action code) for allowing the user to select alternative graphical presentations, such as a pie chart or a line graph.

Finally, by clicking on the "preview/print" icon of the screens of FIGS. 44 and 46, the user is permitted to view and/or print a report containing the data of these figures in numerical spreadsheet format, graphical format, or a combination thereof Module Defects—Counts Based on Action Information An explanation will now be given of the user sequences and GUI's associated with the counts based on action information metric. As before, in this example, the subject of study is the receiver of the MULTIWAVE 4000™ system. The counts based on action information metric is selected by double-clicking on the appropriate icon(s) appearing on the menu screen of FIG. 37. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

By clicking on the "continue" icon shown in FIG. 15, the user will be presented with a tabulation of defects counts based on action information as shown, by way of example, in FIG. 47. This exemplary screen illustrates in tabular form the defects encountered and resultant action information for each of the operations of the subject of study for the selected time period. In particular, the screen shows the operation ID, an operation description, the defect code, a defect description, the action ID, an action description, action information, a defects count, and a relative percentage of each defect. Also, in this example, a "preview/print" icon is provided to allow the user to obtain a printout of the data illustrated in FIG. 47.

Module Defects—Defects Log

An explanation will now be given of the user sequences and GUI's associated with the module defects log. As before, in this example, the subject of study is the receiver of the MULTIWAVE 4000™ system. The counts based on action information metric is selected by double-clicking on the appropriate icon(s) appearing on the menu screen of FIG. 37. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

By clicking on the "continue" icon shown in FIG. 15, the user will be presented with a tabulation of defects counts based on action information as shown, by way of example, in FIG. 48. As shown, this exemplary screen illustrates in defects list for the subject of study for the selected time period. Further, the low half of the screen contains detailed information for the highlighted defect in the defect list. For example, the detailed information includes data describing the operation, defect, and action information for all listed defects. In particular, the screen shows the operation ID, an operation description, the defect code, a defect description, the action ID, an action description, action information, a defects count, and a relative percentage of each defect.

Category Defects Metrics

Figure 49:
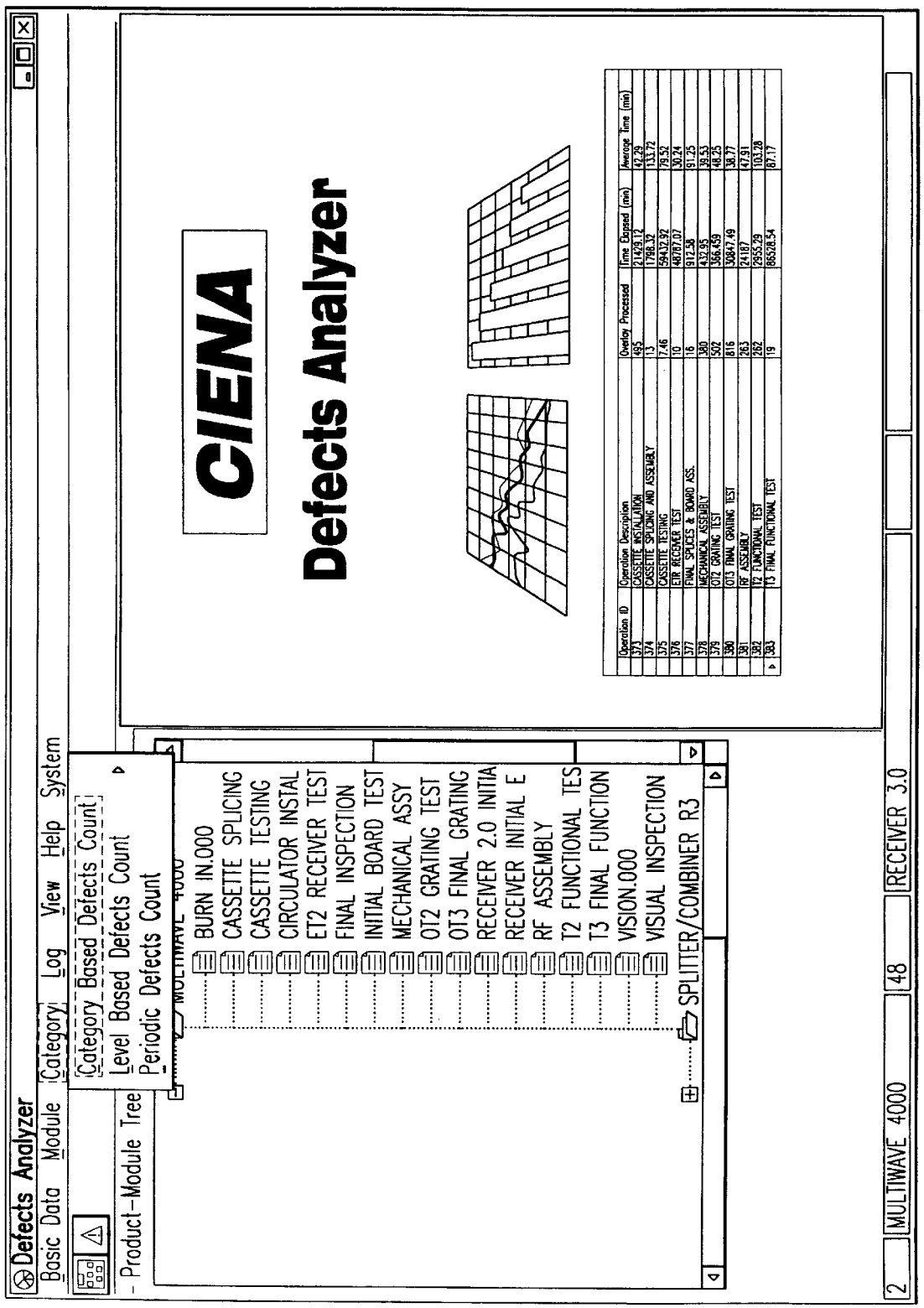
FIG. 49 depicts an exemplary category defects classification menu screen.

This aspect of the exemplary embodiment provides the capability for the user to obtain metrics for a variety of categories for any periods of time. FIG. 49 illustrates the defects analyzer screen of the present embodiment, in which the "category" icon has been opened to show a number of available metrics for category defects. In this embodiment, these include "Category Based Defects Count", "Level Based Defects Count", and "Period Defects Count."

As with the production analyzer, the first step in examining category defects is to identify the subject of study. Subjects of study are determined by first specifying a product, and then by specifying one or more modules which make up the product. This process is similar to that described above for the production analyzer, except that the user is made to work from the main menu screen of the defects analyzer (such as that shown in FIG. 32.) Once again, for purposes of explanation, the receiver of the MULTIWAVE 4000™ system will be the subject of study in the explanation that follows. This subject is specified by first selecting the "MULTIWAVE 4000" folder in the Product List of the menu screen, and then by selecting the "RECEIVER" among the list of module making up the MULTIWAVE 4000™ system.

Category Defects Metric—Category Based Defects Count

An explanation will now be given of the user sequences and GUI's associated with the category based defects counts. As before, in this example, the subject of study is the receiver of the MULTIWAVE 4000™ system. The category based defects count metric is selected by double-clicking on the appropriate icon(s) appearing on the menu screen of FIG. 49. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

Figure 50C:
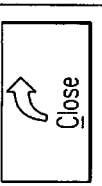

By clicking on the "continue" icon shown in FIG. 15, the user will be presented with a tabulation of the category information for each defect as shown, by way of example, in FIG. 50. As shown, this exemplary screen illustrates, for each defect, the level ID and defect description for all four levels of defects for the subject of study for the selected time period. Further, the screen illustrates a defect count, as well as a relative percentage of each defect encountered. The "preview/print" icon is provided as a mechanism for the user to obtain a hard copy report of the illustrated data.

Category Defects Metric—Levels Based Defects Count

An explanation will now be given of the user sequences and GUI's associated with the levels based defects counts. Again, in this example, the subject of study is the receiver of the MULTIWAVE 4000™ system. The levels based defects count metric is selected by double-clicking on the appropriate icon(s) appearing on the menu screen of FIG. 49. This results in the display of four additional icon for selection, i.e., "Level 1 Defects (Main Categories)", "Level 2 Defects (in Process Steps)", "Level 3 Defects (Codes and Descriptions)", and "Level 4 Defects (Details)". Each of these is discussed below. However, regardless of which icon is selected, a "report parameters" window screen is presented, an example of which is shown in FIG. 15 and previously described. As above, in the example that follows, a start date of Apr. 1, 1998 and an end date of May 31, 1998 have been adopted, both shifts have been selected, and no particular operator or workstation is specified.

Figure 51A:
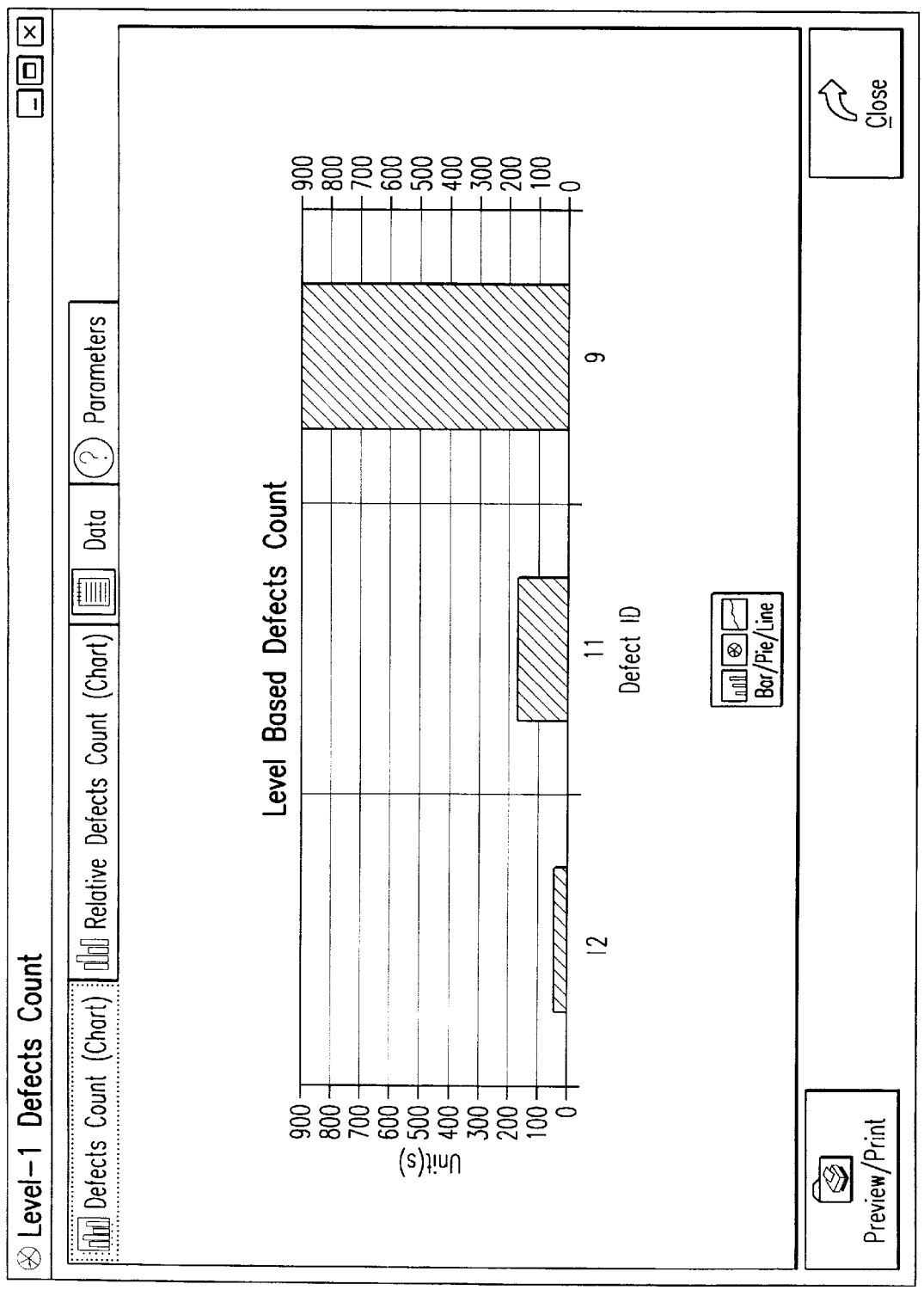
FIGS. 51A–51B are an example of a window depicting a count a level 1 defects for the subject of study.
Figure 51B:
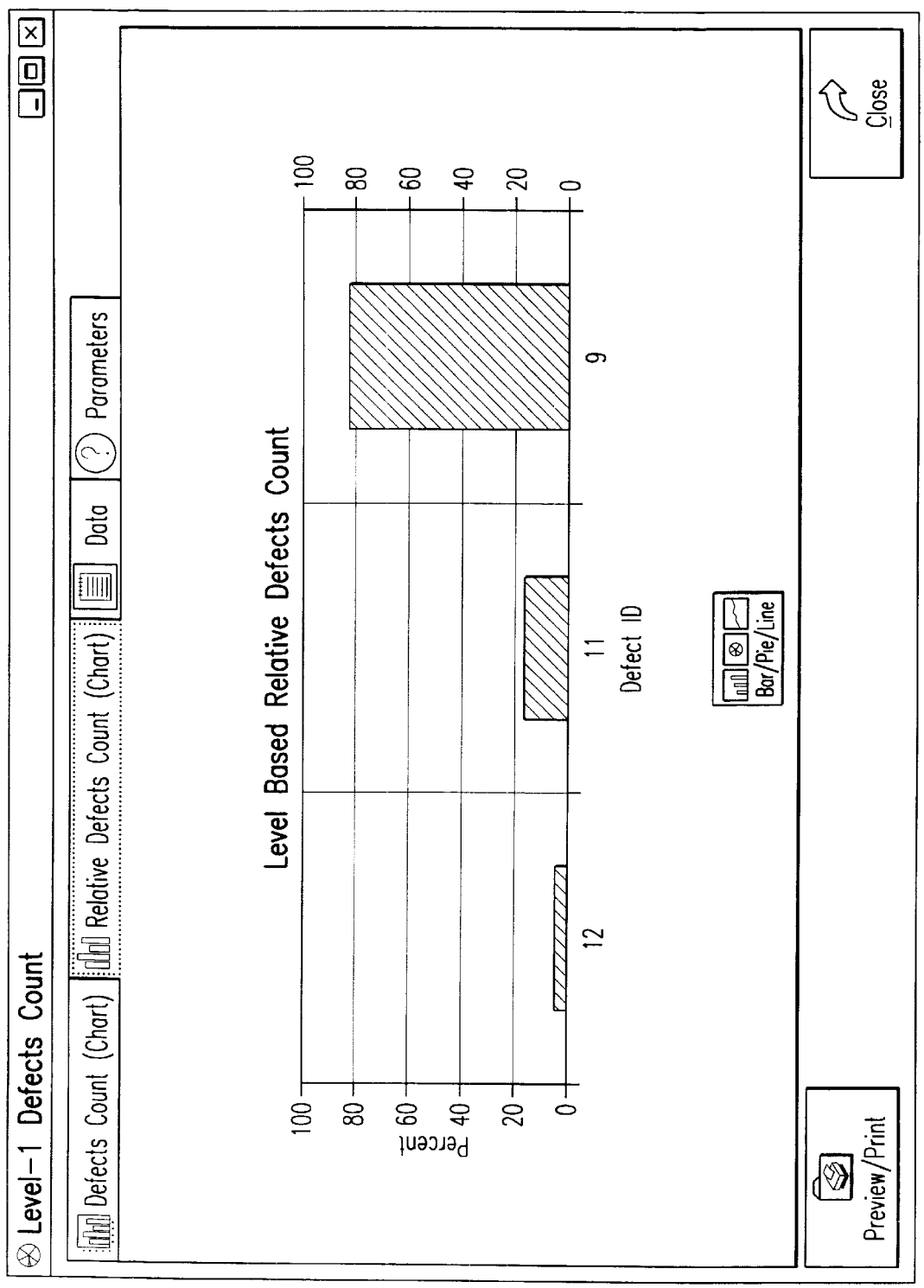

In the case where the "Level 1 Defects" icon has been previously selected, by then clicking on the "continue" icon shown in FIG. 15, the user will be presented with a graphical view of the count of Level 1 defects, as shown, by way of example, in FIG. 51. The x-axis of this example shows the defect ID code for the Level 1 defects (SMT, optical, and electronic). The y-axis shows the number of defect counts for each Level 1 defect.

Details of any individual Level 1 defect can be viewed by clicking on the defect ID, or the corresponding bar(s), of the defect of interest. For example, the user would be presented with a table containing information for each defect making up the defects of the Level 1 count. Further, the exemplary screen of FIG. 51 includes a "relative defects count" icon for viewing the chart in relative percentages, and a "data" icon for viewing the data of FIG. 51 in tabular form.

Further, in this exemplary embodiment, an additional icon is provided (shown below the operation ID in FIG. 51) for allowing the user to select alternative graphical presentations, such as a pie chart or a line graph. The window of FIG. 51 also includes a "preview/print" icon. In the exemplary embodiment, clicking on this button would allow the user to view and/or print a report containing the data of these figures in numerical spreadsheet format.

Figure 52A:
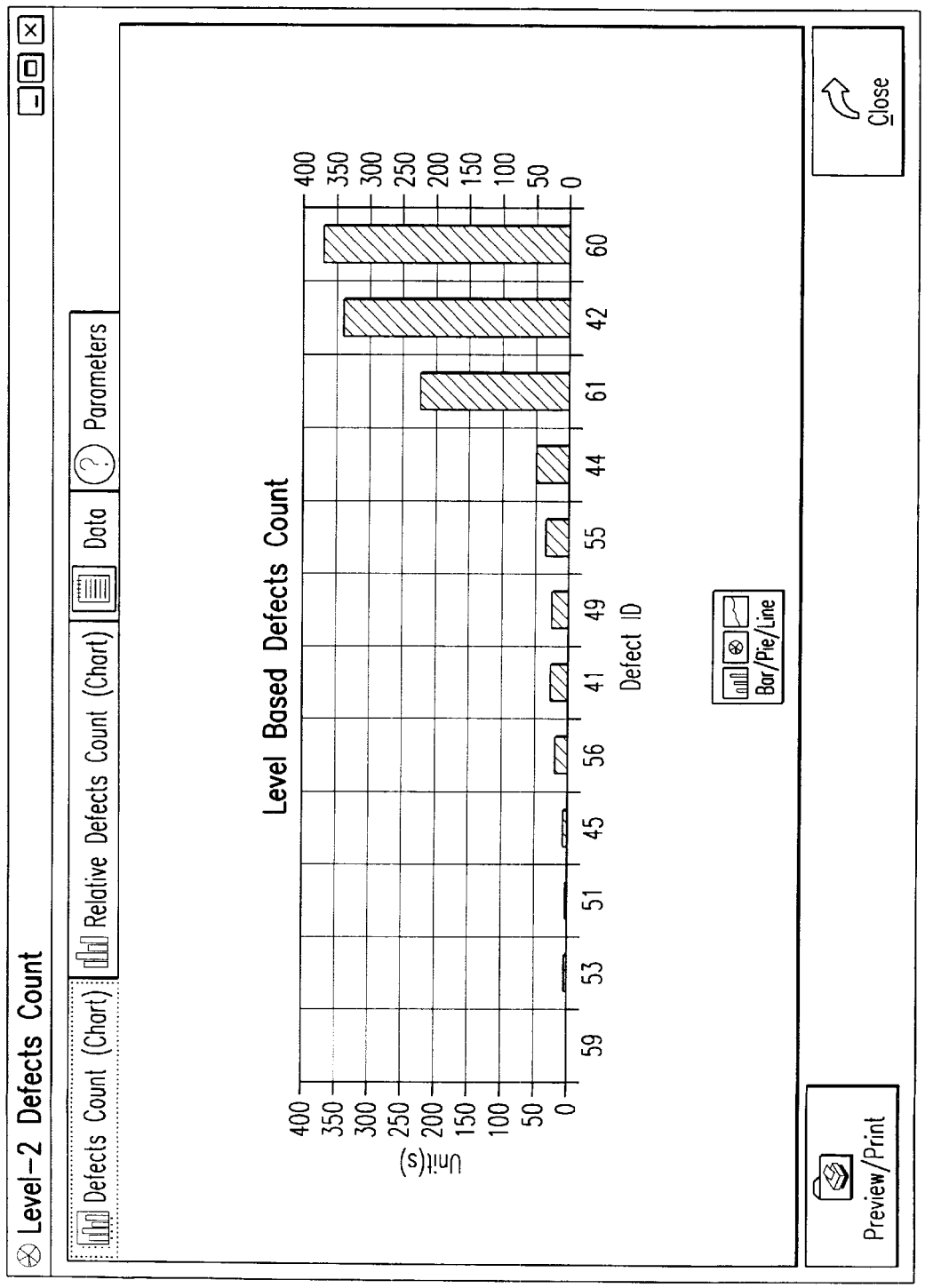
FIGS. 52A–52B are an example of a window depicting a count a level 2 defects for the subject of study.
Figure 52B:
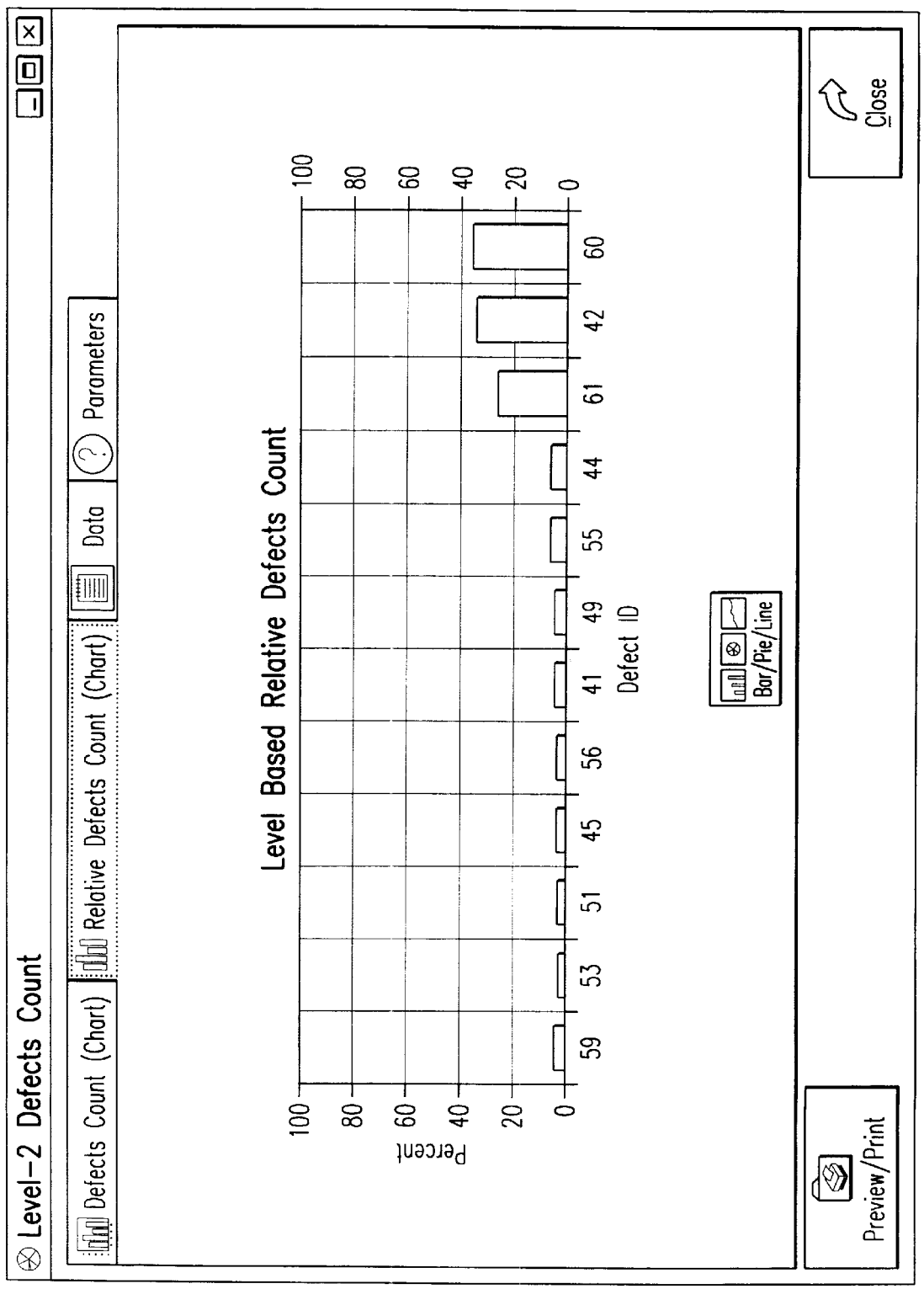
Figure 53A:
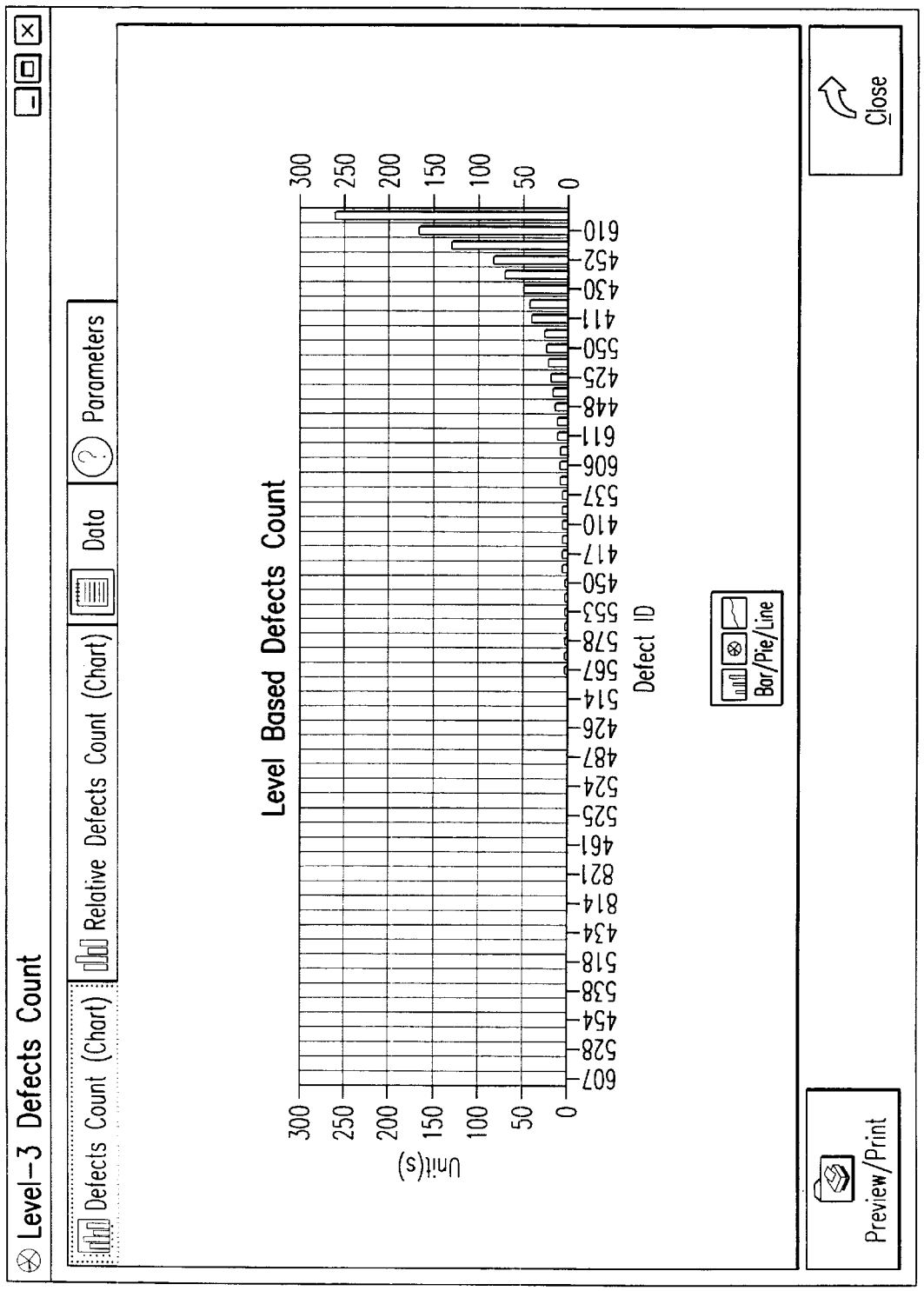
FIGS. 53A–53B are an example of a window depicting a count a level 3 defects for the subject of study.
Figure 53B:
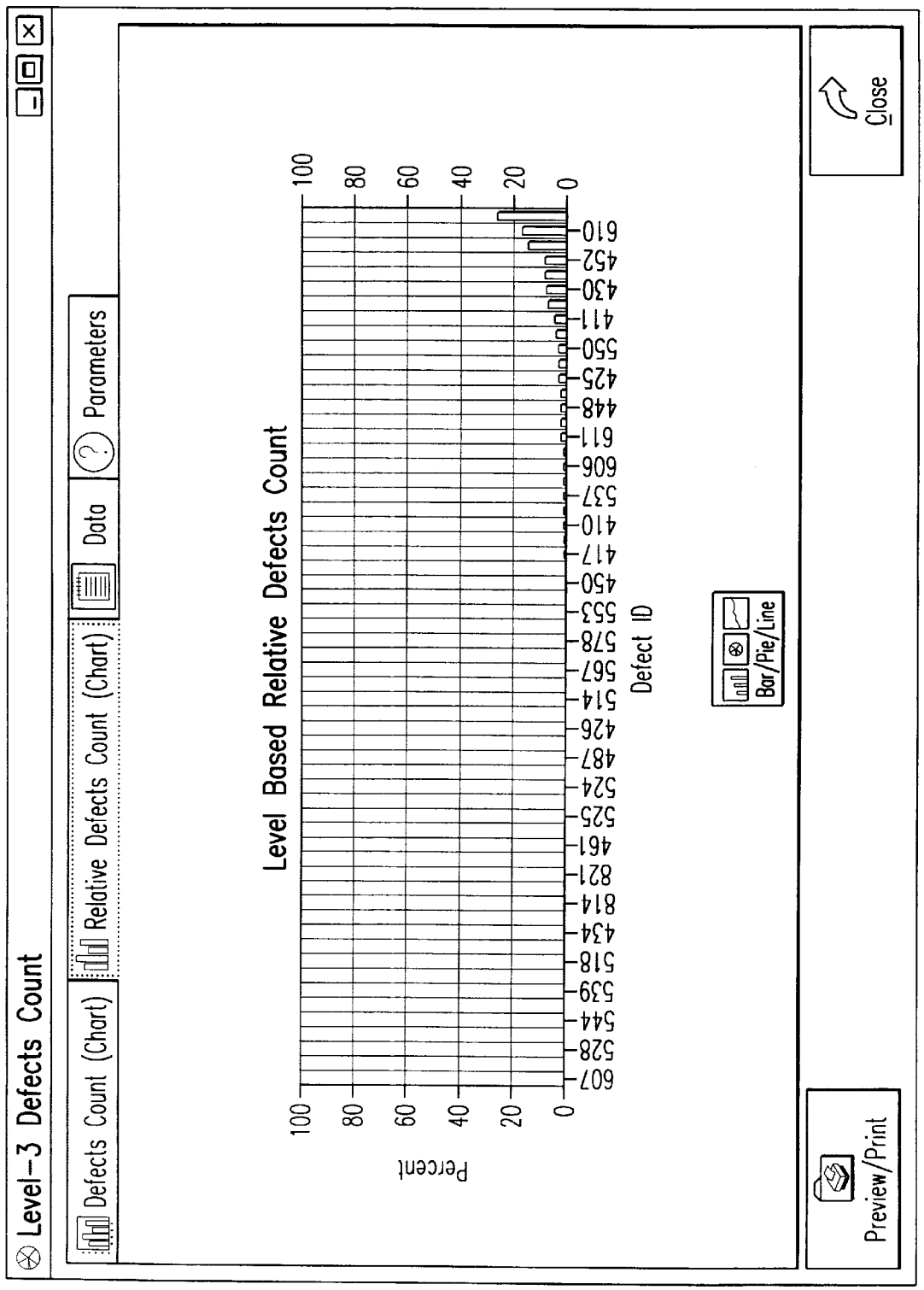
Figure 54A:
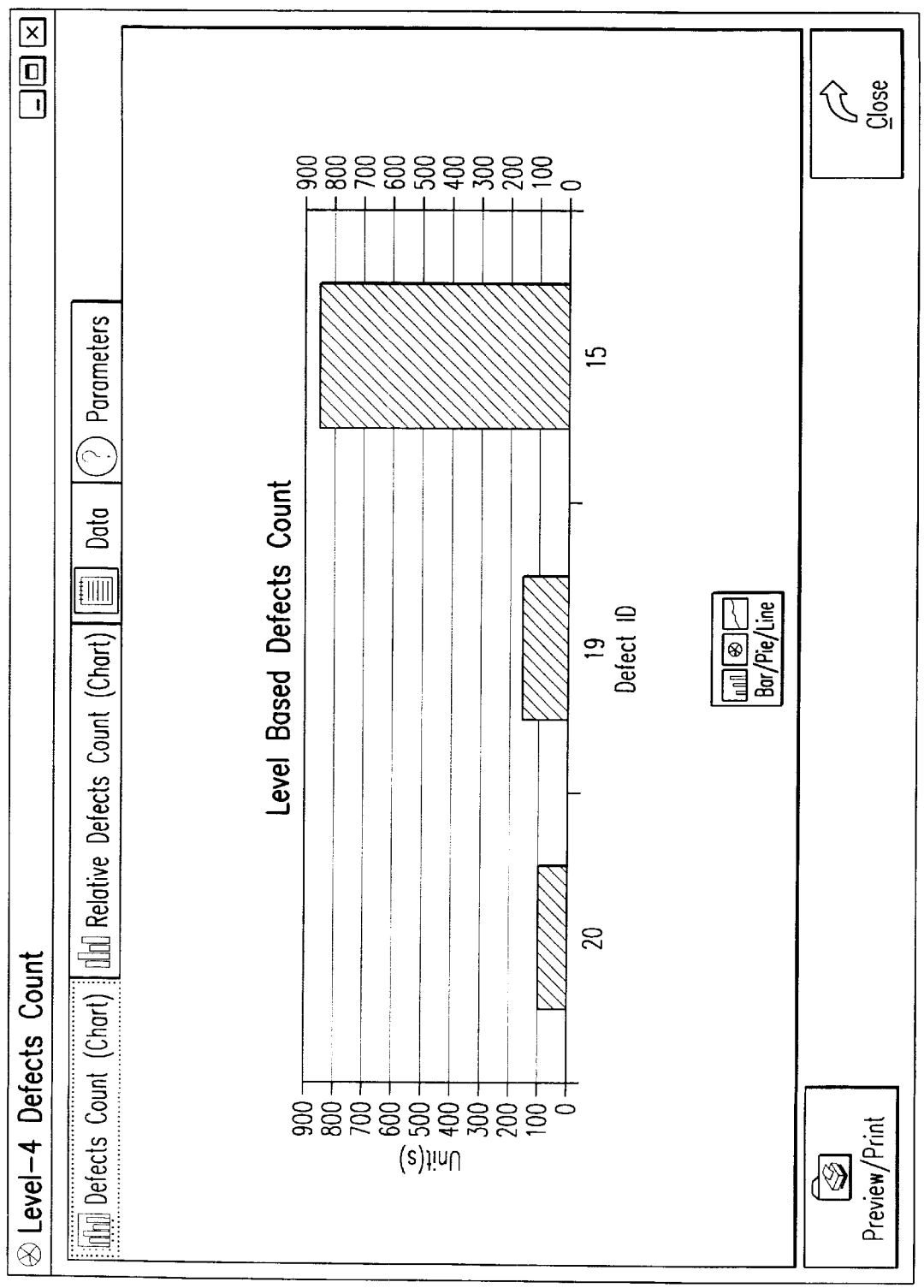
FIGS. 54A–54B are an example of a window depicting a count a level 4 defects for the subject of study.
Figure 54B:
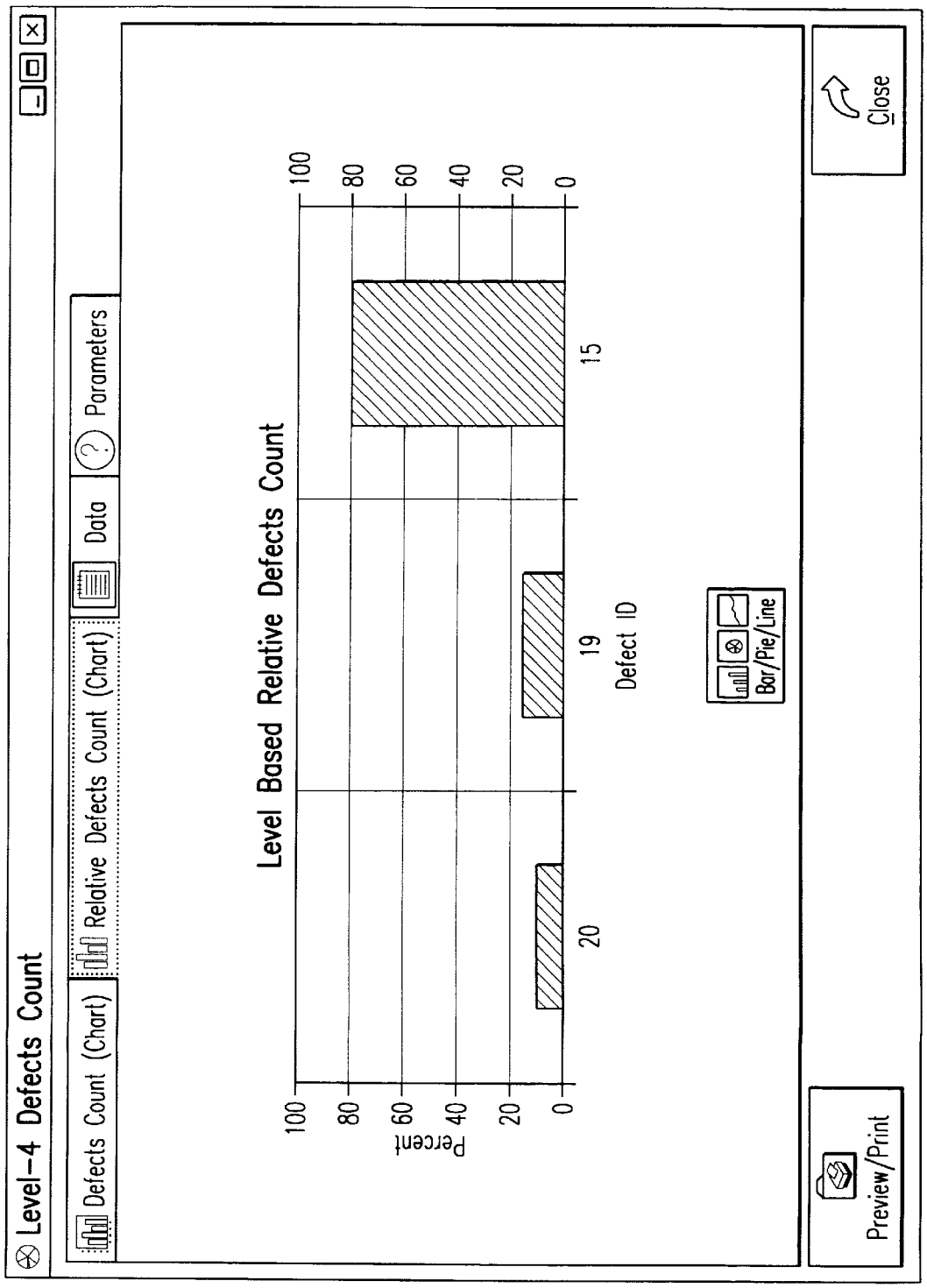

The "Level 2 Defects (In Process)", the "Level 3 Defects (Codes and Descriptions), and the "Level 4 Defects (Details)" options work that same as the "Level 1 Defects (Main Categories)" discussed above. Exemplary screens for Levels 2 through 4 are shown in FIGS. 52, 53 and 54, respectively.

Category Defects Metrics—Periodic Defects Count

An explanation will now be given of the user sequences and GUI's associated with the periodic defects count metric. As before, in this example, the subject of study is the receiver of the MULTIWAVE 4000™ system. The periodic defects count metric is selected by double-clicking on the appropriate icon(s) appearing on the menu screen of FIG. 49. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

Figure 55A:
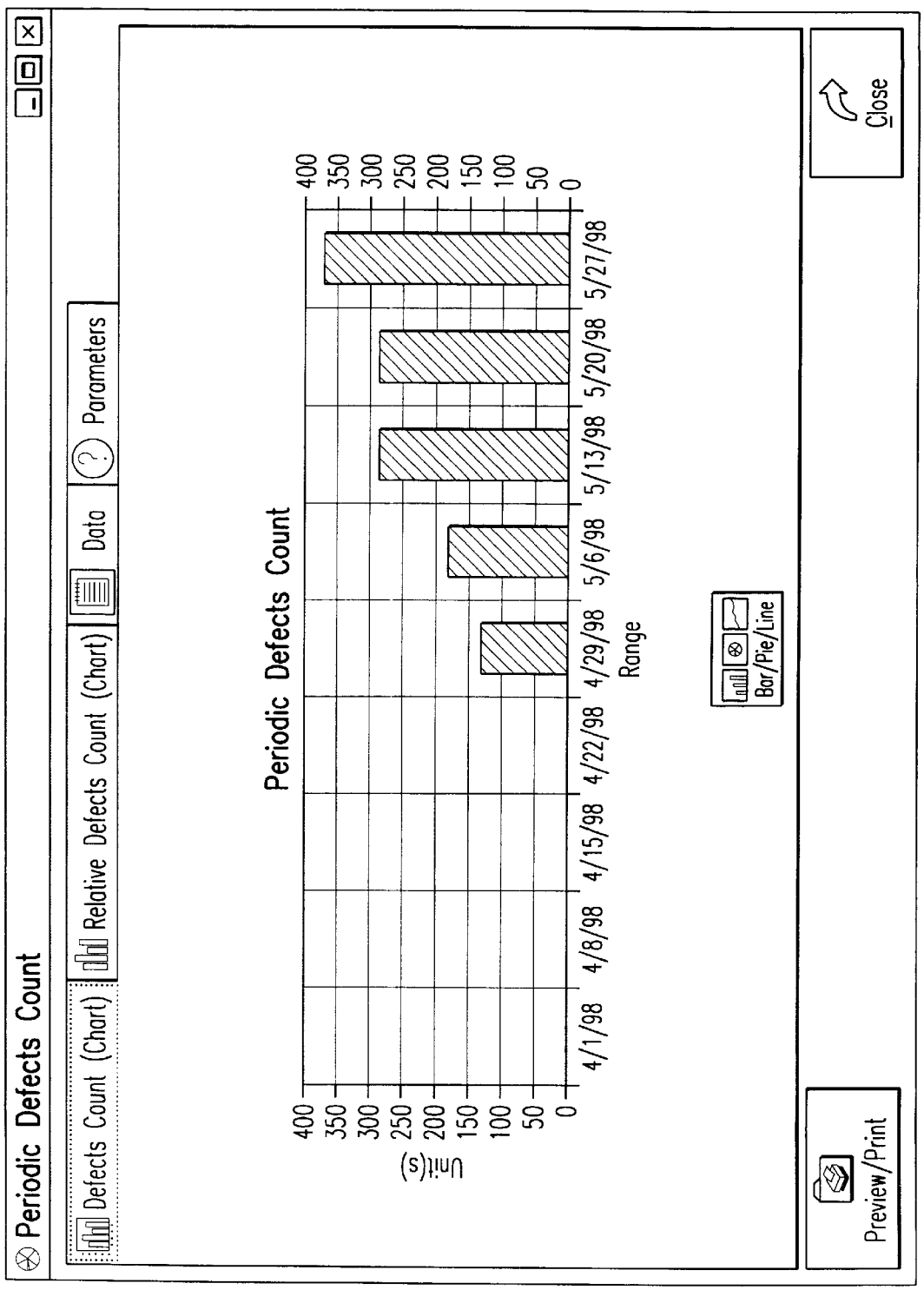
FIGS. 55A–55B are an example of a window depicting periodic defect counts for the subject of study.
Figure 55B:
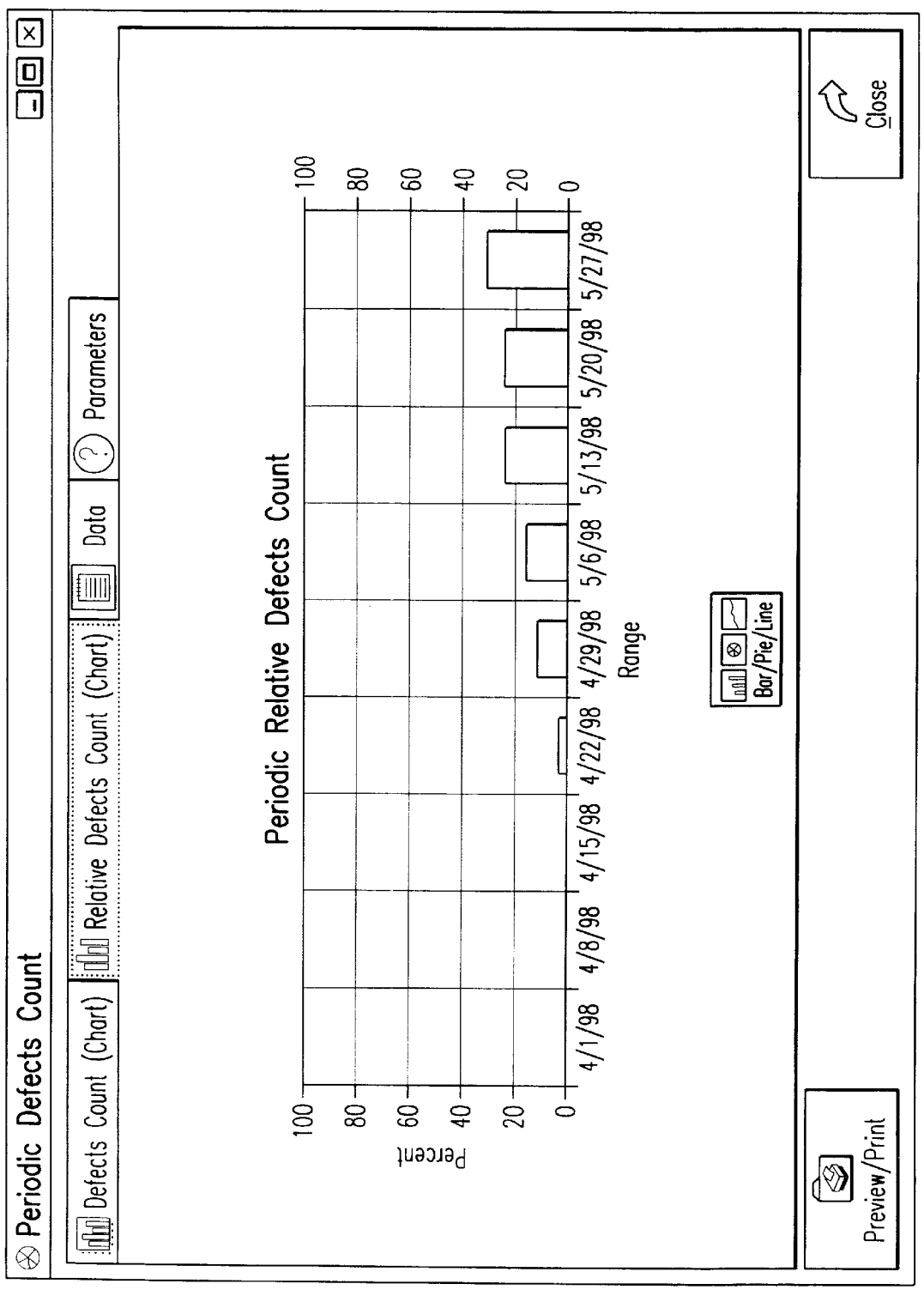

By clicking on the "continue" icon shown in FIG. 15, the user will be presented with a graphical view of the periodic count (e.g., one-week periods) of defects for the subject of study for the selected time period, as shown, by way of example, in FIG. 55. The x-axis of this example shows the periods, and the y-axis shows the number of defect counts for each period.

Details of any individual period can be viewed by clicking on the period designation, or the corresponding bar(s), of the period of interest. For example, the user would be presented with a table containing information of the defects for each period. Further, the exemplary screen of FIG. BP includes a "relative defects count" icon for viewing the chart in relative percentages, and a "data" icon for viewing the data of FIG. 55 in tabular form.

Further, in this exemplary embodiment, an additional icon is provided (shown below the operation ID in FIG. 55) for allowing the user to select alternative graphical presentations, such as a pie chart or a line graph. The window of FIG. 55 also includes a "preview/print" icon. In the exemplary embodiment, clicking on this button would allow the user to view and/or print a report containing the data of these figures in numerical spreadsheet format.

Log

The defects analyzer of the exemplary embodiment also provides the user with easy access to a summary log of all defects for the object of study, and an explanation will now be given of the user sequences and GUI's associated with this feature. As before, in this example, the subject of study is the receiver of the MULTIWAVE 4000™ system. The periodic defects count metric is selected by double-clicking on the appropriate icon(s) appearing on the menu screen of FIG. 49. This results in the display of a "report parameters" window screen, an example of which is shown in FIG. 15 and previously described. As above, in the example that follows, a start date of Apr. 1, 1998 and an end date of May 31, 1998 have been adopted, both shifts have been selected, and no particular operator or workstation is specified.

By clicking on the "continue" icon shown in FIG. 15, the user will be presented with the summary log of all defects as discussed previously in connection with the "module defect metric—defect log". An example of this log is shown in FIG. 48, also previously discussed.

Engineering Analyzer

Parametric Analysis

Figure 56:
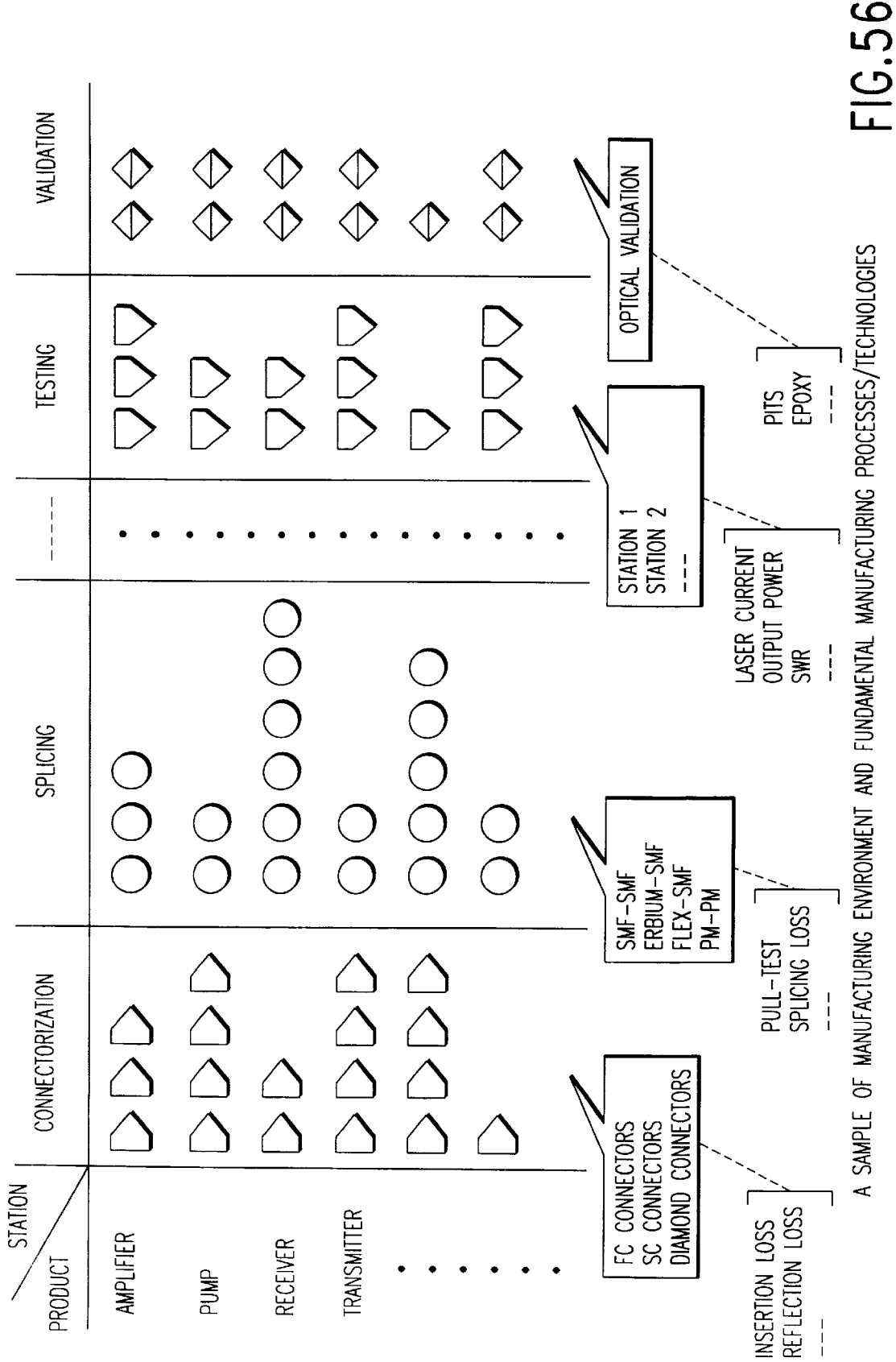
FIG. 56 illustrates a sample of a manufacturing environment and fundamental manufacturing processes and technologies; and, FIG. 57 illustrates an operation oriented representation of an amplifier.

Another aspect of the invention resides in employment of the data analyzer to analyze fundamental processes and technologies in the manufacturing environment. For example, assuming that in a given manufacturing environment, the fundamental processes/technologies are connectorization, splicing, testing, and validation. The engineering analyzer is capable of analyzing engineering factors collected in connectorization (different type of connectors such as FC connectors, SC connectors, and Diamond connectors), splicing (different type of splicing such as Laser Current, Output Power, and SWR), and validation (such as . . . ) stations. Some examples of engineering factors/parameters are Connectorization Insertion Loss, Connectorization Reflection Loss, Splicing Pull Test, and Splicing Loss. The diagram of FIG. 56 represents the manufacturing environment of the example. Example of system outputs are provided below.

Average, Max, Min and Standard Deviation of insertion Loss for all the products (or a specific product) on connectorization stations (for all the stations or any given station).

Average, Max, Min and Standard Deviation of splicing Loss for all the products (or a specific product) on splicing stations (for all the stations or any given station).

Average, Max, Min and Standard Deviation of laser current observed at stations for all the products (or a specific product) on testing stations (for all the stations or any given station).

Quantity of units processed by each fundamental manufacturing process/technology on all the stations or any specific station and for all products or any specific product.

Yield of operations by each fundamental manufacturing process/technology on all the stations or any specific station and for all products or any specific product.

Multi-level Operation Data

Each product consists of one or more components (usually many) that can be identified in different levels. A bill of material (BOM) determines how to build or assemble any specific product. Since manufacturing operations are performed in different levels, according to BOM, the raw data (manufacturing data) is collected in different levels of manufacturing operations. Therefore, the analyzer is configured to analyze the data in any arbitrary level of assembly/manufacturing process. The also addresses data analysis of the data collected during assembly/manufacturing processes in lower levels of operations. The data analyzer is capable of analyzing the data beyond the manufacturing environment including the data that could be obtained from vendors of subassemblies, raw material; the data that is collected in the field where the product is being utilized; the data that is collected when the product is repaired; and the data that can be obtained from customers.

Figure 57:
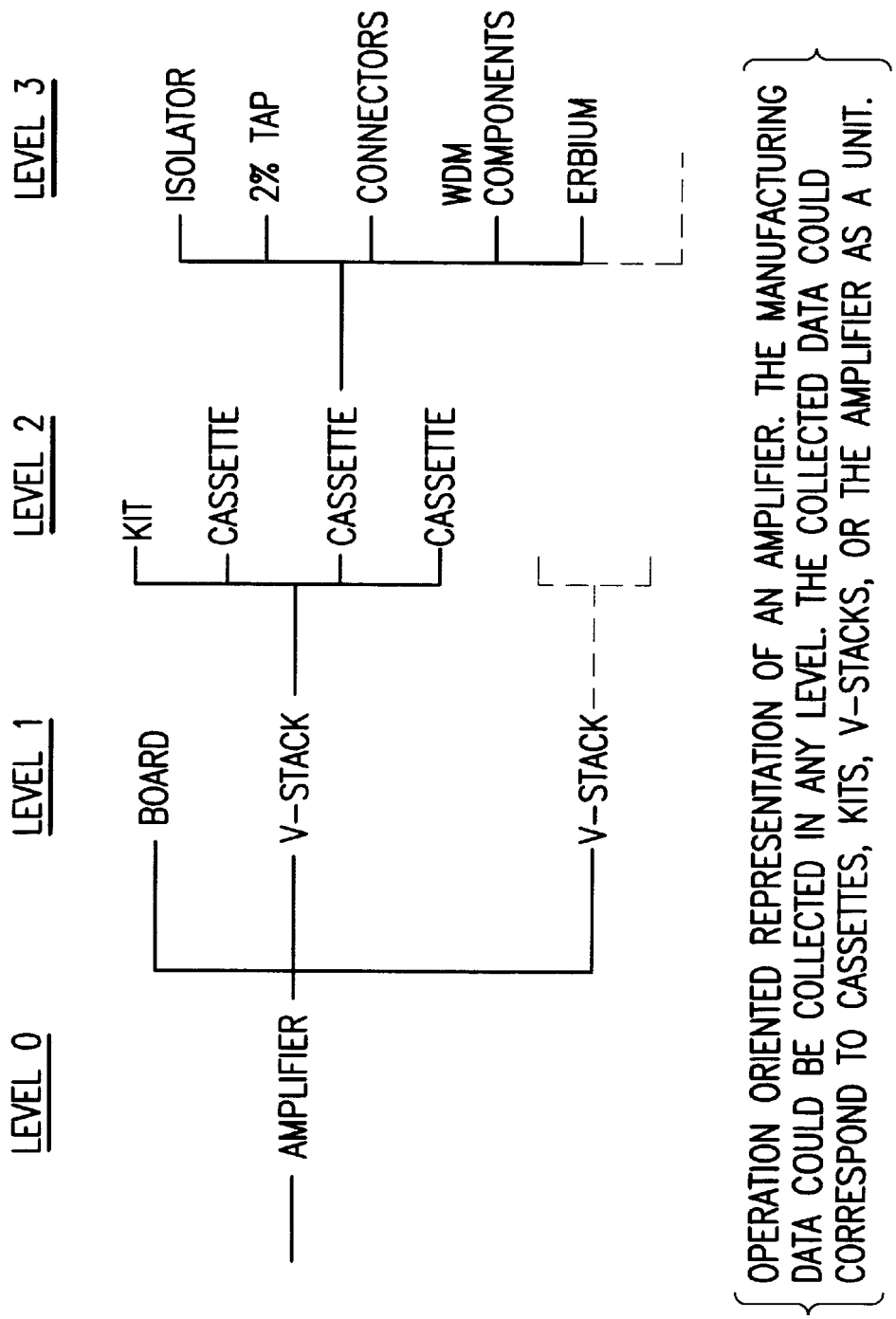

One example of multi-level product (corresponding to multi-level operations) is an amplifier. FIG. 57 is an operation oriented representation of the amplifier. Manufacturing data can be collected on any level. That is, collected data may correspond to cassettes, kits, v-stacks, or the amplifier as a unit.

Raw Prototype or Pilot Data

The engineering analyzer is also configured to introduce work instructions and/or assembly operations dynamically. Furthermore, the analyzer enables them to modify the existing work instruction/assembly operations (or any other documents associated with them such as graphics, details, and warnings) and also enables them to enter the data associated with the specified parameters to a database that is maintained by the system. This data can be analyzed the same way as the other data that is collected in non-pilot manufacturing environment.

CONCLUSION

As described above, an embodiment of the present invention provides an easy to use tool that provides key production statistics of manufacturing operations to maintain production flow to meet cost and schedule requirements. The software tool provides a mechanism for analyzing module production yields to allow for continuous process improvements, as well as a mechanism for analyzing module production to detect and implement cost improvements. Production flow may be analyzed to avoid the risk of bottle necks. Moreover, the system software provides easy access to production information for personnel on the floor, engineers and managers. Also, in an embodiment of the invention, the system provides accurate and easy-to-interpret graphics for the user.

While preferred embodiments are disclosed herein, many variations are possible which remain within the concept and scope of the invention. Such variations would become clear to one of ordinary skill in the art after inspection of the specification, drawings and claims herein. The invention is therefore not to be limited or restricted except within the spirit and scope of the appended claims.

What is claimed is:

1. A system for analyzing raw data derived from a manufacturing control facility, the manufacturing control facility for manufacturing at least one device by execution of a sequence of operations, said system comprising:

at least one user terminal;

a preprocessor which receives the raw data from the manufacturing control facility and which configures the raw data into a predetermined database format;

a database for storing the raw data after being configured by said preprocessor;

a server which transmits queries and results between said database and said at least one user terminal; and, at least one graphical user interface at said user terminal which displays the results transmitted by said server, the results indicative of at least one performance parameter of the operations, wherein the results displayed by said graphical user interface are indicative of an output ratio of each operation, and wherein $$OutputRatio = \frac{\text{The number of board manufactured by an operation}}{\text{The number of board processed by the operation}}.$$

2. A system for analyzing raw data derived from a manufacturing control facility, the manufacturing control facility for manufacturing at least one device by execution of a sequence of operations, said system comprising:

at least one user terminal;

a preprocessor which receives the raw data from the manufacturing control facility and which configures the raw data into a predetermined database format;

a database for storing the raw data after being configured by said preprocessor;

a server which transmits queries and results between said database and said at least one user terminal; and, at least one graphical user interface at said user terminal which displays the results transmitted by said server, the results indicative of at least one performance parameter of the operations, wherein the results displayed by said graphical user interface are indicative of at least one of a success ratio and a failure ratio of each operation, and wherein $$Success\ Ratio = \frac{\text{Total number of boards processed successfully}}{\text{The number of boards processed}}$$

$$Failure\ Ratio = \frac{\text{Total number of boards processed unsuccessfully}}{\text{The number of boards processed}}.$$

3. A system for analyzing raw data derived from a manufacturing control facility, the manufacturing control facility for manufacturing at least one device by execution of a sequence of operations, said system comprising:

at least one user terminal;
a preprocessor which receives the raw data from the manufacturing control facility and which configures the raw data into a predetermined database format;
a database for storing the raw data after being configured by said preprocessor;
a server which transmits queries and results between said database and said at least one user terminal; and,
at least one graphical user interface at said user terminal which displays the results transmitted by said server, the results indicative of at least one performance parameter of the operations,
wherein the results displayed by said graphical user interface are indicative of a first pass yield of each operation, and wherein $$FirstPassYield = \frac{\text{Number of boards that passed an operation on the first pass}}{\text{Total number (distinct) boards that have been processed}}.$$

4. A system for analyzing raw data derived from a manufacturing control facility, the manufacturing control facility for manufacturing at least one device by execution of a sequence of operations, said system comprising:
at least one user terminal;
a preprocessor which receives the raw data from the manufacturing control facility and which configures the raw data into a predetermined database format;
a database for storing the raw data after being configured by said preprocessor;
a server which transmits queries and results between said database and said at least one user terminal; and,
at least one graphical user interface at said user terminal which displays the results transmitted by said server, the results indicative of at least one performance parameter of the operations,
wherein the results displayed by said graphical user interface are indicative of a weighted average, and wherein WeightedAverage=The average number of times that a specific board type has been processed for a specific operation before it passed.

5. A system as claimed in claim 4, wherein the results displayed by said graphical user interface are indicative of an average cycle time of each of the sequence of operations.

6. A system as claimed in claim 2, wherein the graphical user interface is further for displaying a listing and status of all devices processed during a selected time period.

7. A system as claimed in claim 6, wherein the graphical user interface comprises a filter icon for generating a list of devices resulting in defined performance criteria of selected ones of said operations.

8. A system as claimed in claim 7, wherein said graphical user interface is further for displaying a defects summary of the operations.

9. A system as claimed in claim 2, wherein said preprocessor is further for determining a pass/fail performance of each operation based on the raw data, and for storing the thus determined pass/fail performances as entries in the database.

10. A method for analyzing raw data derived from a manufacturing control facility, the manufacturing control facility for manufacturing at least one device by execution of a sequence of operations, said method comprising:
receiving the raw data from the manufacturing control facility and using a preprocessor to configure the raw data into a predetermined database format;
storing the raw data after being configured by said preprocessor into a database;
using a server to transmit queries and results between said database and at least one user terminal; and
displaying on at least one graphical user interface at said user terminal the results transmitted by said server, the results indicative of at least one performance parameter of the operations,
wherein the results displayed on said graphical user interface are indicative of an output ratio of each operation, and wherein $$OutputRatio = \frac{\text{The number of board manufactured by an operation}}{\text{The number of board processed by the operation}}.$$

11. A method for analyzing raw data derived from a manufacturing control facility, the manufacturing control facility for manufacturing at least one device by execution of a sequence of operations, said method comprising:
receiving the raw data from the manufacturing control facility and using a preprocessor to configure the raw data into a predetermined database format;
storing the raw data after being configured by said preprocessor into a database;
using a server to transmit queries and results between said database and at least one user terminal; and
displaying on at least one graphical user interface at said user terminal the results transmitted by said server, the results indicative of at least one performance parameter of the operations,
wherein the results displayed on said graphical user interface are indicative of at least one of a success ratio and a failure ratio of each operation, and wherein $$Success\ Ratio = \frac{\text{Total number of boards processed successfully}}{\text{The number of boards processed}}$$

$$Failure\ Ratio = \frac{\text{Total number of boards processed unsuccessfully}}{\text{The number of boards processed}}.$$

12. A method for analyzing raw data derived from a manufacturing control facility, the manufacturing control facility for manufacturing at least one device by execution of a sequence of operations, said method comprising:
receiving the raw data from the manufacturing control facility and using a preprocessor to configure the raw data into a predetermined database format;
storing the raw data after being configured by said preprocessor into a database;
using a server to transmit queries and results between said database and at least one user terminal; and
displaying on at least one graphical user interface at said user terminal the results transmitted by said server, the results indicative of at least one performance parameter of the operations,
wherein the results displayed on said graphical user interface are indicative of a first pass yield of each operation, and wherein $$FirstPassYield = \frac{\text{Number of boards that passed an operation on the first pass}}{\text{Total number (distinct) boards that have been processed}}.$$

13. A method for analyzing raw data derived from a manufacturing control facility, the manufacturing control facility for manufacturing at least one device by execution of a sequence of operations, said method comprising:

receiving the raw data from the manufacturing control facility and using a preprocessor to configure the raw data into a predetermined database format;

storing the raw data after being configured by said preprocessor into a database;

using a server to transmit queries and results between said database and at least one user terminal; and displaying on at least one graphical user interface at said user terminal the results transmitted by said server, the results indicative of at least one performance parameter of the operations, wherein the results displayed on said graphical user interface are indicative of a weighted average, and wherein WeightedAverage=The average number of times that a specific board type has been processed for a specific operation before it passed.

14. A method as claimed in claim 13, wherein the results displayed on said graphical user interface are indicative of an average cycle time of each of the sequence of operations.

15. A method as claimed in claim 11, further comprising displaying a listing and status of all devices processed during a selected time period on the graphical user interface.

16. A method as claimed in claim 15, further comprising providing a filter icon for generating a list of devices resulting in defined performance criteria of selected ones of said operations.

17. A method as claimed in claim 16, further comprising displaying a defects summary of the operations on the graphical user interface.

18. A method as claimed in claim 11, further comprising using the preprocessor to determine a pass/fail performance of each operation based on the raw data, and storing the thus determined pass/fail performances as entries in the database.

* * * * *